United States Patent [19]

Sugiura et al.

[11] Patent Number: 5,761,394
[45] Date of Patent: Jun. 2, 1998

[54] COLOR IMAGE COMMUNICATION APPARATUS AND METHOD HAVING TWO MODES

[75] Inventors: Susumu Sugiura, Atsugi; Yoshinobu Mita; Makoto Takaoka, both of Kawasaki; Junichi Shishizuka, Tokyo; Yukari Shimomura, Yokohama; Kentaro Matsumoto, Higashi Kurume; Toyokazu Uda, Yokohama; Mitsumasa Sugiyama, Yokohama; Shigetada Kobayashi, Yokohama; Katsutoshi Hisada, Tokyo; Yoji Kaneko; Hiroyuki Nakanishi, both of Yokohama, all of Japan

[73] Assignee: Canon Kabushiki Kaisha, Tokyo, Japan

[21] Appl. No.: 674,834

[22] Filed: Jul. 3, 1996

Related U.S. Application Data

[62] Division of Ser. No. 304,206, Sep. 12, 1994, Pat. No. 5,561,536, which is a continuation of Ser. No. 676,933, Mar. 27, 1991, abandoned.

[30] Foreign Application Priority Data

| Mar. 27, 1990 | [JP] | Japan | 2-080013 |
| Mar. 27, 1990 | [JP] | Japan | 2-080014 |
| Mar. 27, 1990 | [JP] | Japan | 2-080018 |

[51] Int. Cl.[6] .............. B41B 15/00; G03F 3/08; G06K 9/00
[52] U.S. Cl. .............. 395/109; 395/114; 358/502; 358/505; 358/518; 358/539; 382/162
[58] Field of Search .............. 358/500, 501, 358/502, 504, 505, 518, 537, 539, 426, 448; 395/104, 108, 109, 114; 382/162, 166, 167

[56] References Cited

U.S. PATENT DOCUMENTS

| 4,658,299 | 4/1987 | Tanaka et al. | 358/401 |
| 4,679,074 | 7/1987 | Sugiura et al. | 358/80 |
| 4,774,590 | 9/1988 | Haganuma et al. | 358/401 |
| 4,821,107 | 4/1989 | Naito et al. | 355/202 |
| 4,887,151 | 12/1989 | Wataya | 358/539 |
| 4,974,097 | 11/1990 | Kaneko et al. | 358/400 |

(List continued on next page.)

FOREIGN PATENT DOCUMENTS

| 0052184 | 5/1982 | European Pat. Off. . |
| 0234530 | 9/1987 | European Pat. Off. . |
| 3409771 | 9/1984 | Germany . |
| 59-176970 | 10/1984 | Japan . |
| 1101152 | 7/1987 | Japan . |
| 62-190970 | 8/1987 | Japan . |
| 63-254053 | 10/1988 | Japan . |

*Primary Examiner*—Kim Yen Vu
*Assistant Examiner*—Kimberly A. Williams
*Attorney, Agent, or Firm*—Fitzpatrick, Cella, Harper & Scinto

[57] ABSTRACT

The invention concerns a color image communication apparatus, which comprises scan conversion means for converting n-level image data received in a raster scan system via a communication line to data in a shuttle scan system, multi-level conversion means for converting color n-level data obtained from the scan conversion means for multi-level data, and color conversion means for converting color characteristics of multi-level data obtained from the multi-level conversion means from color characteristics for a communication line to color characteristics of output color recording means. The invention also concerns a color image communication apparatus, which comprises means for generating shuttle system color signal, color conversion means for converting the color signal to signal matched to standard color characteristics for a communication line, n-level conversion means for converting the converted color signal from the color conversion means to n-level signal, and means for performing data scan conversion of the n-level data from shuttle scan system to raster scan system and sending out the raster scan system n-level data to the communication line.

26 Claims, 56 Drawing Sheets

U.S. PATENT DOCUMENTS

| | | | |
|---|---|---|---|
| 4,992,884 | 2/1991 | Sakata | 358/401 |
| 5,019,916 | 5/1991 | Ogura | 358/401 |
| 5,128,748 | 7/1992 | Murakami et al. | 358/500 |
| 5,187,592 | 2/1993 | Sugiura et al. | 358/80 |
| 5,208,911 | 5/1993 | Newman et al. | 358/500 |
| 5,220,417 | 6/1993 | Sugiura | 358/468 |
| 5,251,020 | 10/1993 | Sugiyama | 358/500 |
| 5,303,068 | 4/1994 | Udagawa et al. | 358/448 |
| 5,438,648 | 8/1995 | Takaoka et al. | 395/114 |
| 5,483,358 | 1/1996 | Sugiura et al. | 358/539 |
| 5,694,489 | 12/1997 | Kishi | 382/233 |

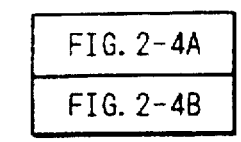
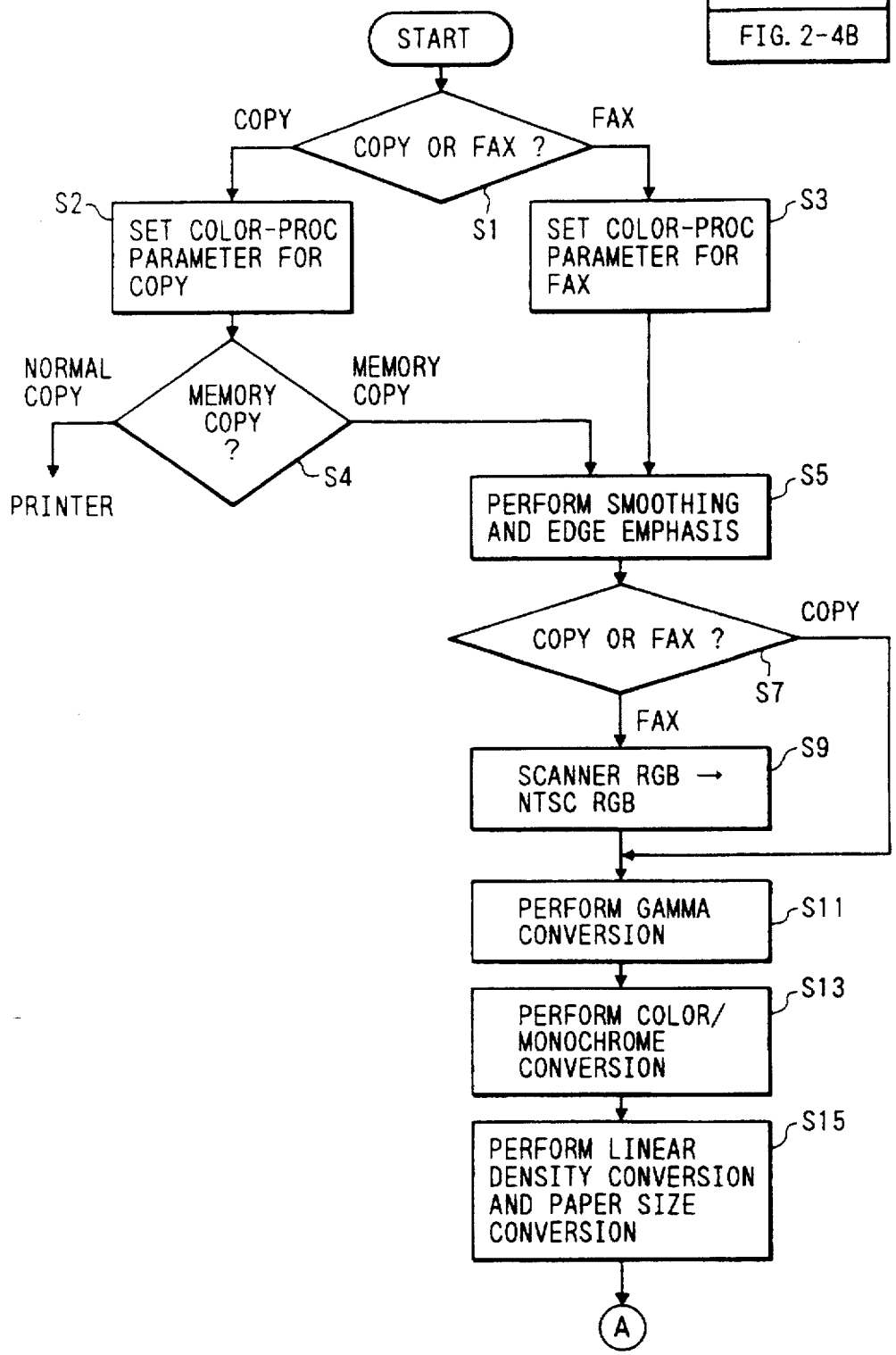
FIG. 2-4A

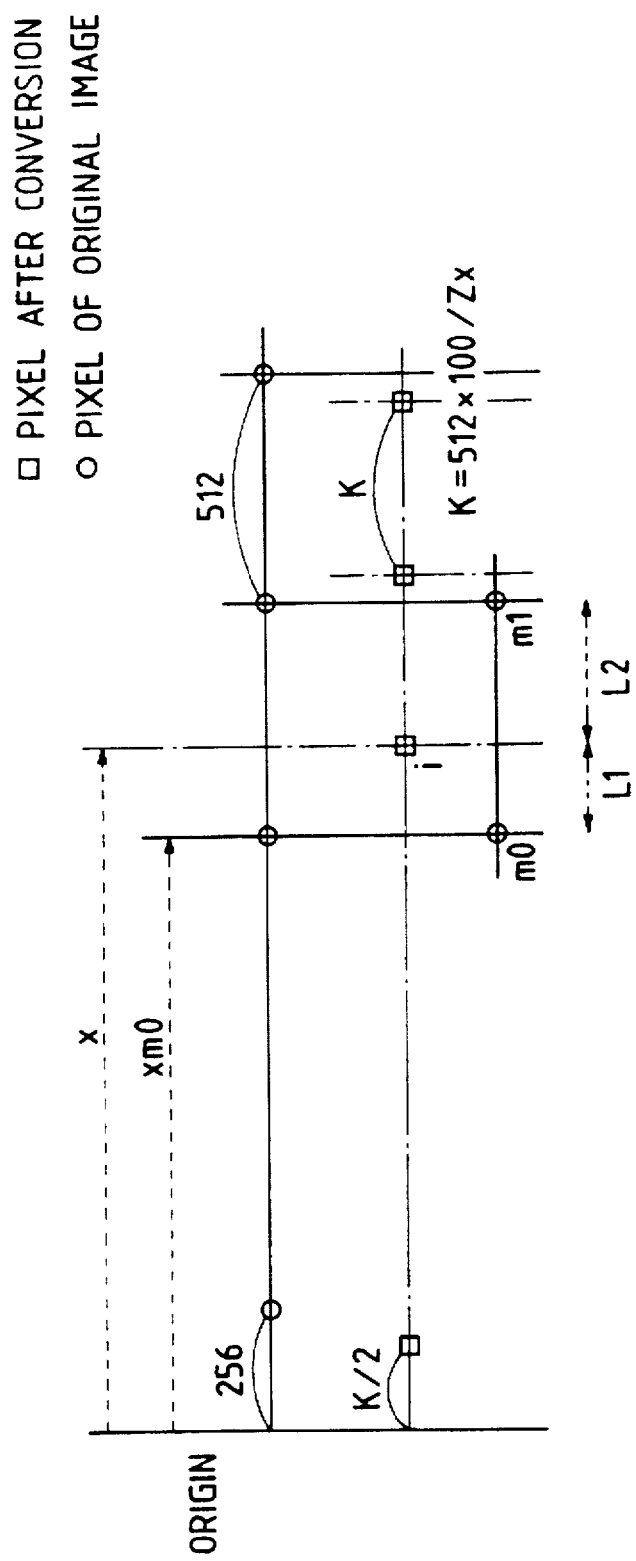

E1: PROPAGATION ERROR FROM DIRECT-PREVIOUS PIXEL
E2: PROPAGATION ERROR FROM 1-LINE PREVIOUS PIXEL
e1: PROPAGATION ERROR TO NEXT PIXEL
e2: PROPAGATION ERROR TO 1-LINE NEXT PIXEL

FIG. 4-7-4A
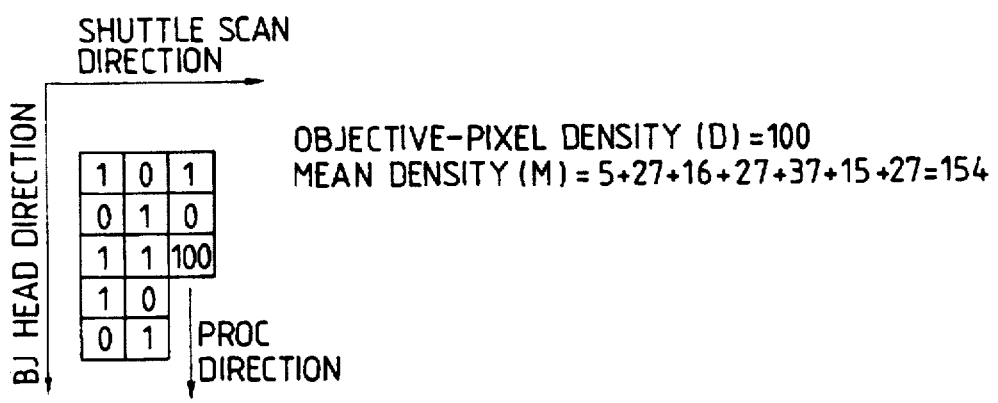
OBJECTIVE-PIXEL DENSITY (D) =100
MEAN DENSITY (M) = 5+27+16+27+37+15+27=154
FIG. 4-7-4B
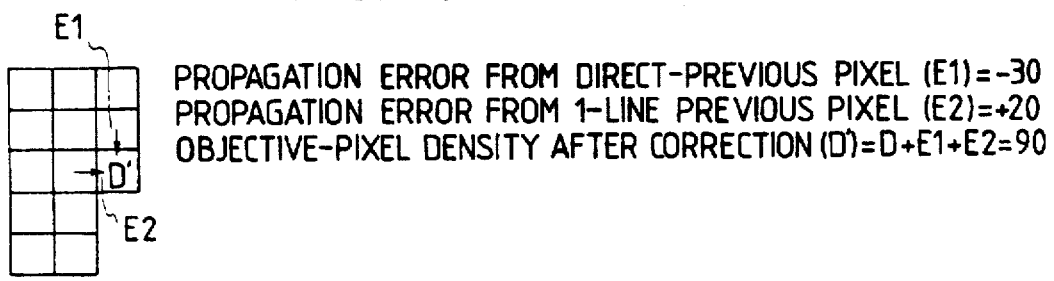
PROPAGATION ERROR FROM DIRECT-PREVIOUS PIXEL (E1)=-30
PROPAGATION ERROR FROM 1-LINE PREVIOUS PIXEL (E2)=+20
OBJECTIVE-PIXEL DENSITY AFTER CORRECTION (D')=D+E1+E2=90
FIG. 4-7-4C
D'-M=90-154=-64 < 0
BINARIZATION RESULT B = 0
DISPERSION ERROR e1=e2=-32
   (ERROR DIVISION RATIO IS FIXED AS 1/2, 1/2)

B: BINARIZATION DATA
f: MULTI-LEVEL DATA

BLOCK EDGE PORTION

FIG. 4-7-6C
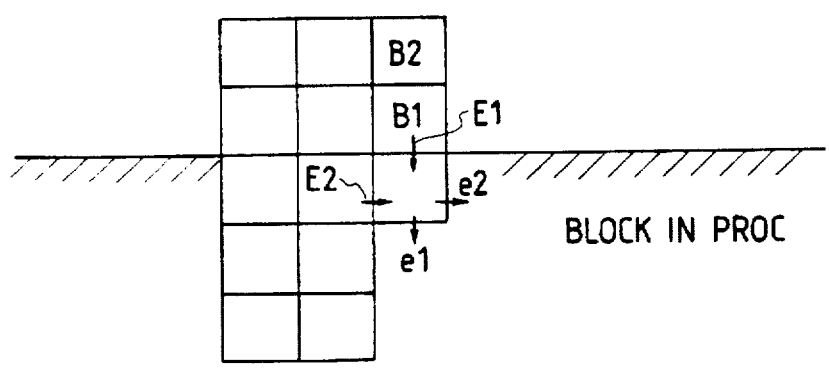
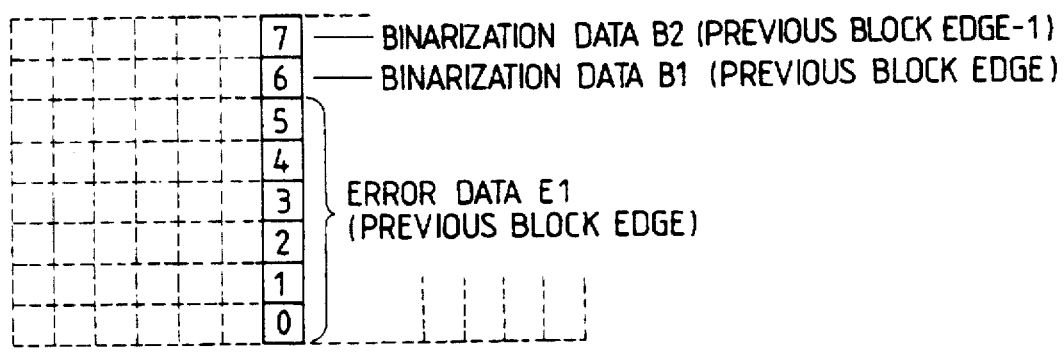
— BINARIZATION DATA B2 (PREVIOUS BLOCK EDGE-1)
— BINARIZATION DATA B1 (PREVIOUS BLOCK EDGE)
ERROR DATA E1
(PREVIOUS BLOCK EDGE)

FIG. 4-7-8A   FIG. 4-7-8B   FIG. 4-7-8C

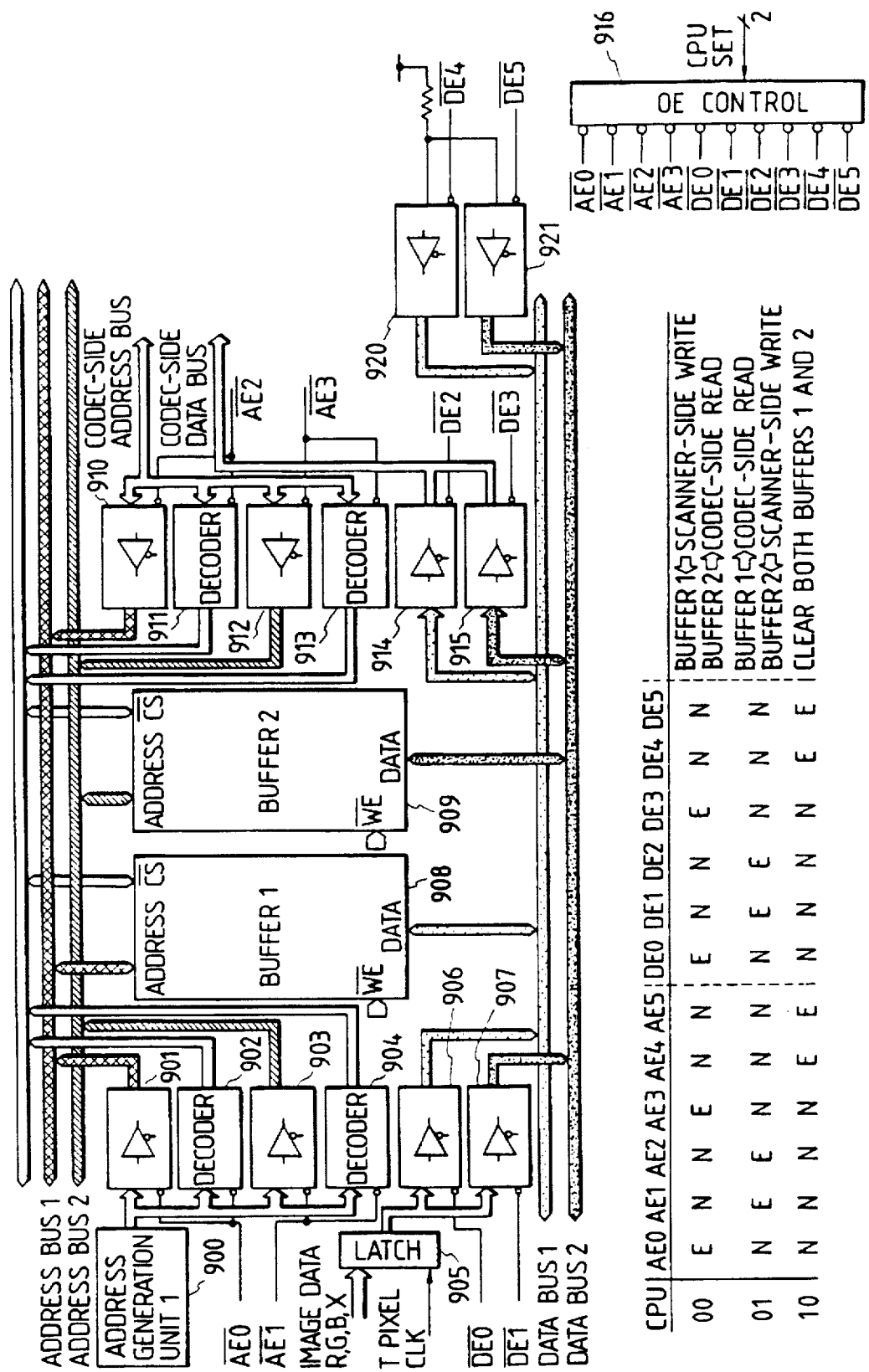

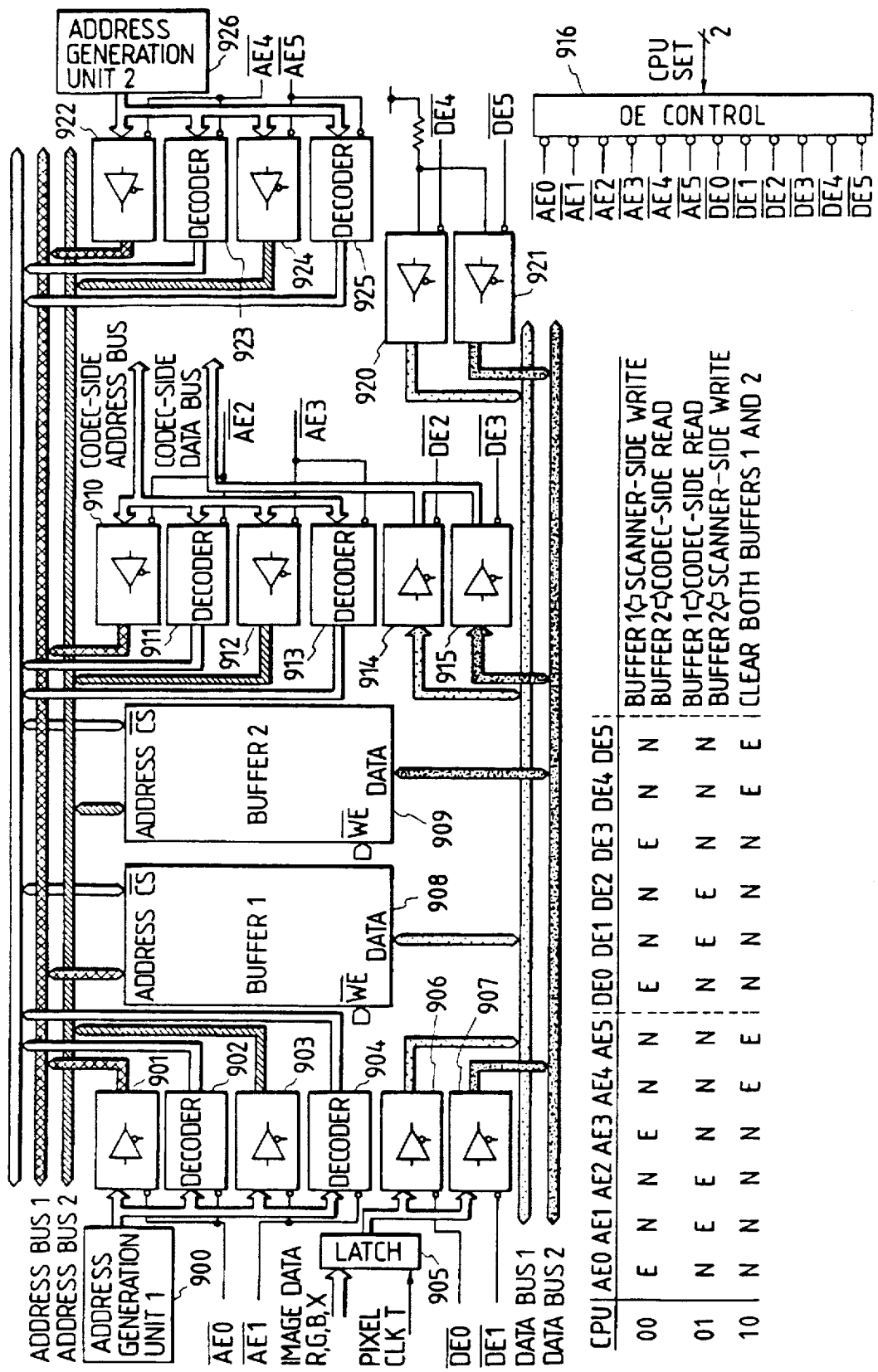

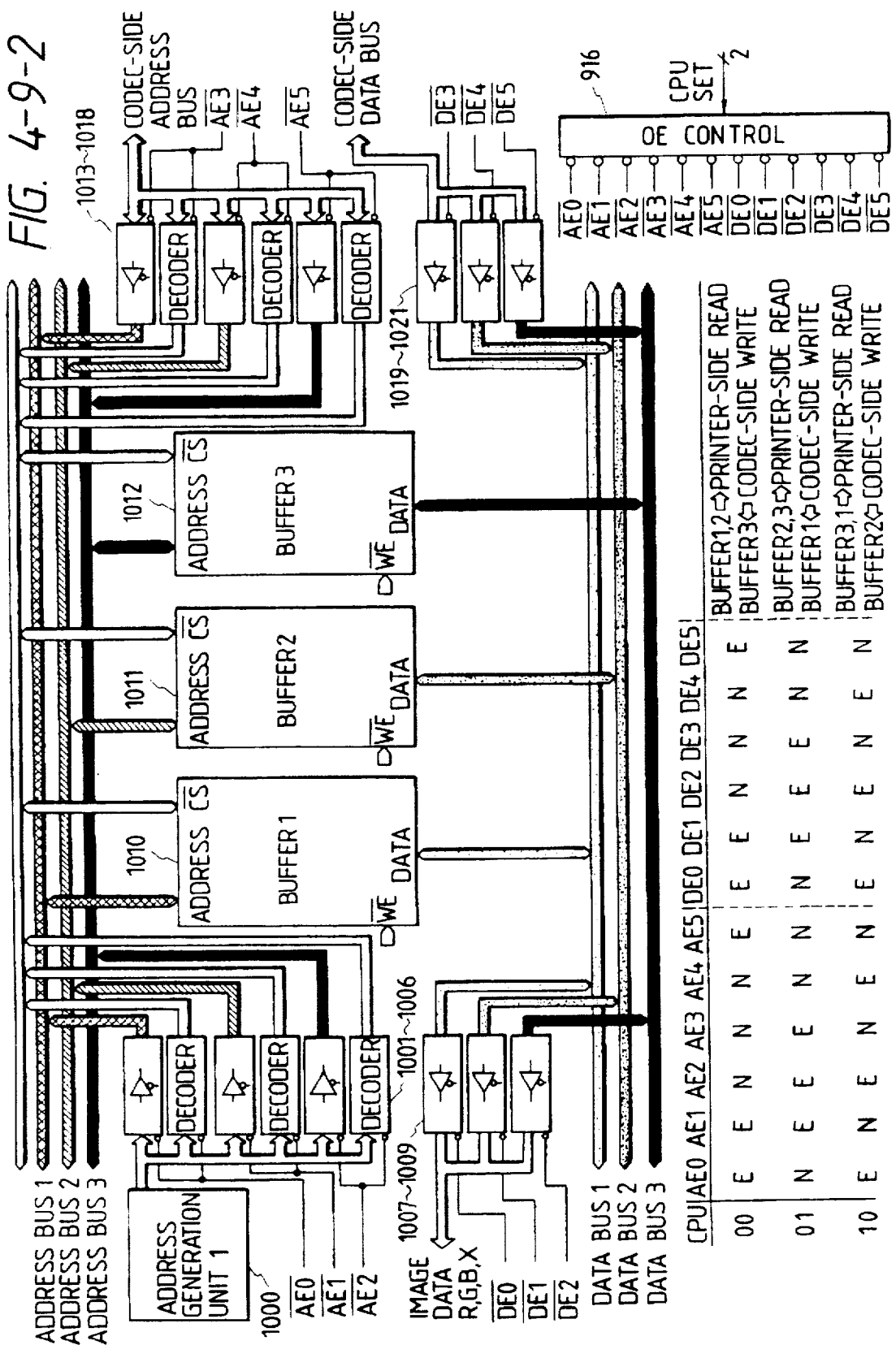

FIG. 4-10-2
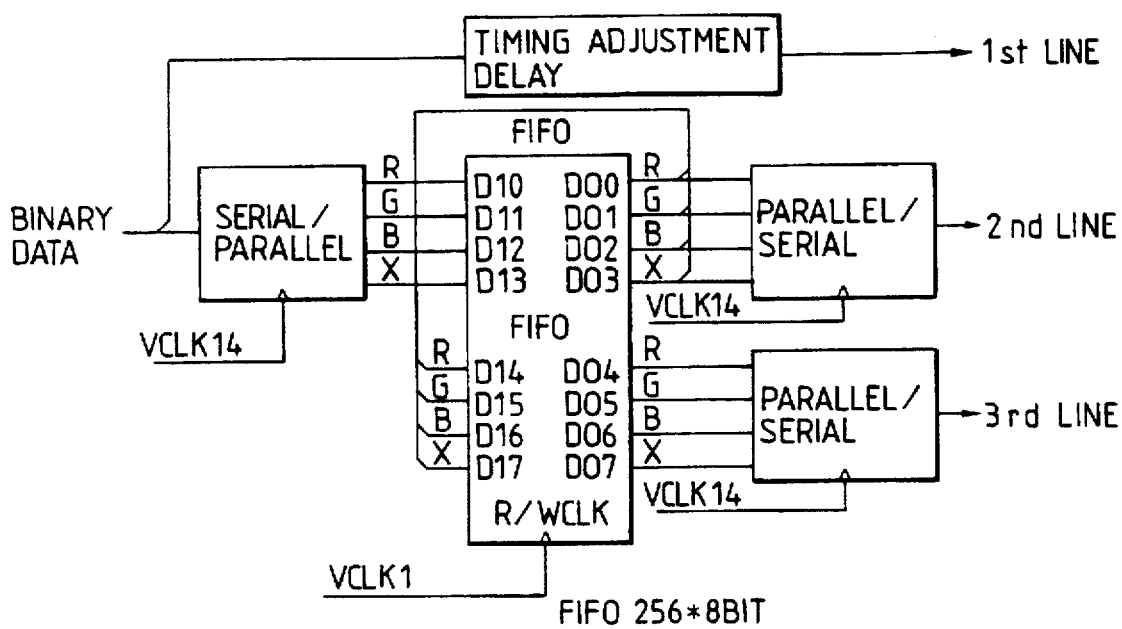
FIG. 4-10-3
FIG. 4-10-4
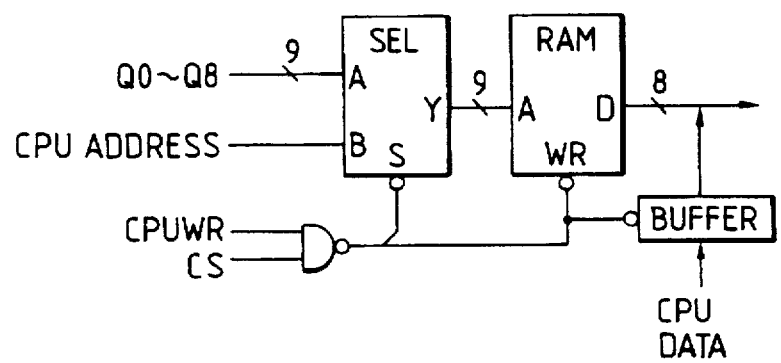

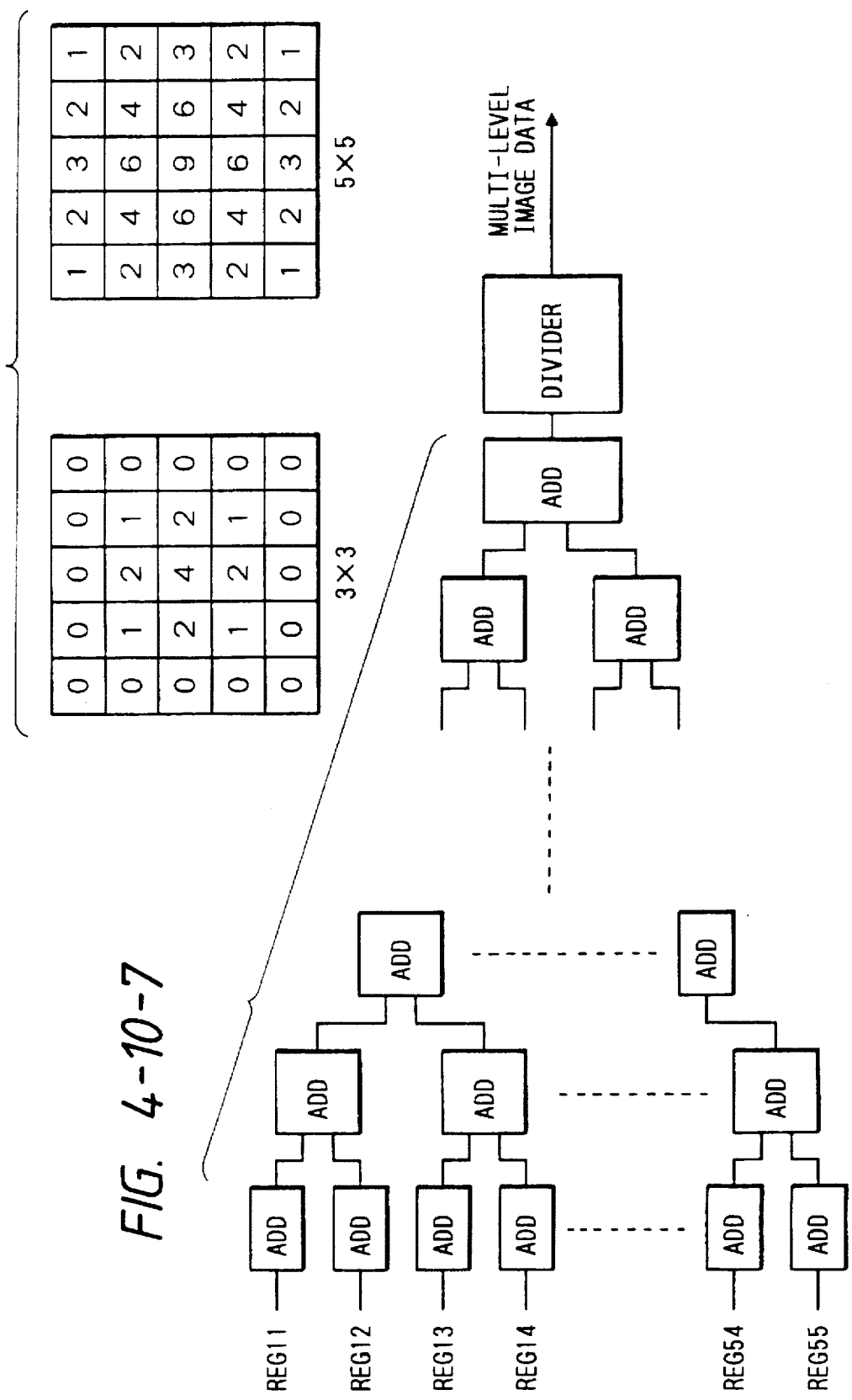

UPPER 1BIT = SIGN BIT

COLOR IMAGE COMMUNICATION APPARATUS AND METHOD HAVING TWO MODES

This application is a division of application Ser. No. 08/304,206 filed Sep. 12, 1994, now U.S. Pat. No. 5,561,536, which is a continuation of application Ser. No. 07/676,933 filed Mar. 27, 1991, now abandoned.

BACKGROUND OF THE INVENTION

1. Field of the Invention

This invention relates to a color image communication apparatus.

2. Related Background Art

Heretofore, in order to obtain a plurality of copies of an original with a color facsimile machine, it is necessary to either scan the original the same number of times, or store the data in a memory.

In addition, the color facsimile requires standardization of the data which it processes. This means that RGB data of the scanner must be converted to NTSC standard RGB data, leading to deterioration of the image quality. This is often undesirable, especially when the facsimile is in the copy mode, where high image quality is required for the copy to be a faithful reproduction of the original.

Further, in the scanning part of a color facsimile apparatus, a main scanning line of an original image is read out by an elongate line sensor through electric scanning, and the line sensor is mechanically fed in the auxiliary scanning direction to repeat one-line reading, thereby reading the entire original image. This conventional method is called a raster scan reading system.

However, due to limitations in semiconductor manufacture, it is frequently difficult and sometimes impossible to manufacture an elongate line sensor which can read a large size original image (such as an A4 or A3 size original). The conventional method of producing such a line sensor is by connecting a plurality of short line sensors. This method, however, poses problems in the accuracy of alignment for connection. Because it is impossible to set a plurality of line sensors along a straight line, in practice line sensors are staggered with respect to one another for several pixels in the auxiliary scanning direction. In this case, however, an extremely large load is inevitable for electrically correcting the deviation in the auxiliary scanning direction. Therefore, even in magnified image reading, the sensors in a staggered arrangement cannot read the same line unless such measure is provided as varying the read timing according to the auxiliary direction scan speed.

Further, in the prior art, an image is focused on a line sensor not by using close-contact-to-original type sensors, but rather by using a scale-reducing optical system.

Further, in a line sensor requiring a scale-reducing optical system, an element corresponding to one pixel is extremely small in size, and it is difficult to apply filters for color sensors.

Further, if the resolution when reading an original image is increased with respect to all the above prior art examples, the difficulty of implementation and the difficulty of filter application are increased.

Further, the prior art apparatus usually adopts the raster scan for reading, transmitting and printing an image. Such processing, however, frequently requires a buffer as long as one line in the raster direction.

Accordingly, it is thought to adopt a shuttle scan system for reading an image. With a shuttle scan system, the size of the line buffer necessary for individual image processings in the raster direction is reduced. For example, when scanning an A4 size original with a 400 dot per inch (dpi) resolution, the buffer size may be reduced from 3,456 pixels to 128 pixels, thus permitting a reduction in the size of the required memory. In a facsimile apparatus or the like, however, raster data are dealt with in image communication with the destination partner. This means that the scanner or printer requires a vertical/horizontal conversion section between shuttle scan and raster scan.

SUMMARY OF THE INVENTION

An object of the invention is to provide an image processing apparatus or method which can solve the problems discussed above.

Another object of the invention is to provide an image processing apparatus which is simple in construction and permits a high image quality to be obtained.

A further object of the invention is to provide an image processing apparatus which has versatility with respect to a standard communication system.

A still further object of the invention is to provide an apparatus which can transmit standard color data and obtain a high quality copy.

The present invention achieves these objections by providing a color image communication apparatus that switches between a copy mode and a communication mode. The apparatus performs color space standardization conversion of objective color image data in the communication mode, and does not perform color space standardization conversion in the copy mode.

The above and other objects and features of the invention will become more apparent from the following description of preferred embodiments and drawings.

BRIEF DESCRIPTION OF THE DRAWINGS

FIG. 2-1 is a schematic illustrating the versatility of the unit with respect to a G4 facsimile machine;

FIG. 2-2 is a block diagram showing a color facsimile machine;

FIG. 2-3 is a schematic showing a CODEC section;

FIG. 2-4 which is comprised of FIGS.2-4A and 2-4B, is a flow chart illustrating a copy mode;

FIG. 3-1A is a schematic showing shuttle scan;

FIG. 3-1B is a schematic showing an image data arrangement in the case of shuttle scan;

FIG. 3-1C is a schematic showing an image data arrangement in the case of raster scan;

FIG. 3-2 is a block diagram showing a second embodiment of the image processing unit;

FIG. 3-3 is a block diagram showing a third embodiment of the image processing unit;

FIG. 3-4 is a schematic showing a flow outline of a function of automatic data transmission to a coexistent color/monochrome facsimile network;

FIG. 3-5 is a block diagram of color/monochrome conversion;

FIG. 3-6 is a timing chart showing color image data;

FIG. 3-7 is a schematic showing output data timing;

FIG. 3-8 is a schematic showing a flow outline of a function of automatic data transmission to a coexistent color/monochrome facsimile network;

FIG. 3-9 is a flow chart illustrating automatic color/monochrome facsimile transmission;

FIG. 3-10 is a schematic showing data flow in the first embodiment of the image processing unit;

FIG. 4-1-1 is a block diagram illustrating smoothing;

FIG. 4-1-2 is a schematic showing a smoothing matrix;

FIG. 4-1-3 is a schematic showing an order of pixels;

FIG. 4-2-1 is a block diagram illustrating edge emphasis;

FIG. 4-2-2 is a schematic showing an edge detection matrix;

FIG. 4-2-3 is a schematic showing an order of pixels;

FIG. 4-3-1 is a schematic showing a first example of an RGB/RGB (NTSC) conversion section;

FIG. 4-3-2 is a schematic showing a second example of an RGB/RGB (NTSC) conversion section;

FIG. 4-3-3 is a schematic showing a third example of an RGB/RGB (NTSC) conversion section;

FIG. 4-3-4 is a schematic showing a fourth example of an RGB/RGB (NTSC) conversion section;

FIG. 4-4-1 is a schematic showing a first example of a gamma conversion table (with a ROM structure);

FIG. 4-5-1 is a schematic showing a first example of a gamma conversion table (with a RAM structure);

FIG. 4-6-1 is a schematic illustrating a first order linear interpolation;

FIG. 4-6-2 is a schematic illustrating a second order linear interpolation;

FIG. 4-6-3 is a schematic illustrating a calculation position and an edge in linear interpolation;

FIG. 4-6-4 is a block diagram illustrating a linear interpolation processing;

FIG. 4-6-5 is a schematic showing a relation of input/output image clocks;

FIG. 4-6-6 is a schematic showing an example of an interpolation pixel calculation circuit;

FIG. 4-6-7 is a schematic showing a relation of input and output pixel clocks;

FIG. 4-7-1 is a schematic showing a mean density preservation algorithm;

FIG. 4-7-2 is a schematic showing weighting factors;

FIG. 4-7-3 is a schematic illustrating error propagation;

FIG. 4-7-4A is a schematic illustrating weighting;

FIG. 4-7-4B is a schematic showing correction of an objective pixel;

FIG. 4-7-4C is a schematic illustrating binarization and error division;

FIG. 4-7-5A is a schematic illustrating rear connection processing;

FIG. 4-7-5B is a schematic showing rear connection weighting factors;

FIG. 4-7-6A is schematic showing the entire structure of a binarization processing unit;

FIG. 4-7-6B is a schematic illustrating line delay processing;

FIG. 4-7-6C is a schematic showing a connection memory processing bit structure;

FIG. 4-7-7 is a schematic internal processing block and main data flow;

FIGS. 4-7-8A to 4-7-8C are schematics illustrating operations with objective pixels at different positions in a block;

FIG. 4-8-1 is a schematic showing a double buffer structure;

FIG. 4-8-2 is a schematic showing the relation between operating direction and address;

FIG. 4-8-3 is a schematic showing Structure Example 1 of block buffer;

FIG. 4-8-4 is a schematic showing a structure example of address generation unit 1;

FIG. 4-8-5 is a schematic showing Structure Example 2 of block buffer 1;

FIG. 4-8-6 is schematic showing Structure Example 3 of block buffer 1;

FIG. 4-8-7 is a schematic showing a structure of address generation unit 2;

FIG. 4-8-8 is a schematic showing Structure Example 4 of block buffer 1;

FIG. 4-8-9 is a schematic showing a structure example of color/monochrome selection circuit 517 (shown in FIG. 4-8-8);

FIG. 4-9-1 is a schematic showing block buffer 2;

FIG. 4-9-2 is a schematic showing a structure example of block buffer 2;

FIG. 4-10-1 is a schematic showing a first example of a multi-level generation unit;

FIG. 4-10-2 is a schematic showing examples of filter factors;

FIG. 4-10-3 is a schematic showing a case provided with serial/parallel and parallel/serial conversions;

FIG. 4-10-4 is a schematic showing an example constituted by RAMs;

FIG. 4-10-5 is a schematic showing a 5-by-5, i.e., 25, pixel shift portion;

FIG. 4-10-6 is a schematic showing a product portion;

FIG. 4-10-7 is a schematic showing a sum portion;

FIG. 4-10-8 is a schematic showing an example of filter factors;

FIG. 4-10-9 is a schematic showing a structure with three LUTs;

FIG. 4-11-1 is a schematic showing an example of a color/monochrome judgement unit;

FIG. 4-11-2 is a schematic showing a subtraction unit;

FIG. 4-11-3A is a schematic showing absolute value circuit 1;

FIG. 4-11-3B is a schematic showing absolute value circuit 2;

FIG. 4-11-4 is a schematic showing a second example of color/monochrome judgement unit;

FIG. 4-12-1 is a schematic showing an example of a printer unit; and

FIG. 4-12-2 is a schematic showing an example of a black generation unit.

DETAILED DESCRIPTION OF THE PREFERRED EMBODIMENTS

Figure 1:
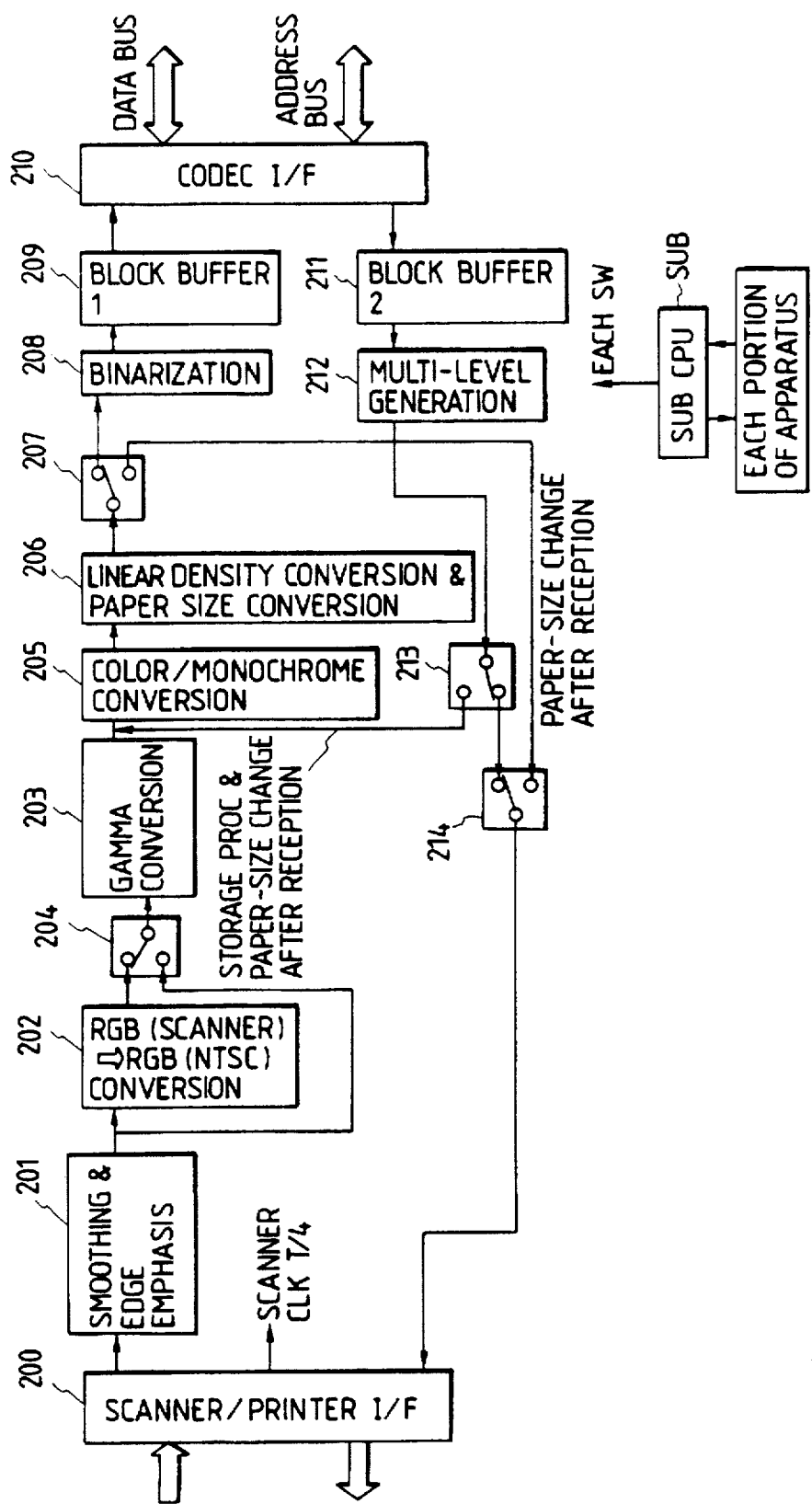
FIG. 1 is a block diagram showing a first embodiment of an image processing unit.
Figures 1, 2:
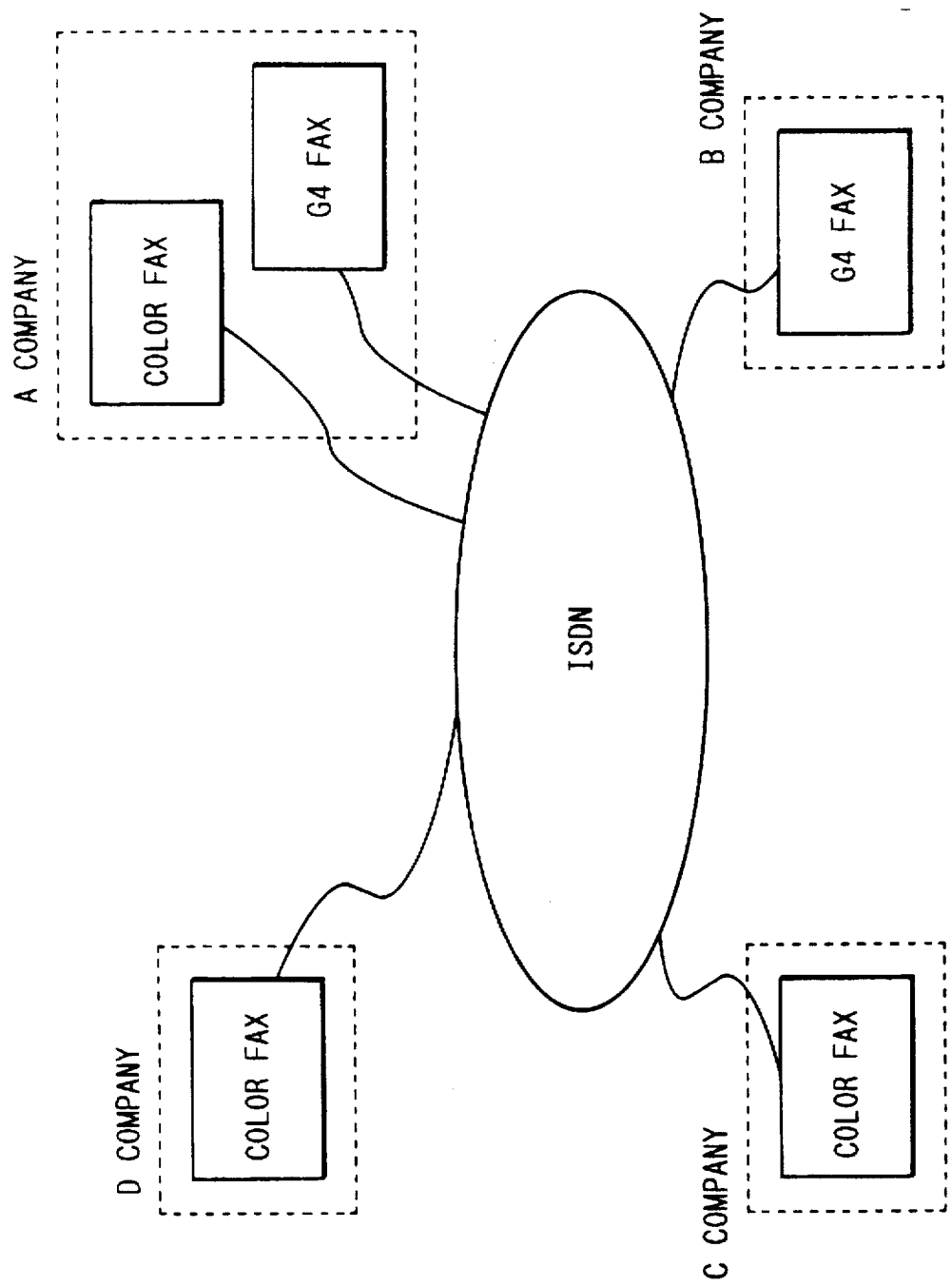
Figure 2:
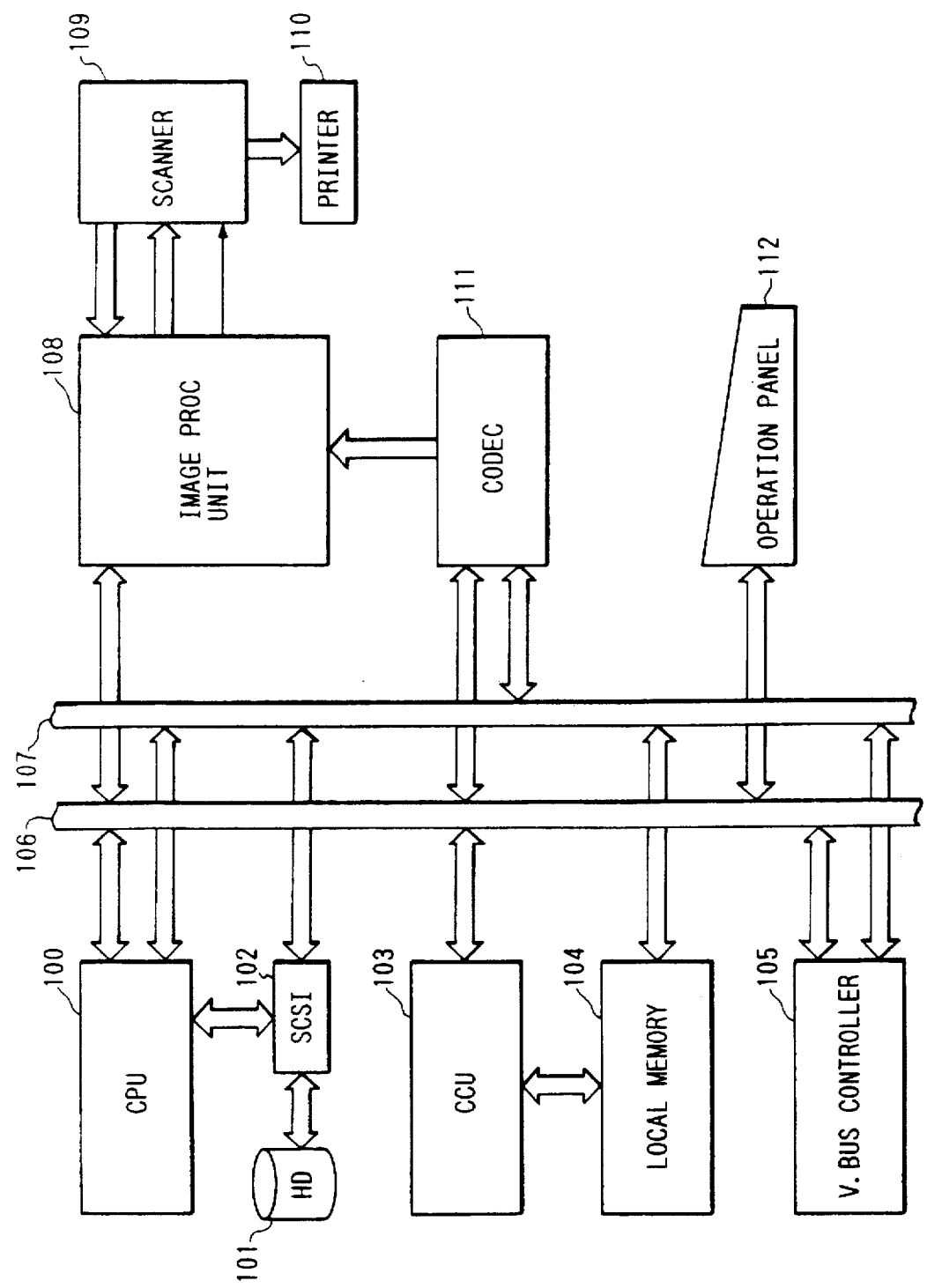

FIG. 2-1 shows color facsimile units embodying the invention in use. Each unit is connected to an integrated services digital network (ISDN) and is capable of communication with a G4 facsimile unit as well as another color facsimile unit as partner. To this end, the unit has a construction such that, with respect to the G4 facsimile unit, it can transmit and receive a maximum A4 size, 400 dots per inch (dpi) monochrome original utilizing MMR compression encoding. When in communication with the color facsimile unit, it can transmit and receive a maximum A3 size 400 dpi color image.

Referring to FIG. 2-1, an original can be transmitted simultaneously from A company to B, C and D companies either by utilizing the G4 facsimile unit or by utilizing G4 protocol in the color facsimile unit. However, C and D companies must, of course, utilize G4 protocol for reception. When A company transmits a color image, the partner must be a color facsimile unit. That is, a color image cannot be transmitted to B company. Moreover, when transmitting to B company, G4 protocol is required. The color facsimile protocol of this embodiment also has a function of monochrome image transmission.

FIG. 2-2 is block diagram showing the overall color facsimile construction.

Reference numeral 100 designates a CPU for controlling the apparatus as a whole, while reference numeral 101 designates a hard disk for storing reception or transmission image data with SCSI as interface. Reference numeral 102 designates a hard disk controller for issuing SCSI commands to hard disk 101 under the control of commands from CPU 100. Reference numeral 103 designates a communication control unit for undertaking protocol control for connection to external communication lines, reference numeral 104 a local memory, reference numeral 105 a V.BUS controller, reference numeral 106 a main bus, and reference numeral 107 an image bus. Reference numeral 108 designates an image processing unit for processing reception/transmission image to produce a result conforming to a scanner or printer. Reference numeral 109 designates a scanner which reads the image and transfers 8-bit data representing the same for each of R, G and B (hereinafter referred to as multi-level image data) to image processing unit 108. The scanner can also conversely perform color processing, binarization, etc. of multi-level image data from the image processing unit and provide the obtained binary image data to printer 110. Further, it can perform a copy operation by binarizing the image that it read and providing the resultant binary data to the printer. Reference numeral 111 designates a CODEC, the interface formula of which for image data with respect to image processing unit 108 is one-bit data for each of R, G and B (hereinafter referred to as binary image data). Reference numeral 112 designates an operation panel.

Figures 2, 3:
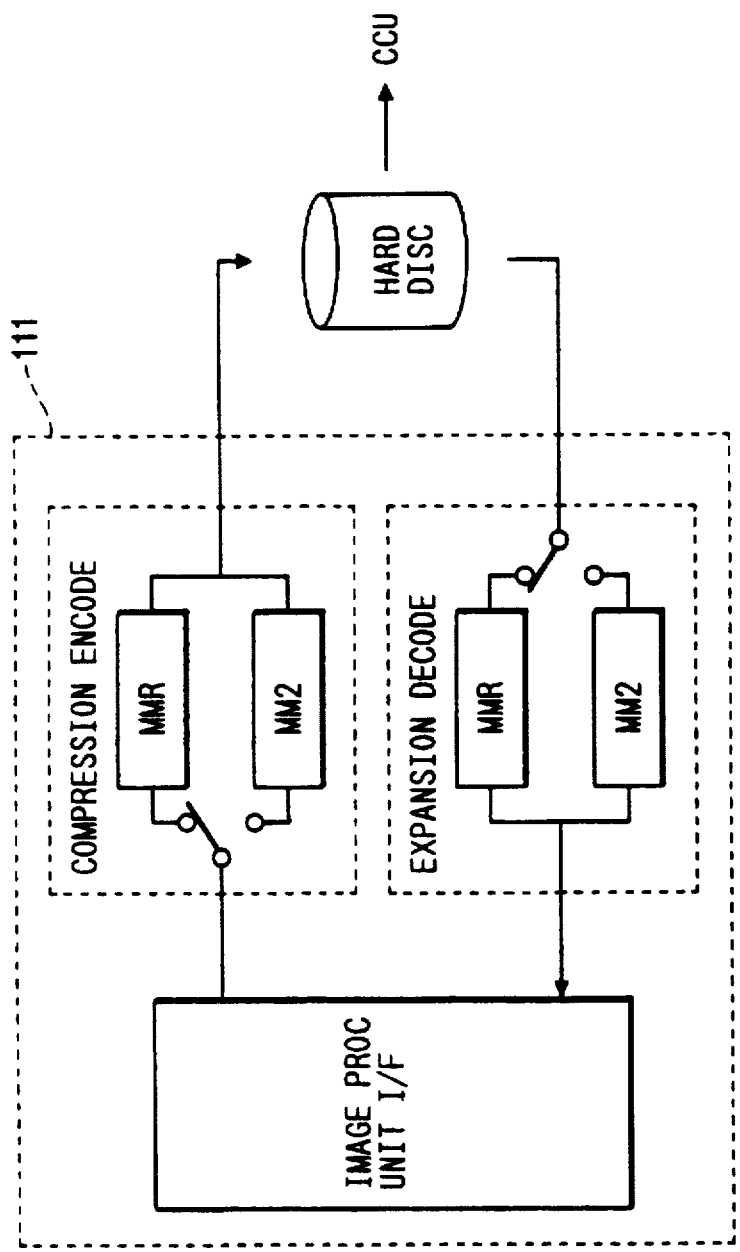

The dashed rectangle in FIG. 2-3 contains a schematic representation of the internal construction of CODEC 111. MMR for G4 facsimile and MM2 for color facsimile are selectively operable for compression encoding and expansion decoding.

A brief description of operation will now be given for copying, transmission and reception.

I. Copying Operation (normal copy)

In a copying operation, when an A4 size original is set on an original base of scanner 109 and a copy start instruction is given from operation panel 112, CPU 100 receives the copy start signal and gives a copy start instruction to a sub-CPU (not shown) provided in image processing unit 108. When it receives a copy start signal, the sub-CPU in image processing unit 108 supplies a copy start command to the scanner and printer. In addition, a masking parameter in a color processing circuit provided in the scanner is set for copying. Multi-level data read out by the scanner are converted by a scan-by-scan conversion process in a color processing/binarizing circuit in the scanner to be color matched to the characters of the printer, and are supplied after binarization to printer 110 for ink jet recording.

II. Transmitting Operation

In a transmitting operation, a maximum A3 size original is set on the original base of scanner 109. The setting of the destination partner, the selection of monochrome or color mode and the designation of the resolution are effected from operation panel 112. The destination setting is read out by CPU 100 and set in CCU 103. The selection of the monochrome/color mode and the resolution designation are also read out by CPU 100, and are set in registers (not shown) provided in image processing circuit 108. When a transmission start instruction is subsequently provided from operation panel 112, this signal is received by CPU 100, and a masking parameter in the color processing circuit in the scanner is set for facsimile. The transmission start instruction is also given to the sub-CPU in image processing unit 108. When it receives the transmission start signal, the sub-CPU in image processing unit 108 supplies a read start command to the scanner. Multi-level data obtained from the scanner are 8-bit data for each of the three colors read out by respective R, G and B filters in the scanner. These data are read out in a scanning system which is different from commonly termed raster scan. In image processing unit 108, the R, G, and B data of the scanner itself are converted to NTSC standard R, G and B data. In addition, if there is an instruction for monochrome transmission, data read out in color are converted to monochrome. Then, the data are binarized and converted to raster scan form to be supplied as binary image data to CODEC 111. In the CODEC, compression encoding is performed to reduce the quantity of the transmission data. The system of compression encoding is different depending on whether the partner is a color facsimile or a G4 facsimile. More specifically, the compression encoding is performed in MM2 in the case of a color facsimile partner, while it is performed in MMR in the case of a G4 facsimile partner. The result of the compression encoding is supplied through image bus 107 and hard disk controller 102 to hard disk 101 for tentative storage therein. If an original consists of a plurality of sheets, an auto document feeder (ADF) is used to read the entire original, with the read-out image data being stored in the hard disk. Then, CCU 103 connects a line to the destination partner under control of a command from CPU 100, and information exchange concerning mutual processing functions is executed. The image data are then transmitted. At this time, if the partner cannot cope with or execute corresponding processings regarding the selection of color/monochrome and setting of resolution, paper size, etc. as instructed from the operation panel in advance, the CODEC decodes the image data once stored in the hard disk and supplies this data as binary image data to image processing unit 108. Image processing unit 108 recovers multi-level image data from the binary image data and processes the recovered data in conformity with the partner's capability concerning color/monochrome, resolution, paper size, etc. It then binarizes the data for supply to CODEC 111. CODEC 111 then performs compression encoding of data once again. The encoded data are stored in the hard disk to be sent out from CCU 103 to an external line.

III. Receiving Operation

In a receiving operation, CCU 103 effects line connection in response to a line connection request from a source partner, and gives a reception start message to CPU 100. Receiving the reception start message, CPU 100 provides a reception start signal to the CODEC and image processing unit. CPU 100 also sets a masking parameter in the color processing circuit in the scanner for facsimile. When the line connection is done, information exchange concerning mutual processing functions and the like is executed, and the image compression encoding system used for communication, paper size and resolution are determined. The compression encoding system is set in a register in the CODEC, while the paper size and resolution are set in registers in the image processing unit. Image data received by CCU 103 are supplied from local memory 104 through image bus 107 to CODEC 111. The CODEC selects either color facsimile decoding or G4 facsimile decoding, depending on the value in the register noted above, and decodes image data to binary image data to be supplied to image processing unit 108. The image processing unit converts image data of the raster scan form to a form conforming to printer 110, decodes binary image data to 8-bit multi-level image data for each of R, G and B, executes resolution conversion and paper size conversion if necessary, and supplies the resultant data as multi-level image data to scanner 109. The scanner performs color processing and binarization in conformity with the recording characteristics of the printer. The binary data thus obtained are supplied to printer 110 for ink jet recording.

Image processing unit 108 will now be described in detail.

Prior to description of the operation, two different image scan formats which are dealt with in the image processing unit will be described.

SHUTTLE SCAN FORMAT

Figures 1A, 3:
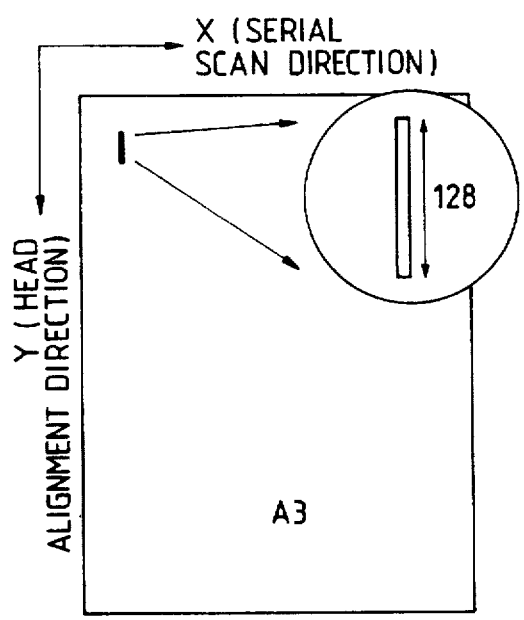
Figures 1B, 3:
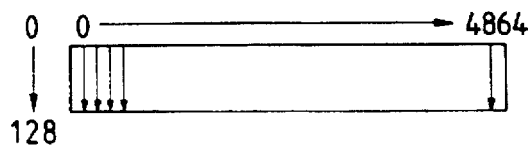

In the present scanner and printer, as shown in FIG. 3-1A, an image is scanned by serial scan for every 128 pixels. Heads of the scanner or printer are arranged for 128 pixels in direction Y in FIG. 3-1A and are scanned in direction X. The image transfer starts with an upper left pixel on A3 paper as shown in FIG. 3-1B, and 128 pixels are fed in the direction of the head arrangement. Then, 128 pixels at a position one pixel to the right of the previous position in the shuttle scan direction are fed. Likewise, the 128-pixel feed is repeatedly performed up to the right end of paper (i.e., 4,864 times in the case of A3 paper).

RASTER SCAN FORMAT

Figures 1C, 3:
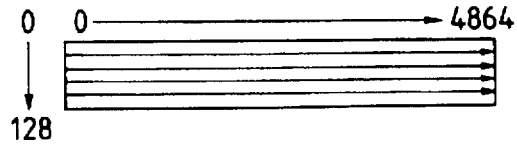
Figures 2, 3:
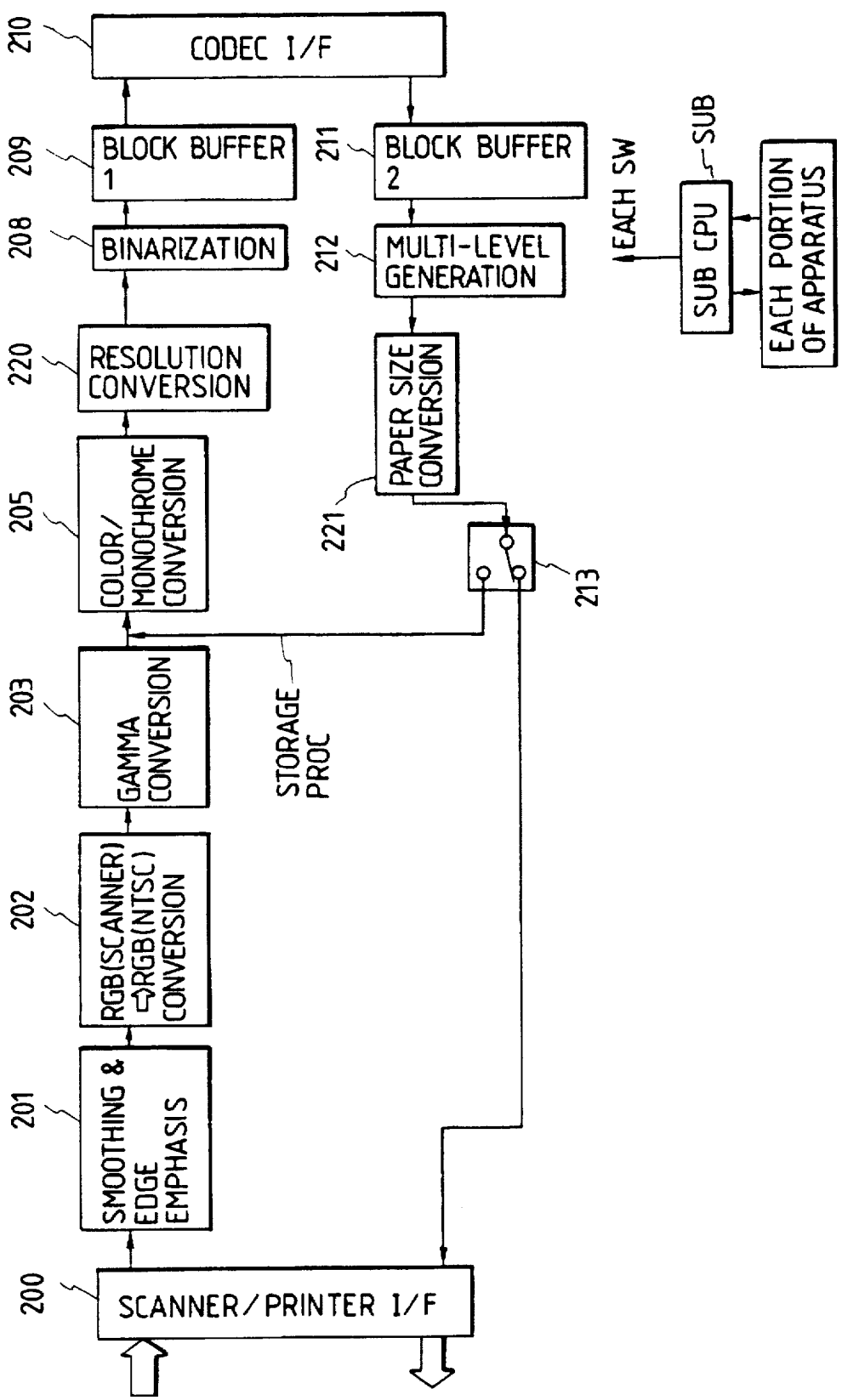
Figure 3:
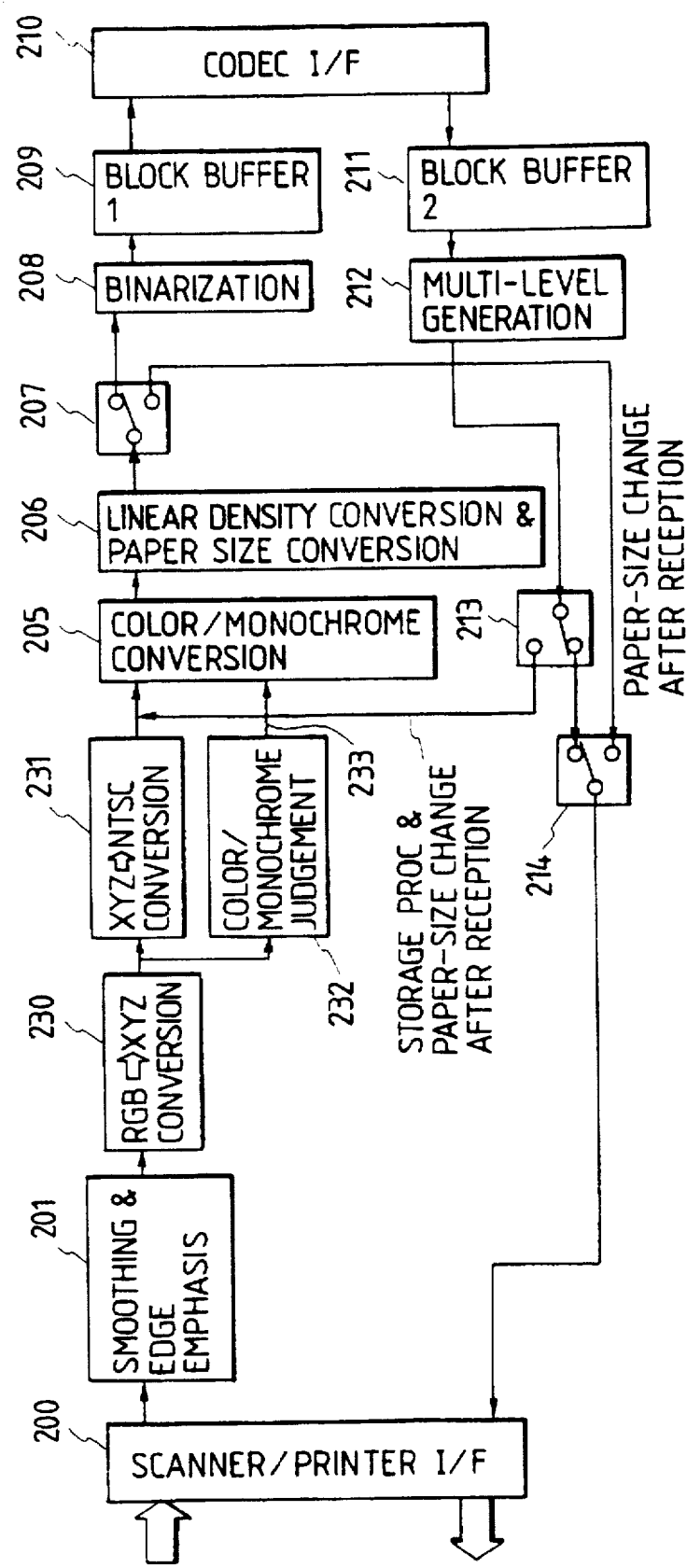
Figures 3, 4:
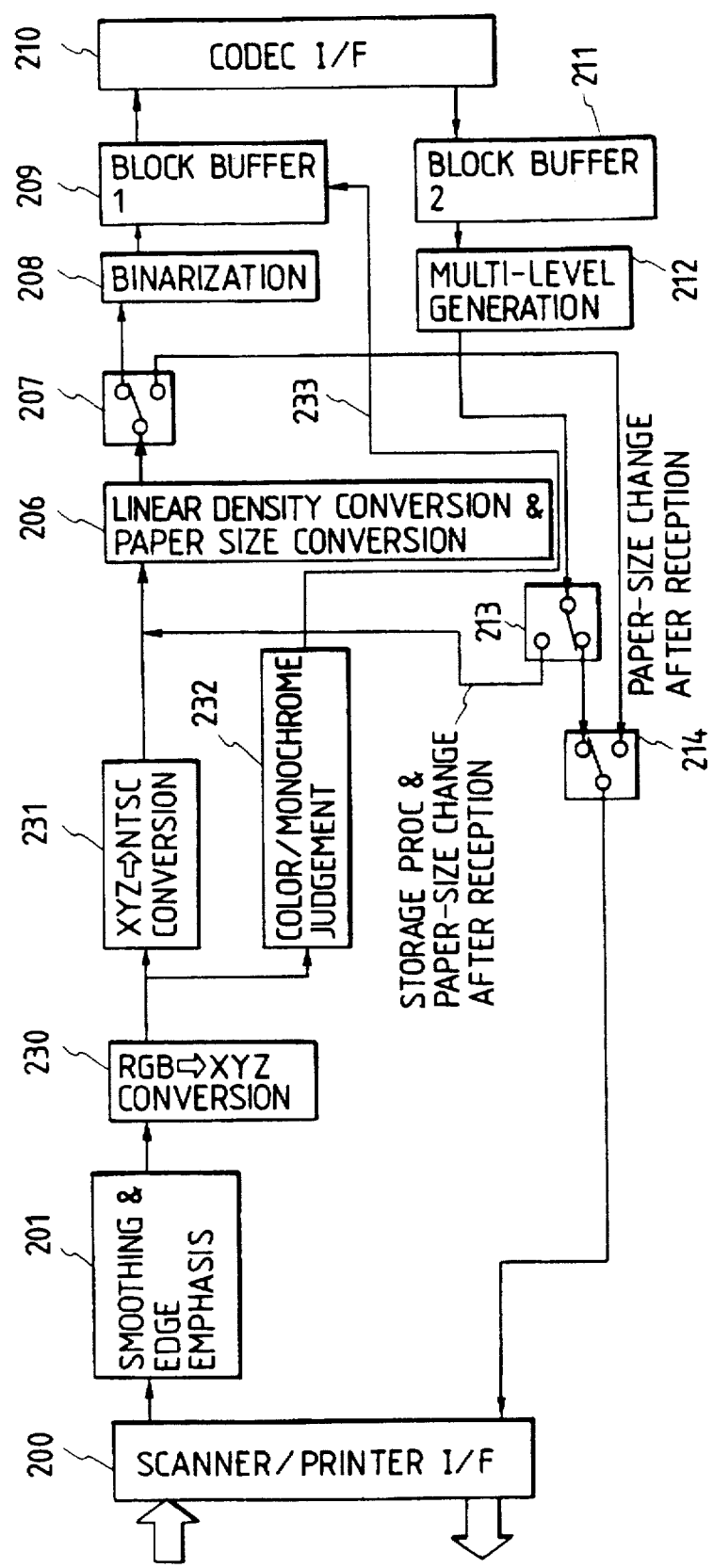

The raster scan has a form of line-by-line feed in the transversal direction from the head of paper. This is shown in FIG. 3-1C.

FIRST EMBODIMENT

FIG. 1 is a block diagram showing a first embodiment of the image processing unit.

Reference numeral 200 designates a scanner/printer interface, which deals with input and output of 8-bit multi-level image data for each of R, G and B, and also with operation commands and status data with respect to the scanner and printer.

Reference numeral 201 designates a smoothing and edge emphasis section. The degrees of smoothing and edge emphasis can be set from an image processing unit CPU (not shown).

Reference numeral 202 designates a conversion section for converting R, G and B data obtained from the scanner to NTSC standard R, G and B data. Through this conversion, NTSC standard R, G and B data are obtained from color data from the scanner. Equations for this conversion cannot be readily theoretically obtained, since the input R, G and B data are peculiar to the scanner. Empirically, however, equations (3-1) can be obtained for relating R, G and B data from the scanner to NTSC standard R, G and B data.

$$R_{NTSC} = a11 \cdot R_{scanner} + a12 \cdot G_{scanner} + a13 \cdot B_{scanner}$$
$$G_{NTSC} = a21 \cdot R_{scanner} + a22 \cdot G_{scanner} + a23 \cdot B_{scanner} \quad (3\text{-}1)$$
$$B_{NTSC} = a31 \cdot R_{scanner} + a32 \cdot G_{scanner} + a33 \cdot B_{scanner}$$

Although equations (3-1) are first order, it is possible to obtain second and third order equations as well.

Reference numeral 203 designates a gamma conversion section, and reference numeral 205 a color/monochrome conversion section for producing monochrome data from NTSC standard R, G and B data. For this conversion, a relation $$E_y = 0.30R + 0.59G \text{ and } 0.11B \quad (3\text{-}2)$$

determined for NTSC may be used to produce a luminance signal from a NTSC color television signal. Alternatively, since the luminance signal component is greatly influenced by G, it is possible to use the sole G signal as monochrome data. Although not shown, the image processing unit can pass image data without color/monochrome conversion.

Reference numeral 206 designates a linear density conversion and paper size conversion section for performing linear density conversion in the case of transmitting data of 200 or 100 dpi read out with 400 dpi by the scanner, and also paper size conversion in case of transmitting A4 original image in A3 size. For linear density conversion, partial passing of pixels, repetition, linear interpolation, projection, etc. may be used. Although not shown in FIG. 1, it is possible to pass image data without linear density conversion.

Reference numeral 207 designates a switch for supplying image data from the linear density conversion and paper size conversion section either to binarization section 208 or through switch 213 to the scanner/printer interface.

Reference numeral 208 designates a binarization section for converting 8-bit data for each of R, G and B to one-bit binary data for each color. For processing, pure binarization based on a fixed threshold value, dither process, error diffusion process, average density preservation process, etc. may be used.

Reference numeral 209 designates a block buffer for tentatively storing a predetermined quantity of binary image data. This block buffer can convert data obtained by reading with scanning peculiar to the scanner or printer to commonly termed raster scan system data by a method of generation of address of its component buffer memory.

Reference numeral 210 designates a CODEC interface with respect to binary data CODEC.

Reference numeral 211 designates a block buffer, which can tentatively store raster scan system binary data from the CODEC and change the scanning direction by a buffer memory address generation method similar to that of block buffer 209.

Reference numeral 212 designates a multi-level generation section for converting binary image data of R, G and B to 8-bit data for each color.

Reference numeral 213 designates a switch for supplying multi-level data either through scanner/printer interface 200 to the printer or to color/monochrome conversion section 205.

Reference numeral 214 designates a switch for selecting image data supplied to the scanner/printer interface in an interlocked relation to switches 207 and 213.

Operation of the First Embodiment

The operation of the first embodiment will now be described with reference to FIG. 1.

Because of the various operating parameters such as paper size, resolution, color/monochrome mode, etc., numerous operation patterns are possible. Since all of these patterns cannot be described, the following eight representative patterns will be taken.

In Pattern 1, an A3 size original is read out with color 400 dpi, compressed, temporarily stored in a hard disk and transmitted without changing the resolution or the paper size.

In Pattern 2, an A3 size original is read out with color 400 dpi, compressed, converted to A4 size 200 dpi monochrome data and stored in a hard disk before being transmitted.

In Pattern 3, an A3 size original is read out with color 400 dpi, stored once in hard disk HD shown in FIG. 2-2 and resolution converted to 200 dpi before being transmitted.

In Pattern 4, an image received in A4 size with 400 dpi is directly supplied to the printer.

In Pattern 5, an image received in A4 size with 200 dpi is resolution converted to 400 dpi before being supplied to the printer.

In Pattern 6, an image received in A4 size with 400 dpi is paper size converted to A3.

In Pattern 7, an A3 size original is copied.

In Pattern 8, an A3 size original is memory copied.

Now, each pattern of operation will be described.

Pattern 1: An A3 size original is read out with color 400 dpi, compressed, temporarily stored in a hard disk and transmitted without changing the resolution or the paper size.

This pattern is possible when both the source and destination can deal with an A3 size 400 dpi color image. The operation in this case will now be described.

Figures 2, 3, 4, 4B:
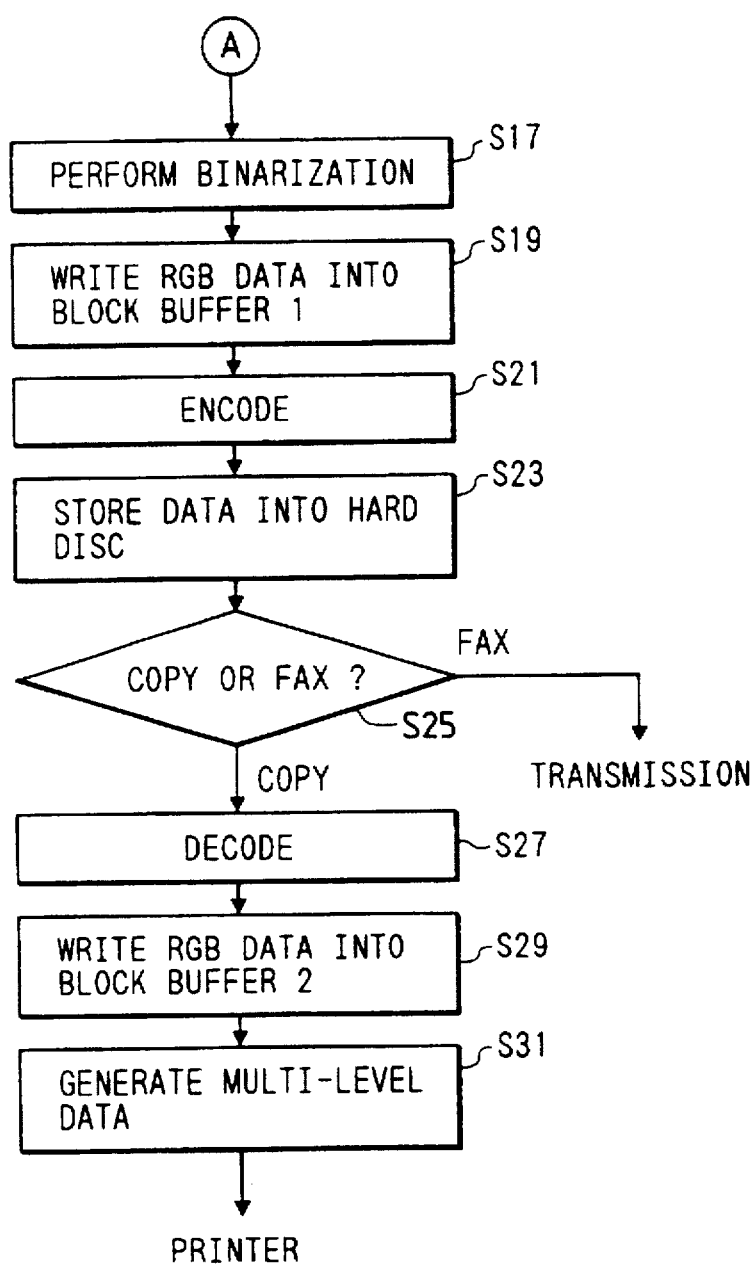

In the flow chart of FIG. 2-4, in check step S1, the routine flow branches to the facsimile side, and in step S3 a masking parameter of the color processing circuit in the scanner is set for facsimile. As for the flow of data at this time, when setting an original, the user checks whether a major portion of the original is a photograph portion or a character portion, and accordingly selects either photograph original or character original on the operation panel. If it is desired to change the density for transmission, density setting is done on the operation panel. The results of these operations are reflected on smoothing and edge emphasis section 201 and gamma conversion section 203, and the corresponding smoothing degree, edge emphasis degree and gamma table are selected. For example, in the case of the photograph original the smoothing degree is increased, while in case of a character original the edge emphasis degree is increased. Switch 207 is set to the side of the binarization section.

8-bit image data for each of R, G and B of the scanner, which is provided in the shuttle scan form from scanner/printer interface 200, are subjected to smoothing and edge emphasis as set in smoothing and edge emphasis section 201 (step S5), and converted to NTSC standard R, G and B in RGB (scanner) to RGB (NTSC) conversion section 202 (step S9).

Subsequently, gamma conversion section 203 provides output data which are preset with respect to input data. This conversion may be for density correction according to user's setting as noted above, or may be correction of a table for skipping the background of an original having a thin background color or deterioration of the light source.

Operation in color/monochrome conversion section 205 (step S13) and operation in linear density conversion and paper size conversion section 206 (step S15) are unnecessary in this case and hence are not executed. Thus, the output of section 206 is the same in quantity as NTSC standard R, G and B data after smoothing and edge emphasis when the original is read with 400 dpi.

The data supplied through switch 207 to binarization section 208 are then binarized (step S17) for reducing the data quantity. The binarization here is performed for reproducing intermediate tones through on-off control of dots in certain areas, and utilizes a commonly termed dither or error diffusion process.

The binary R, G and B data as obtained are written in the shuttle scan form into block buffer 209 (step S19).

This data may be supplied for compression encoding to the CODEC side in the raster scan form through control of the generation of address for the reading of data from the block buffer to the raster scan form. That is, the data can be supplied in a form in the standard communication line. The data are stored once in the hard disk and then transmitted (step S25).

Pattern 2: An A3 size original is read out with color 400 dpi, compressed, converted to A4 size 200 dpi monochrome data and stored in a hard disk before being transmitted.

This pattern is possible when a partner can deal with an A4 size 200 dpi monochrome image. The operation in this case will now be described.

The initial user's operations are the same as in the case of Pattern 1. In this case, switch 207 is connected to the binarization section side. The original has to be converted from A3 to A4 size. This is effected by utilizing a multiplying function of the scanner. Thus, image data converted to A4 size and 400 dpi are supplied to the image processing section.

Operations in scanner/printer interface 200 through gamma conversion section 203 are the same as in the case of Pattern 1, so their description is not given here.

Color/monochrome conversion section 205 provides monochrome data on the basis of the equations for generating a luminance signal from input NTSC standard R, G and B signals. Linear density conversion and paper size conversion section 206 converts input 400 dpi data to 200 dpi data through linear interpolation.

Operations after section 207 are the same as in the case of Pattern 1.

Pattern 3: An A3 size original is read out with color 400 dpi, stored once in the hard disk and resolution converted to 200 dpi for transmission.

For transmitting A3 size 400 dpi data, after image data are processed and temporarily stored in the hard disk as in Pattern 1, connection to the partner is effected, and conditions of communication are confirmed. If it is found at this time that the partner cannot receive 400 dpi data, it is inevitable to have to resort to 200 dpi data transmission. In this case, it is necessary to convert the resolution. Pattern 3 applies to this case.

Operations up to the temporary storage of A4 size original in the hard disk are executed after Pattern 1. Subsequently, A4 size 400 dpi color binary image data tentatively stored in the hard disk are converted to A4 size 200 dpi color binary image data. This operation will now be described.

The A4 size 400 dpi image data are transferred in raster scanner form from the hard disk through CODEC interface 210 to block buffer 211. These data are transferred to multi-level generation section 212 in the shuttle scan system by changing the call time address generation system.

Multi-level data thus produced are returned through switch 213 to the processing system consisting of sections 205 and 206. The data are passed without any processing through section 205, since color/monochrome conversion is unnecessary in this case, and are then converted to 200 dpi in linear density conversion and paper size conversion section 206.

Subsequently, like Patterns 1 and 2, the data are binarized and then supplied in raster scan form through the block buffer to the hard disk for temporary storage before transmission.

Pattern 4: An image received in A4 size with 400 dpi is directly transmitted to the printer.

This pattern applies to a case when data can be directly printed, regardless of whether the data are color or monochrome data. Received data are tentatively stored in the hard disk and then passed through CODEC interface 210 to be supplied in raster scan form to block buffer 211.

Subsequently, the data are supplied in shuttle scan form to multi-level generation section 212 and then supplied through switches 213 and 214 to scanner/printer interface 200.

Pattern 5: An image received in A4 size with 200 dpi is resolution converted to 400 dpi before being transmitted.

This pattern applies to a case where the resolutions of received data and that of the printer are different. The operation is the same as Pattern 4 until multi-level data are produced from the received data.

The data are subsequently returned through switch 213 to color/monochrome conversion section 205 and linear density conversion and paper size conversion section 206. After resolution conversion, the data are supplied through switches 207 and 214 to the printer side.

Pattern 6: An image received in A4 size with 400 dpi is paper size converted to A3.

In this case, like Pattern 5, the image size is enlarged from A4 and A3 in linear density conversion and paper size conversion section 206 before being supplied to the printer side.

Pattern 7: An A3 size original is copied.

In this pattern, the routine flow branches to copy side (step S2) in check step Si in the flow chart of FIG. 2-4. In step S2, the masking parameter in the color processing circuit in the scanner is set to copy. Further, the routine branches in step S4 to the normal copy side, and data read out by the scanner are supplied to the printer. As for the data flow in this case, when an A3 size original is set on the original base of scanner 109 in FIG. 2-2 and a copy start instruction is given from operation panel 112, CPU 100 receiving the copy start signal gives a copy start instruction to the sub-CPU (not shown) in image processing unit 108. The sub-CPU in image processing unit 108 receiving the copy start signal supplies a copy start command to the scanner and printer. Multi-level image data read out by the scanner are scan-by-scan converted to the color processing and binarizing circuit in the scanner to be color matched to the characteristics of the printer. After binarization, the data are supplied to printer 110 for ink jet recording.

Pattern 8: An A3 size original is memory copied.

The routine flow branches to copy side (step S2) in step S1 in the flow chart of FIG. 2-4, and the masking parameter in the color processing circuit in the scanner is set to copy. Then, in step S4, the flow branches to the memory copy side. As for the flow of data, when an A3 size original is set on the original base of scanner 109 and a memory copy instruction is given from operation panel 112, CPU 100 receives the memory copy start signal, and the sub-CPU in image processing unit 108 supplies a read start command to the scanner. Multi-level image data read out from the scanner are 8-bit data for each of the three colors read out by R, G and B filters in the scanner. Data from the scanner are received by scanner/printer interface 200 and smoothed and edge emphasized in section 201 (step S5). In the memory copy operation, unlike the transmission operation, conversion of data to NTSC standard R, G, and G is unnecessary, and thus data are passed without any processing through RGB (scanner) to RGB (NTSC) conversion section 202 (step S7). Data from section 202 are gamma converted in section 203 (step S11), monochrome converted in section 205 (step S13) if a monochrome conversion instruction is provided, and resolution converted in section 206 (step S15) if a resolution conversion instruction is provided. After binarization in section 208 (step S17), the data are converted in block buffer 1-209 to raster scan form (step S19), supplied through CODEC interface 210 to the CODEC for encoding (step S21) and memory stored in the hard disk (step S23). Subsequently, data in the memory are decoded under control of a command from CPU 100 (step S27) and supplied through CODEC interface 210 to block buffer 2-211. Block buffer 2-211 executes conversion to an operating form matched to the printer (step S29), and the binary image data are converted to multi-level data in multi-level generation section 212 (step S31), and supplied through scanner/printer interface 200 to the scanner. In the scanner, color processing and binarization matched to the recording characteristics of the printer are performed, and the resultant binary data are supplied to the printer for ink jet recording. When producing a plurality of copies, no scanning is necessary, and only data stored in the hard disk may be read out again.

SECOND EMBODIMENT

FIG. 3-2 is a block diagram showing a second embodiment of the image processing unit.

Only those portions of this embodiment that differ structurally from the first embodiment will be described. Instead of linear density conversion and paper size conversion section 206 in the first embodiment shown in FIG. 1, in the second embodiment resolution conversion section 220 and paper size conversion section 221 are provided. Resolution conversion section 220 converts 400 dpi to 200 or 100 dpi, and functions only to reduce the size to ½ or ¼. Thus, it is possible to partly provide pixels. Paper size conversion section 221 has a large number of different multiplication factors, and a processing corresponding to a given multiplication factor is necessary.

Operation of the Second Embodiment

The operations of Patterns 1-6, discussed above with respect to the first embodiment, will now be described, placing emphasis on the differences in operation.

Pattern 1: An A3 size original is read out with color 400 dpi, temporarily stored in the hard disk and supplied without changing the resolution or the paper size.

In this case, there is no difference since neither the resolution nor the paper size is converted. 8-bit multi-level data for each of R, G and B supplied from scanner/printer interface 200 are smoothed and edge emphasized in section 201, and converted in section 202 to NTSC standard R, G and B. Then, if necessary, the data are density converted in section 203. The data are passed without any processing though sections 205 and 206, binarized in section 208 and written in block buffer 209.

Pattern 2: An A3 size original is read out with color 400 dpi, converted to A4 size 200 dpi monochrome data and stored in the hard disk before being transmitted.

The difference in pattern is the use of resolution conversion section 220 for conversion of the resolution from 400 to 200 dpi. NTSC standard signals for R, G and B are provided from section 203, converted in section 205 to luminance signals and resolution converted in section 220. The processing of the resolution conversion may be based on a partial supply method of taking out one pixel for every two pixels or the like, a method of converting the image density while effecting linear interpolation or a projection method. The subsequent operation will not be described.

Pattern 3: An A4 size original is read out with color 400 dpi, temporarily stored in the hard disk and resolution converted to 200 dpi before being transmitted.

Once again, in this case the operation is substantially the same as in the first embodiment, with the resolution/paper size conversion section of the first embodiment being replaced with resolution conversion section 220.

Pattern 4: An image received in A4 size with 400 dpi is directly transmitted to the printer.

In this case, the operation is the same as in the first embodiment, since no processing is executed in paper size conversion section 221.

Pattern 5: An image received in A4 size with 200 dpi is transmitted after conversion of resolution to 400 dpi.

In this case, raster scan form data written in block buffer 2-211 from CODEC interface 210 are subjected to multi-level generation processing in section 212 by increasing the data quantity to be compatible with 400 dpi. To this end, the same pixel is read out twice in shuttle scan form with a read time address generation system. Subsequently, the data are passed without processing through paper size conversion section 221 to the printer.

As an alternative method, each pixel is read out only once from block buffer 2-211, and the number of pixels is doubled in the horizontal and vertical directions in the paper size conversion section.

The difference between these two operations is as follows. The method of executing the reading of data from the block buffer twice concerns repetition of pixels in binary data, while the method of interpolation in the paper size conversion section deals with multi-level data. Generally, interpolation with multi-level data permits a higher quality conversion to be obtained.

Pattern 6: An image received in A4 size with 400 dpi is paper size converted to A3.

Where paper size conversion is involved, data after the multi-level generation processing are paper size converted in paper size conversion section 221 to a paper size capable of printing in the printer, and are then supplied to the printer.

THIRD EMBODIMENT

FIG. 3-3 is a block diagram showing a third embodiment of the image processing unit.

Only those portions of this embodiment that differ structurally from the first embodiment will be described. Instead of RGB/RGB conversion section 202 in the first embodiment shown in FIG. 1, in the third embodiment RGB/XYZ conversion section 230 and XYZ/RGB conversion section 231 are provided. In addition, color/monochrome judgement section 232 is provided. RGB/XYZ conversion section 230 converts RGB data obtained by using a scanner's own light source or an optical system such as filters to XYZ data, usually through table look-up.

XYZ/RGB conversion section 231 calculates NTSC standard R, G and B from XYZ data. The calculation is performed according to NTSC standards. Color/monochrome judgement section 232 judges whether a read-out original is color or monochrome. The judgement is effected from the value of color information obtained from X, Y and Z values.

Operation of the Third Embodiment

Operation will now be described in connection with a case where color/monochrome judgement is effected automatically at the time of transmission.

Pattern: An A4 size monochrome original is read out with color 400 dpi, temporarily stored in a hard disk and transmitted as a monochrome image as a result of a color/monochrome judgement.

A4 size 400 dpi color data are supplied through scanner/printer interface and smoothing and edge emphasis section 201 to RGB/XYZ conversion section 230 for conversion to XYZ data. The result is converted in XYZ/RGB conversion section 231 to NTSC standard signals of R, G and B. The subsequent operation is the same as in the first embodiment.

Color/monochrome judgement section 232 calculates the color degree from the values of X, Y and Z and judges whether the original is a color or monochrome original from the results of calculation.

If the result of the judgement in color/monochrome judgement section 232 executed after reading one sheet of the original into the hard disk indicates that the original is monochrome, the temporarily stored color data are supplied through block buffer 2-211 to multi-level generation section 212 to obtain multi-level data, which are then supplied through switch 213 to color/monochrome conversion section 205 for conversion to monochrome on the basis of an equation of the NTSC standard luminance signal. The data are then binarized and stored in the hard disk.

Color/Monochrome Conversion Section

This section calculates black component K as $$K = 0.30 R_{NTSC} + 0.59 G_{NTSC} + 0.11 B_{NTSC}$$

which is approximately shown as $(\frac{1}{4} + \frac{1}{16})R + (\frac{1}{2} + \frac{1}{16})G + (\frac{1}{8})B$ (one lower bit of $R$+two lower bits of $G$)

The final correction is done for providing K=255 when (R, G, B)=(255, 255, 255)

Color/monochrome judgement in section 232 as noted above is realized with a construction of the color/monochrome judgement section shown in the first and second embodiments, as will be described later.

The result of color/monochrome judgement is provided to judgement signal line 233. This signal is "1" if a color original is judged and is "0" if a monochrome original is judged. The signal on judgement signal line 233 is supplied to color/monochrome conversion section 205 for conversion according to judgement signal, as will be described below.

Figures 3, 4, 5:
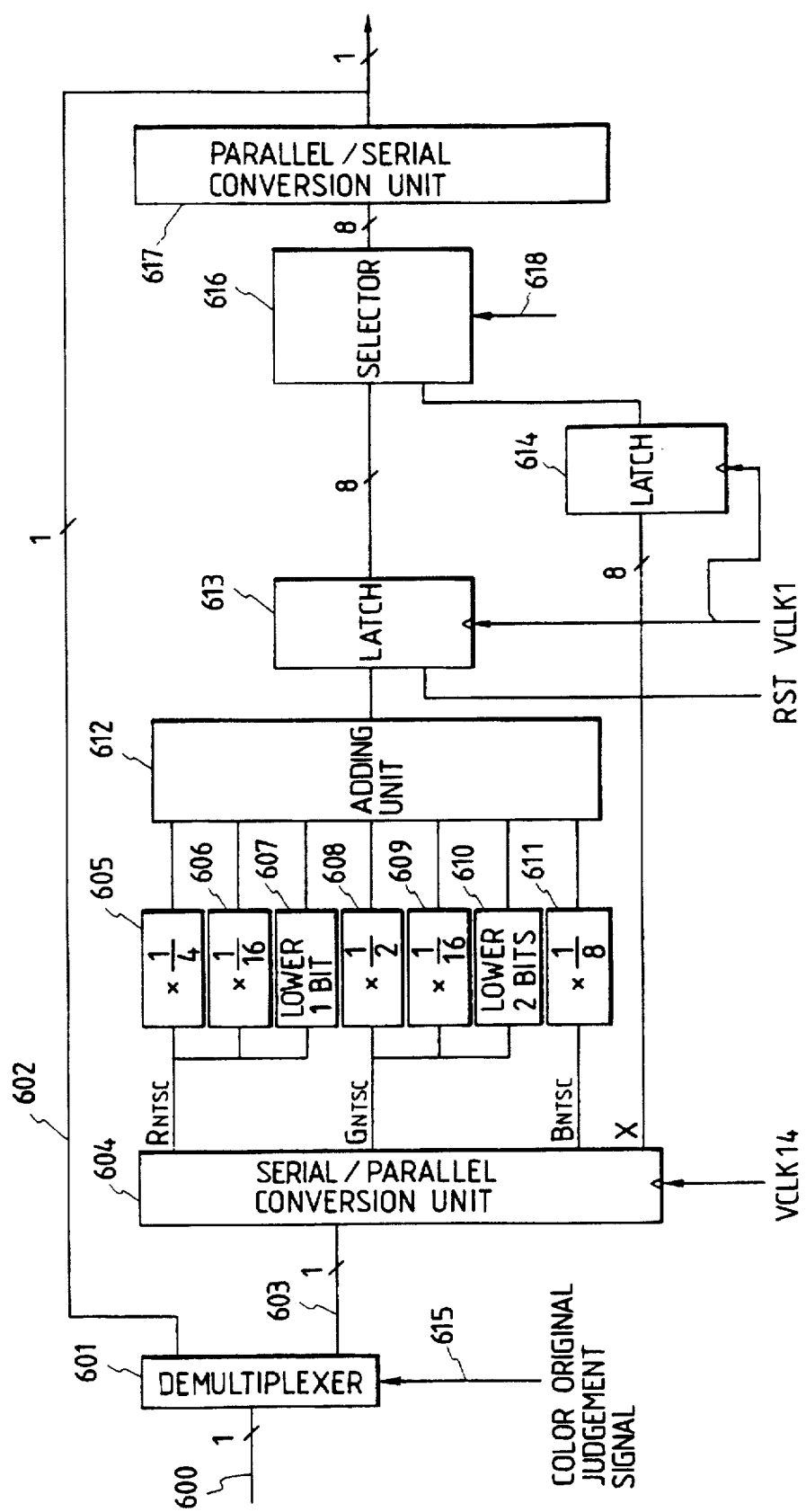

FIG. 3-5 shows an example of a circuit that can perform the above calculation.

Reference numeral 600 designates a data signal line, to which the output of section 231 is supplied. Demultiplexer 601 switches processing-free line 602 and processing line 603 according to color original judgement signal 615.

More specifically, if it is judged that an original is a color original, the image signal is led to line 602. If it is judged that an original is a monochrome original, the image signal is led to line 603 for monochrome conversion. Reference numeral 604 designates a serial/parallel conversion unit to convert serial data of image to parallel data. This unit is synchronized to VCLK14 shown in FIG. 3-6. R, G, and B data of DATA shown in FIG. 3-6 are supplied after shifting through bit shift circuits 605 and 611 to adding unit 612. Thus, the outputs of all of circuits 605 and 611 are added together to produce luminance signal Y. Data X of DATA shown in FIG. 3-6 are not processed at all, but are held in latch 614 in synchronism with the rising of signal VCLK1.

The operation of latch 613 will now be described. Latch 613 latches data in synchronism with the rising of signal VCLK1. Signals from latches 614 and 613 are supplied to selector 616, which selects one of these input signals according to control signal 618. More specifically, in the timing of DATA shown in FIG. 3-6, the data in latch 613 are selected during the period of data R, G and B, and data in latch 614 are selected during the period of data X. Parallel/serial conversion unit 617 recovers original serial data. The output data at this time are monochrome data as shown in ① in FIG. 3-7.

If latch 613 is reset to latch "0" at the timing of RST in the time chart of FIG. 3-6, the output data can be converted to data as shown in ② in FIG. 3-7, consisting of Y, O, O and X.

FOURTH EMBODIMENT

FIG. 3-4 is a block diagram showing a fourth embodiment of the image processing unit.

Those portions of this embodiment that differ structurally from the first embodiment will now be described. Instead of RGB/RGB conversion section 202 in the first embodiment shown in FIG. 3-2, in the fourth embodiment RGB/XYZ conversion section 230 and XYZ/RGB conversion section 231 are provided. In addition, color/monochrome conversion section 232 is provided.

RGB/XYZ conversion section 230 converts RGB data obtained with a scanner's own light source or an optical system such as filters to XYZ data, usually through table look-up.

XYZ/RGB conversion section 231 calculates NTSC standard signals of R, G and B from the XYZ data. The calculation is carried out in conformity with NTSC standards. Color/monochrome judgement section 232 judges whether a read-in original is a color or monochrome original. The judgement is effected from a value of color degree obtained from the values of X, Y and Z.

Operation of the Fourth Embodiment

Operation will now be described in connection with a case where color/monochrome judgement is effected automatically at the time of transmission.

Pattern: An A4 size monochrome original is read out with color 400 dpi, temporarily stored in a hard disk and transmitted as a monochrome image as a result of a color/monochrome judgement.

A4 size 400 dpi color data are supplied through scanner/printer interface 200. The data are supplied through smoothing and edge emphasis section 201 to RGB/XYZ conversion section 230 for conversion to XYZ data. The result is supplied to XYZ/RGB conversion section 231 for conversion to NTSC standard signals of R, G and B. Subsequent operation is the same as in the first embodiment. Meanwhile, color/monochrome judgement section 232 calculates color degree data from the values of X, Y and Z and judges whether the original is a color or monochrome original from the result of judgement.

If color/monochrome judgement section 232 provides a judgement of a monochrome original after reading one sheet of the original into the hard disk, the temporarily stored color data are supplied through block buffer 2-211 to multi-level generation section 212 to produce multi-level data, which are supplied through a switch to block buffer 1-209 for conversion to monochrome. Then, the data are binarized and stored in the hard disk.

The color/monochrome judgement in section 232 is realized with a structure of color/monochrome judgement section in the first and second embodiments as shown in FIG. 4-1-1, and as will be described later.

The result of the color/monochrome judgement is provided to judgement signal line 233. Signal "1" is provided if a color original is judged, while signal "0" is provided if monochrome original is judged. The signal on judgement signal line 233 is supplied to block buffer 209, and according to the judgement signal block buffer 209 performs color/monochrome conversion, as will be described below.

A color facsimile transmission in the above embodiment will now be described.

Either of the following two cases are possible:

(1) a case where the partner is a color facsimile system; and (2) a case where the partner is a monochrome facsimile system (such as a G4 apparatus).

Whether the partner can accept color or can accept monochrome alone is determined by protocol by connecting the facsimile to the network and confirming the partner as destination.

In the procedure according to the invention, the source side, i.e., the side from which an original is to be transmitted, reads the original once as color original and stores the read-out data after color compression (steps S02 to S10 in FIG. 3-9).

Then, the source facsimile is connected to the partner's facsimile (step S13), and the kind of the facsimile is identified (step S15). If the partner's facsimile is a color facsimile, data transmission is executed directly (steps S19 to S34). If the partner's facsimile is a monochrome facsimile, the following processing is executed. First, switch 213 is switched to the upper side in the Figure (as shown in FIG. 3-8). Then, the following steps are executed:

(1) Color compressed data are read out again (step S21).

(2) Data are passed to the line as receiving side processing unit. That is, color recovery data are produced (step S23).

(3) Multi-level data are produced through the block buffer 2 (step S25).

(4) Data are supplied by switching to the color/monochrome conversion section in the transmitting side processing flow.

(5) Color image data are converted to monochrome image data (step S27).

(6) Data are supplied through the binarization section and block buffer 1 to the compression section (step S29).

(7) The compression section is provided with switching between MM2 as a compression process for color facsimile and MMR as a compression process for monochrome facsimile, as shown in FIG. 2-3. In the instant flow, the switch is set to the side of MMR (step S31).

(8) Image data are transmitted after compression in MMR to the partner's monochrome facsimile.

In the above procedure, the instant source facsimile can automatically match the kind of the partner's facsimile for transmission of compressed image data.

A flow of image data in the above processing matched to the partner's function is shown in FIG. 3-11.

Now, the individual sections of image processing unit in the above embodiment will be described.

Smoothing Section

FIG. 4-1-1 shows the construction of a smoothing section in section 201 noted above. FIG. 4-2-1 shows an example of a smoothing matrix. In this instance, the weight of the center pixel is either 1, 2, 3 or 4, and the weight of the edge pixels is 1. FIG. 4-1-3 shows a pixel array.

Referring to FIG. 4-1-1, reference numeral 400 designates an adding section which calculates the sum of contents of eight pixels (a to i) of the 3-by-3 matrix except for the center pixel. Reference numeral 401 designates a section for weighting the center pixel. Where weighting factor N is selectable from powers of 2, as in this example, section 401 can be constituted by sole bit shifts. Reference numeral 402 designates an adder.

Reference numeral 403 designates a divider for dynamic range matching between input image data and the result of the smoothing. Divisor M is M=8+N (where N is the weighting factor of the center pixel).

In this example, $\frac{1}{9}$, $\frac{1}{10}$, $\frac{1}{12}$ and $\frac{1}{16}$ are calculated. Taking $\frac{1}{9}$ as an example, it is approximated as:

⅑=0.111111÷0.109375=¹⁴/₁₂₈.

By setting ¹⁴/₁₂₈=⁸/₁₂₈+⁴/₁₂₈+²/₁₂₈=¹/₁₆+¹/₃₂+¹/₆₄, it is possible to simply constitute ¹/₁₆, ¹/₃₂ and ¹/₆₄ with 4, 5 and 6 bit shifts, respectively.

The weighting factor N of center pixel P is determined from a present degree of smoothing. When N is determined, the divisor of the divider is also determined as in the equation noted above.

When adding section 400 receives data input for 3 lines necessary for processing in the 3×3 matrix, it executes addition of the contents of the edge pixels. In the case of FIG. 4-1-1, the sum is Sum1=a+b+c+d+e+f+g+h+i.

Section 401 executes the weighting of center pixel P. Adder 402 adds the two results. In the Figure, a sum Sum2=Sum1+N×P is obtained, and divider 403 provides a smoothing output as Sum2/M.

Edge Emphasis

FIG. 4-2-1 shows the construction of an edge emphasis section in section 201 noted above. FIG. 4-2-2 shows an example of an edge emphasis matrix. FIG. 4-2-3 shows a pixel array.

Reference numeral 410 designates an adding section for calculating the sum of contents (a to i) of the eight pixels in 3×3 matrix, except for the center pixel.

Reference numeral 411 designates a code inversion circuit.

Reference numeral 412 designates a section for performing center pixel weighting multiplication. In this example, the weighting factor is 8, which is a power of 2. Therefore, the section can be constituted only by bit shifts. Reference numeral 413 designates an adder.

Reference numeral 414 designates a weighting circuit for performing a weighting of from 0 to a number less than one. This section, like the smoothing section, can use only the results of bit shifts of ½, ⅛ and ¹/₁₆.

Offset setting section 415 compares an output from circuit 414 to an offset value preset from the CPU. If the absolute value of the output of circuit 414 is not less than the offset value, section 415 provides the offset value. If the absolute value of the output of circuit 414 is greater than the offset value, the output of circuit 414 is provided.

Reference numeral 416 designates a selector for selecting either the result of smoothing or the value of the center pixel, which is not processed at all. Reference numeral 417 designates an adder.

The weighting factor N of center pixel P is determined from a present degree of smoothing. When N is determined, the divisor of the divider is also determined.

When adding section 410 receives data input for three lines necessary for processing in the 3×3 matrix, it performs addition of the contents of the edge pixels. In the case of FIG. 4-2-1, the sum is Sum0=a+b+c+d+e+f+g+h+i.

Its sign is inverted by inverter 411. In addition, circuit 412 weights the value of center pixel P eight times. Adder 413 adds the two results. In the Figure, the sum is Sum1=8×P−Sum0.

Sum1 represents the edge quantity. Weighting circuit 414 executes predetermined weighting of the edge quantity.

Designated at 415 is an offset circuit for ignoring all edge quantities less than the offset value.

Reference numeral 416 designates a selector for selecting either the result of smoothing or the value of the center pixel, which is not processed at all. Adder 417 adds the edge quantity from circuit 415 to the result of the selection. Although not shown, an upper and lower clipping is performed to accommodate the result of calculation in dynamic range of between 0 and 255.

RGB (SCANNER) TO RGB (NTSC) CONVERSION SECTION

This section converts RGB data supplied from the scanner to NTSC standard RGB data. The conversion may be done with the following first order equation.

$$\begin{pmatrix} R_{NTSC} \\ G_{NTSC} \\ B_{NTSC} \end{pmatrix} = \begin{pmatrix} a_{11} & a_{12} & a_{13} \\ a_{21} & a_{22} & a_{23} \\ a_{31} & a_{32} & a_{33} \end{pmatrix} \begin{pmatrix} R_{SCANNER} \\ G_{SCANNER} \\ B_{SCANNER} \end{pmatrix} \quad (4\text{-}3\text{-}1)$$

Alternatively, the following second order equation may be used:

$$\begin{pmatrix} R_{NTSC} \\ G_{NTSC} \\ B_{NTSC} \end{pmatrix} = \begin{pmatrix} a_{11} & a_{12} & a_{13} & a_{14} & a_{15} & a_{16} & a_{17} & a_{18} & a_{19} & a_{110} \\ a_{21} & a_{22} & a_{23} & a_{24} & a_{25} & a_{26} & a_{27} & a_{28} & a_{29} & a_{210} \\ a_{31} & a_{32} & a_{33} & a_{34} & a_{35} & a_{36} & a_{37} & a_{38} & a_{39} & a_{310} \end{pmatrix} \begin{pmatrix} R \\ G \\ B \\ R^2 \\ G^2 \\ B^2 \\ RG \\ RB \\ GB \\ 1 \end{pmatrix} \quad (4\text{-}3\text{-}2)$$

Factor $a_{ij}$ in equations (4-3-1) and (4-3-2) can be obtained experimentally.

Structural Example 1

Circuit structure for implementing calculations after equation (4-3-1) or (4-3-2) will now be described.

It is assumed that actual values given in the form of equation (4-3-1) are:

$$\begin{pmatrix} R_{NTSC} \\ G_{NTSC} \\ B_{NTSC} \end{pmatrix} = \begin{pmatrix} 1.13919 & -0.05553 & -0.05025 \\ -0.23689 & 1.55723 & -0.20177 \\ -0.14123 & -0.23522 & 1.46845 \end{pmatrix} \begin{pmatrix} R_{SCANNER} \\ G_{SCANNER} \\ B_{SCANNER} \end{pmatrix} \quad (4\text{-}3\text{-}3)$$

For performing the matrix operation, the factors are approximated in the form of addition of the inverse of a power of 2. Thus, $$R_{NTSC} = 1.13919 R_{SCANNER} - 0.05553 G_{SCANNER} - 0.05025 B_{SCANNER} \quad (4\text{-}3\text{-}4)$$

$$= 1.1328125 R_{SCANNER} - 0.0546875 G_{SCANNER} - 0.046875 B_{SCANNER}$$

$$= \left(1 + \frac{1}{2} + \frac{1}{128}\right) R_{SCANNER} - \left(\frac{1}{32} + \frac{1}{64} + \frac{1}{128}\right) G_{SCANNER} - \left(\frac{1}{32} + \frac{1}{64}\right) B_{SCANNER}$$

Structure

FIGS. 4-3-1 shows an example of implementation of this equation with bit shifters, adders and a code inversion circuit. The Figure shows only the circuit for $R_{NTSC}$. Similar circuits may be provided for the other colors. That is, circuits for R, G and B should be provided in parallel.

Reference numerals 400 to 407 designate bit shifters, 408 to 411 and 413 adders, and 412 a code inversion circuit.

Operation

The factors of R in equation (4-3-4) are obtained in circuits 400 to 402 and 408, the factors of G are obtained in circuits 403 to 405 and 409, and the factors of B are obtained in circuits 406 to 407 and 410. The sum of the results of circuits 409 and 410 is code inverted. The sum of the code inversion result and the result from circuit 408 are taken in circuit 413 to obtain $R_{NTSC}$.

Structural Example 2

Equation (4-3-4) can be modified to read:

$$R_{NTSC} = \left(1 + \frac{1}{2} + \frac{1}{128}\right) R_{SCANNER} - \left(\frac{1}{32} + \frac{1}{64} + \frac{1}{128}\right) G_{SCANNER} - \left(\frac{1}{32} + \frac{1}{64}\right) B_{SCANNER} \quad (4\text{-}3\text{-}4)$$

$$= R_{SCANNER} + \frac{1}{2} R_{SCANNER} - \frac{1}{32} (G_{SCANNER} + B_{SCANNER}) - \frac{1}{64} (G_{SCANNER} + B_{SCANNER}) + \frac{1}{128} (R_{SCANNER} - G_{SCANNER})$$

Structure

FIGS. 4-3-2 shows the structure in this example. Reference numerals 420 and 423 designate code inversion circuits, 421 and 422 adders, 424 to 428 bit shifters, and 429 an adding circuit.

Operation

Adder 422 adds the result of the inversion of G from circuit 420 and R to obtain R−G. Adder 421 calculates R+G, which is inverted in circuit 423 to obtain −(G+B). These data are shifted in bit shifters 424 to 428, and the results are added together in adding circuit 429 to obtain $R_{NTSC}$.

Structural Example 3

Structure

The result of the calculation of equation (4-3-1) or (4-3-2) is provided directly to ROMs or RAMs (430 to 432). The memory quantity per color is 16 Mbytes (i.e., $2^{24} \times 8$ bits).

Operation

RGB data from the scanner are given as corresponding ROM or RAM addresses, and the result of calculation is read out as data.

Structural Example 4

Contents of processing

When performing calculation of equation (4-3-1) or (4-3-2), the results of the calculation concerning the upper 5 bits of RGB data from the scanner are provided as a first table to the ROMs or RAMs. The memory quantity per color is 32 Kbytes (i.e., $2^{15} \times 8$ bits). For the lower 3 bits, a second correction table is provided for each color. These tables are given as:

$$r' = a_{11} \times r$$

$$g' = a_{22} \times g$$

$$b' = a_{33} \times b \quad (4\text{-}3\text{-}3)$$

The output results from the two tables are added together.

Structure

FIG. 4-3-4 shows the structure. Reference numerals 433 to 435 designate RAMs or ROMs with 15 address bits and 8 data bits. The results of the calculation of equation (4-3-1) or (4-3-2) are stored in advance in these ROMs or RAMs. Reference numerals 436 to 438 designate RAMs or ROMs with 3 address bits and 4 data bits. The results of the calculation of equation (4-3-1) are stored in these ROMs or RAMs. Adders 439 to 441 add the outputs of the two different tables for the respective colors.

Operation

RGB data from the scanner are divided into an upper 5 bits and a lower 3 bits. The upper 5 bits for each of R, G, and B (15 bits in total) are provided as addresses to tables 433 to 435. Thus, 8-bit data are obtained for each of R, G and B. The lower 3 bits are provided as addresses to tables 436 to 438 for each color. Thus, 4-bit data are obtained for each color. Adders 439 to 441 add the outputs of the two tables for each of the respective colors of R, G and B.

GAMMA CONVERSION SECTION

Gamma conversion section 203 will now be described. This section has the following 8-bit conversion tables corresponding to $R_{NTSC}$, $G_{NTSC}$ and $B_{NTSC}$, respectively.

$$R_{NTSC}' = f(R_{NTSC})$$

$$G_{NTSC}' = f(G_{NTSC})$$

$$B_{NTSC}' = f(B_{NTSC})$$

Structural Example 1

Structure

FIG. 4-4-1 shows the structure. Tables 500 to 502 are ROMs, each with 12 address bits and 8 data bits (i.e., 4 Kbytes). Of the 12 address bits, 8 bits are provided for $R_{NTSC}$ (or $G_{NTSC}$ or $B_{NTSC}$) and 4 bits for a table selection signal.

Operation

A density value set by the user on the operation panel is converted by the CPU to a 4-bit table selection signal which is supplied as upper address bits to the ROMs. 8-bit data after correction are obtained from input R, G and B data and the table selection signal.

Structural Example 2

The tables are RAMs capable of rewriting from the CPU. Otherwise, the structure is the same as Structural Example 1.

Structure

FIG. 4-5-1 shows the structure. Reference numerals 501 to 508 designate latches, and 509 to 511 RAMS with 12 address bits and 8 data bits.

Operation

During normal image processing, the outputs of latches 507 and 508 are disabled, and the operation is the same as in Structural Example 1. In the case of altering the table contents from the CPU, the outputs of latches 503 to 505 are disabled, and an address generated from the CPU and data representing the altered contents are latched into latches 507 and 508, respectively, and written to the RAMs under control of WR signal.

RESOLUTION/PAPER SIZE CONVERSION SECTION

Multiplication (or density conversion) is effected by linear interpolation. First, one-dimensional linear conversion will be described. Referring to FIG. 4-6-1-, the height of point y corresponding to a given point x is obtained by linear approximation using points X1 and X2 on opposite sides of point x and heights Y1 and Y2 corresponding respectively to points X1 and X2. The height of point y can be calculated using equation (4-6-1):

$$Y = Y_1 + \frac{Y_2 - Y_1}{L_1 + L_2} L_1 = \frac{Y_2 L_1 + Y_1 L_2}{L_1 + L_2} \qquad (4\text{-}6\text{-}1)$$

where L1 and L2 are lengths determined by points x, X1 and X2. It will be seen from equation (4-6-1) that the value of the height of point y is the sum of the products of the height and the length of the sets on the opposite sides of point x.

This first order example will now be extended to a second order example. Referring to FIG. 4-6-2, given point q and four points p1 to p4 surrounding point q define areas A, B, C and D. The value of q in this case is the sum of the products of each area and the value of the associated pixel on the side of the area opposite point q. This value is given as $$q = \frac{p1D + p2D + p3D + p4D}{A + B + C + D} \qquad (4\text{-}6\text{-}2)$$

Equation (4-6-2) is referred to as equation of linear interpolation.

Now, area calculation using equation (4-6-2) when determining values of pixels after conversion will be described.

Referring to FIG. 4-6-3, if the inter-pixel distance of an original image in X direction is 512, the inter-pixel distance K after conversion is:

$$K = 512 \cdot 100/Z_x \qquad (4\text{-}6\text{-}3)$$

where $Z_x$ is the magnification. The distance x to i-th (index 1) pixel after conversion is:

$$x = K \cdot i + K/2 \qquad (4\text{-}6\text{-}4)$$

Denoting the index of the original image on the original side of point x by m0, $$m0 = (x - 256)/512 \text{ (rounded off)} \qquad (4\text{-}6\text{-}5)$$

The distance $x_{mo}$ from origin to index m0 is:

$$X_{mo} = 512 \times m0 + 256 \qquad (4\text{-}6\text{-}6)$$

The length of line segment L1 is:

$$L1 = x - x_{mo} \qquad (4\text{-}6\text{-}7)$$

L1 ranges from 0 to 512, but it can reduce bits in the area calculation. For example, if $$L1 = L1 \times {}^{16}\!/_{512} = L1 > 5 \text{ 5-bit shift} \qquad (4\text{-}6\text{-}8)$$

L is 0 to 16 and corresponds to 4 (or 5) bits. In this case, L2 is $$L2 = 16 - L1 \qquad (4\text{-}6\text{-}9)$$

Assuming that L is obtained in the x and y directions as Lx1, Lx2, Ly1 and Ly2, the area A is:

$$A = Lx1 \cdot Ly1 \qquad (4\text{-}6\text{-}10)$$

That is, the area takes 4 (or 5) bits by 4 (or 5) bits, i.e., 8 (or 9) bits. Also, since $$L1 + L2 = 16 \qquad (4\text{-}6\text{-}11)$$

the divisor of equation (4-6-2) is 256. Thus, the division can be realized with an 8-bit shift.

Structure

Figures 3, 4, 5, 6:
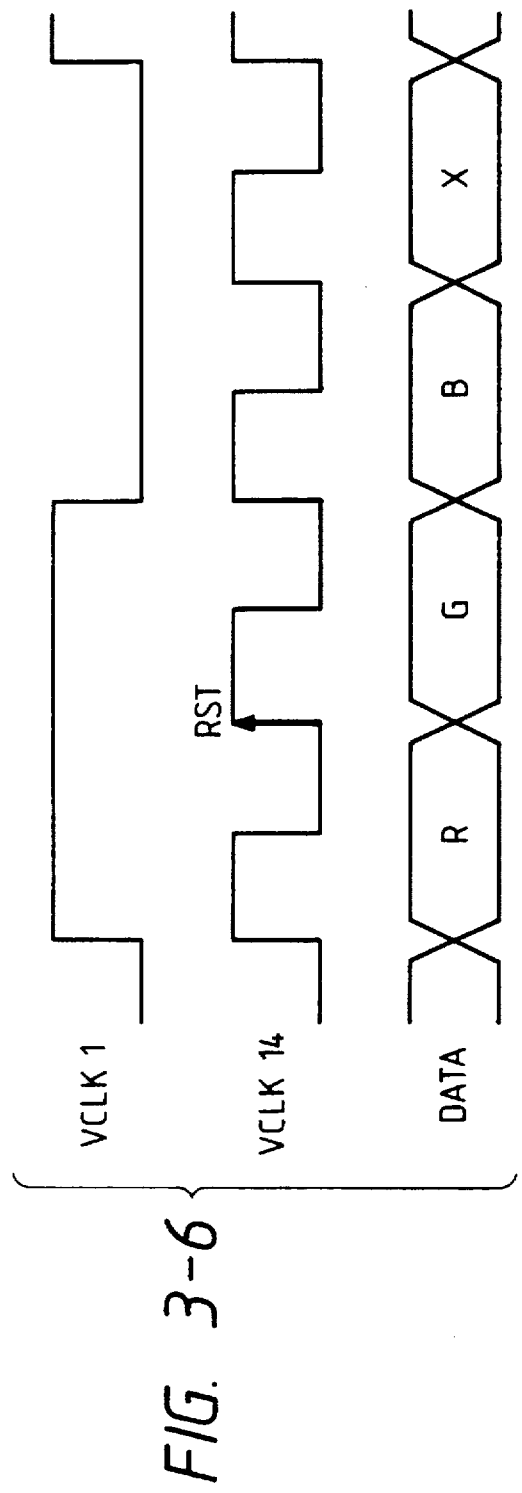
Figures 3, 4, 5, 6, 7:
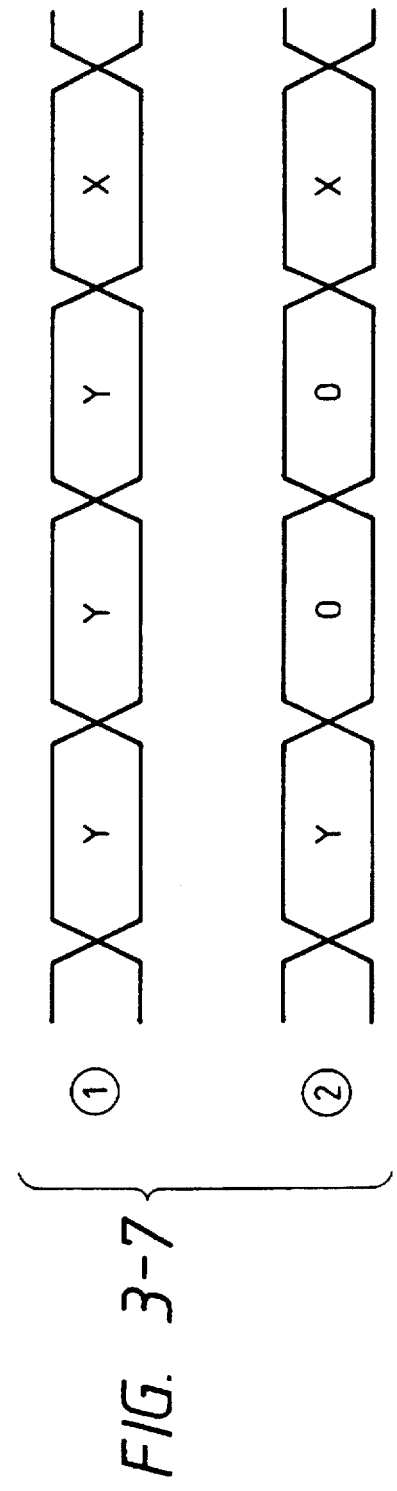
Figures 3, 4, 5, 6, 7, 8:
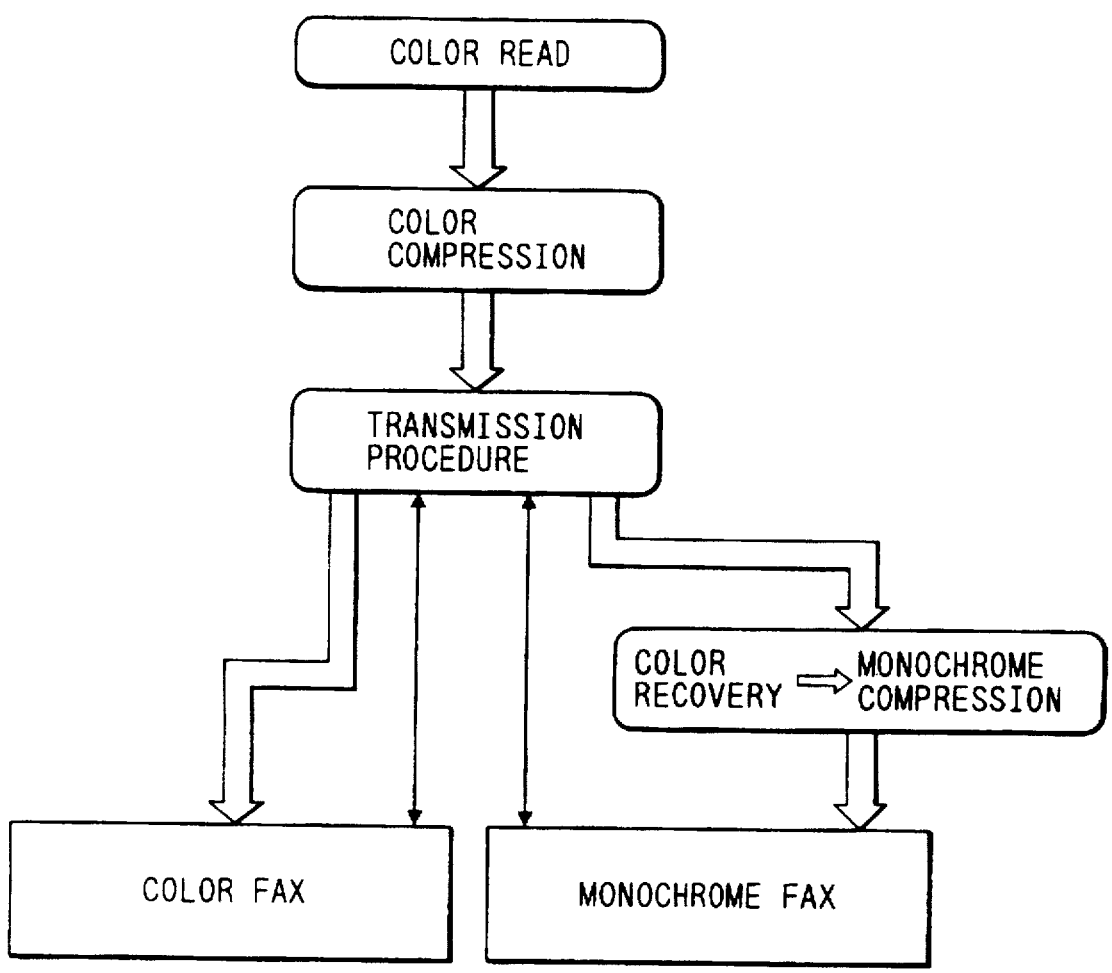
Figures 3, 4, 5, 6, 7, 8, 9:
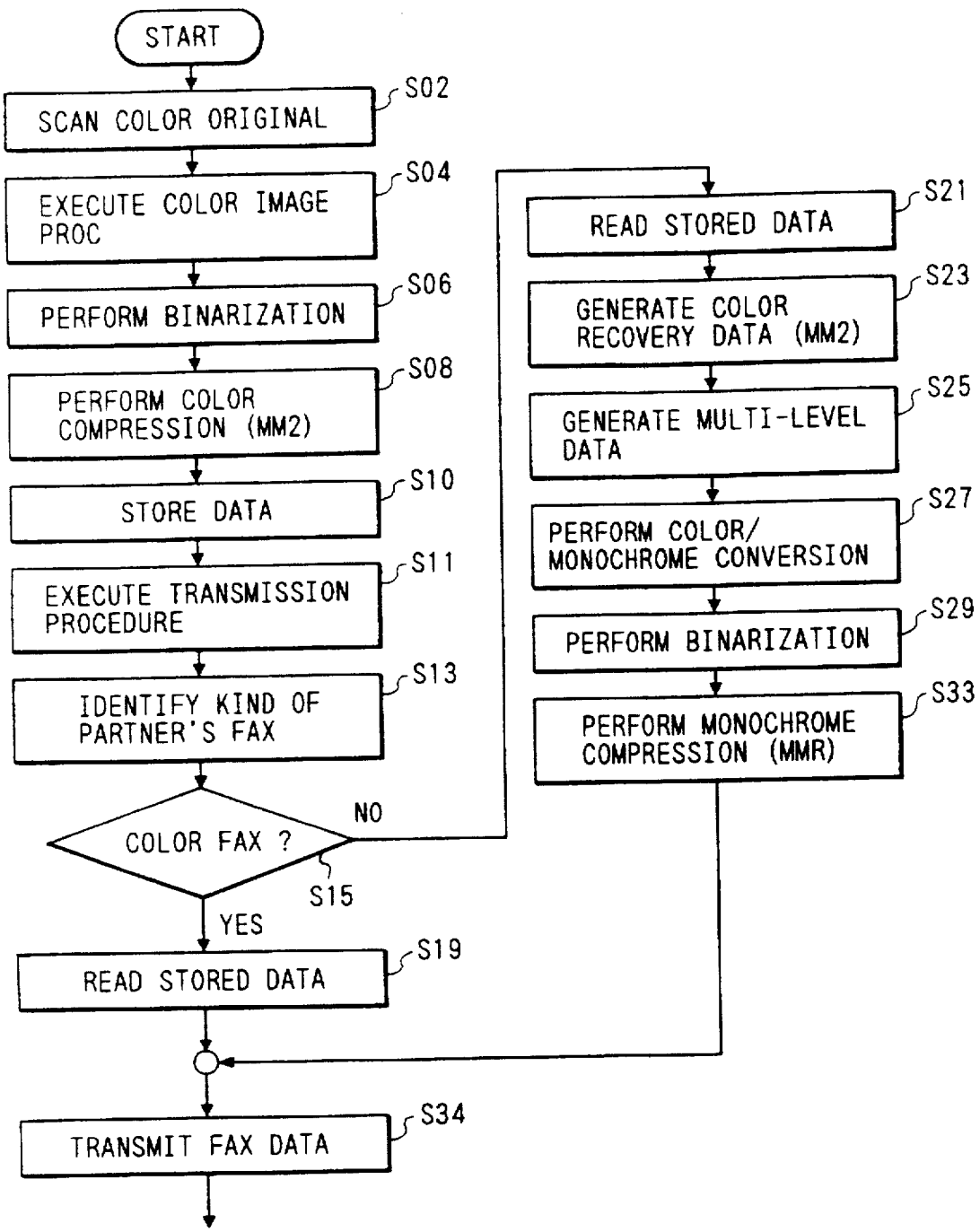
Figures 3, 4, 5, 6, 7, 8, 9, 10:
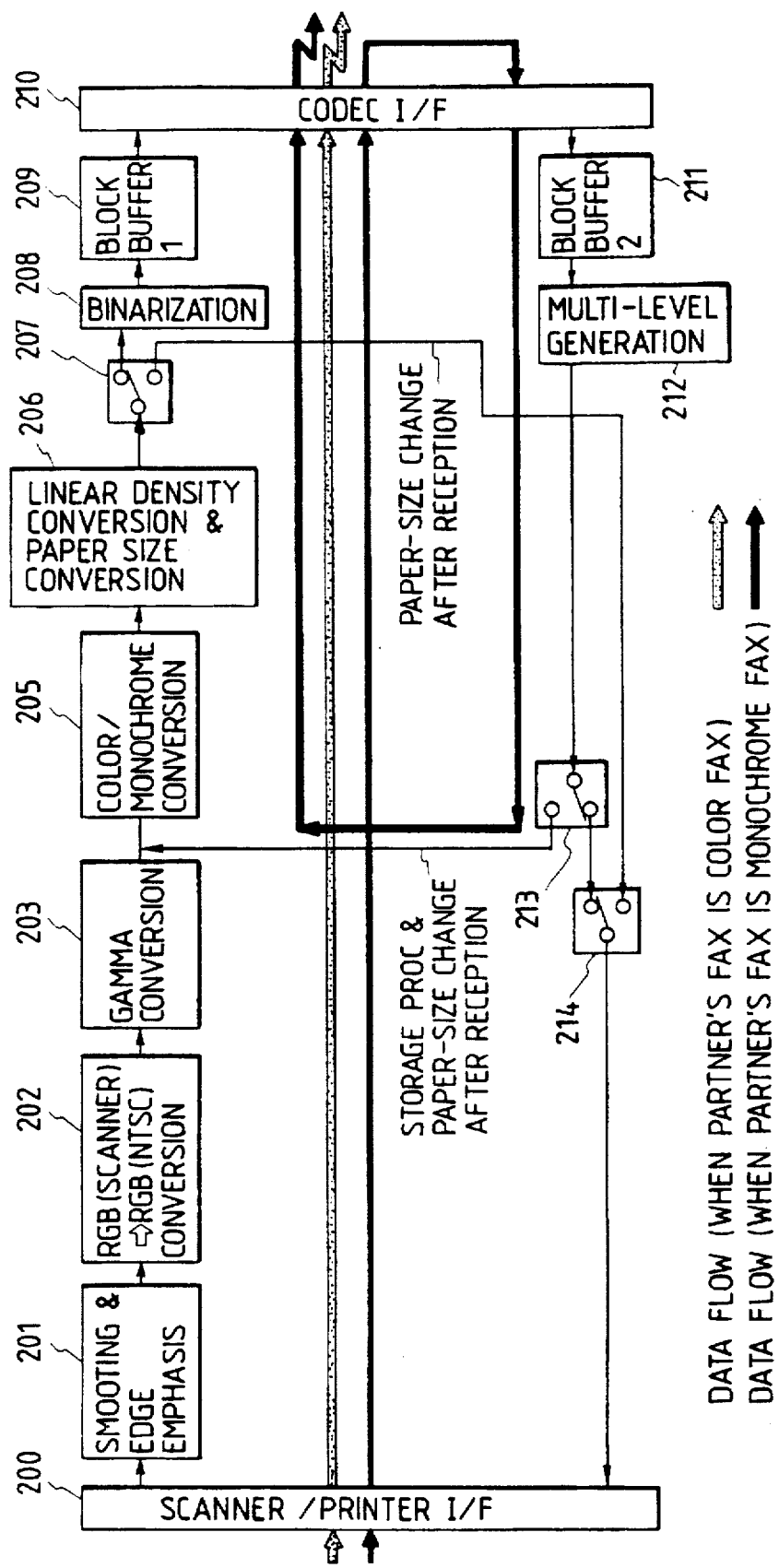
Figures 1, 2, 3, 4:
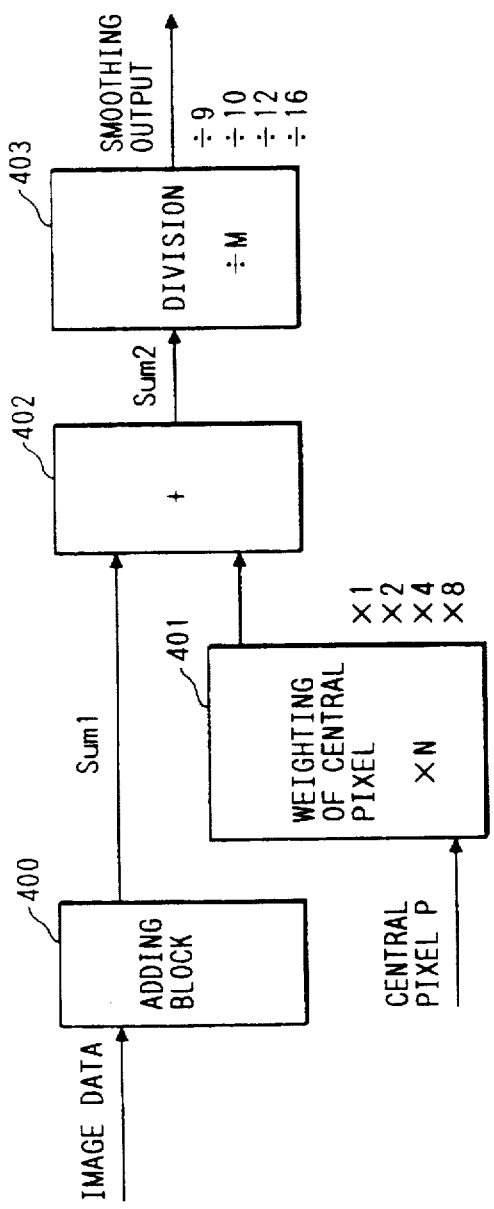
Figures 1, 2, 3, 4:
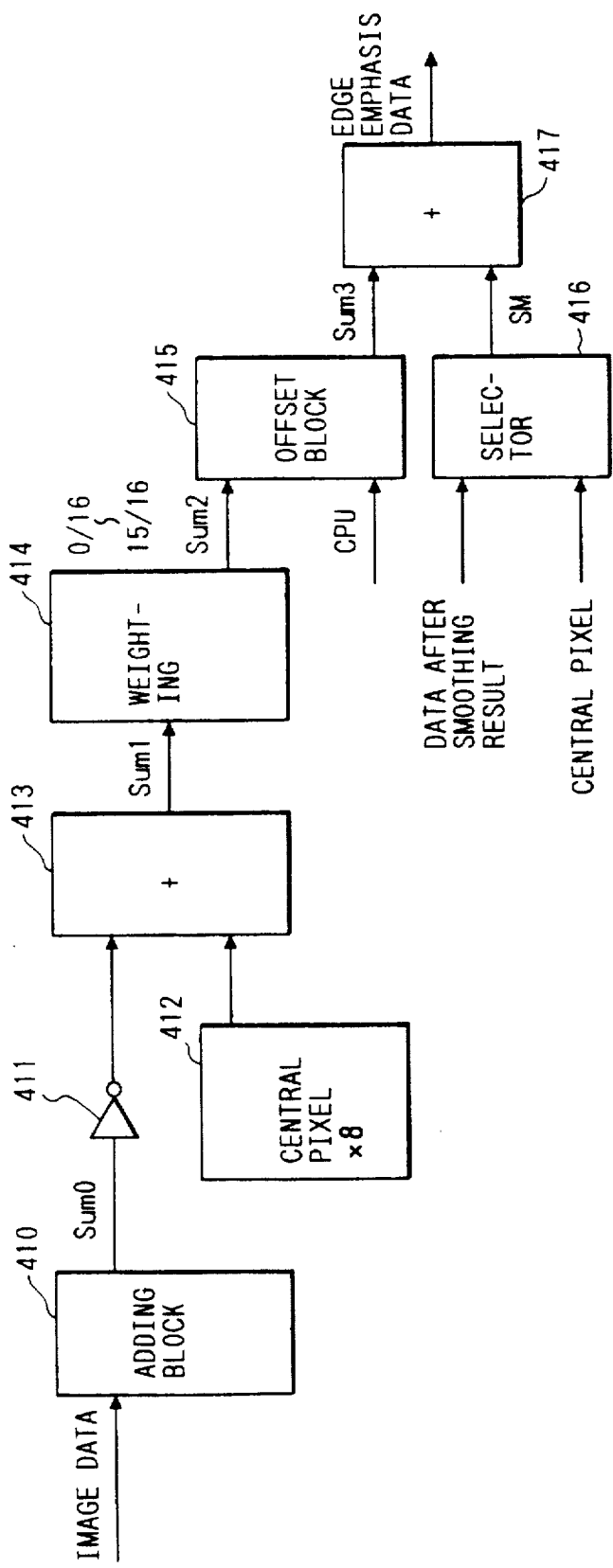
Figures 1, 3, 4:
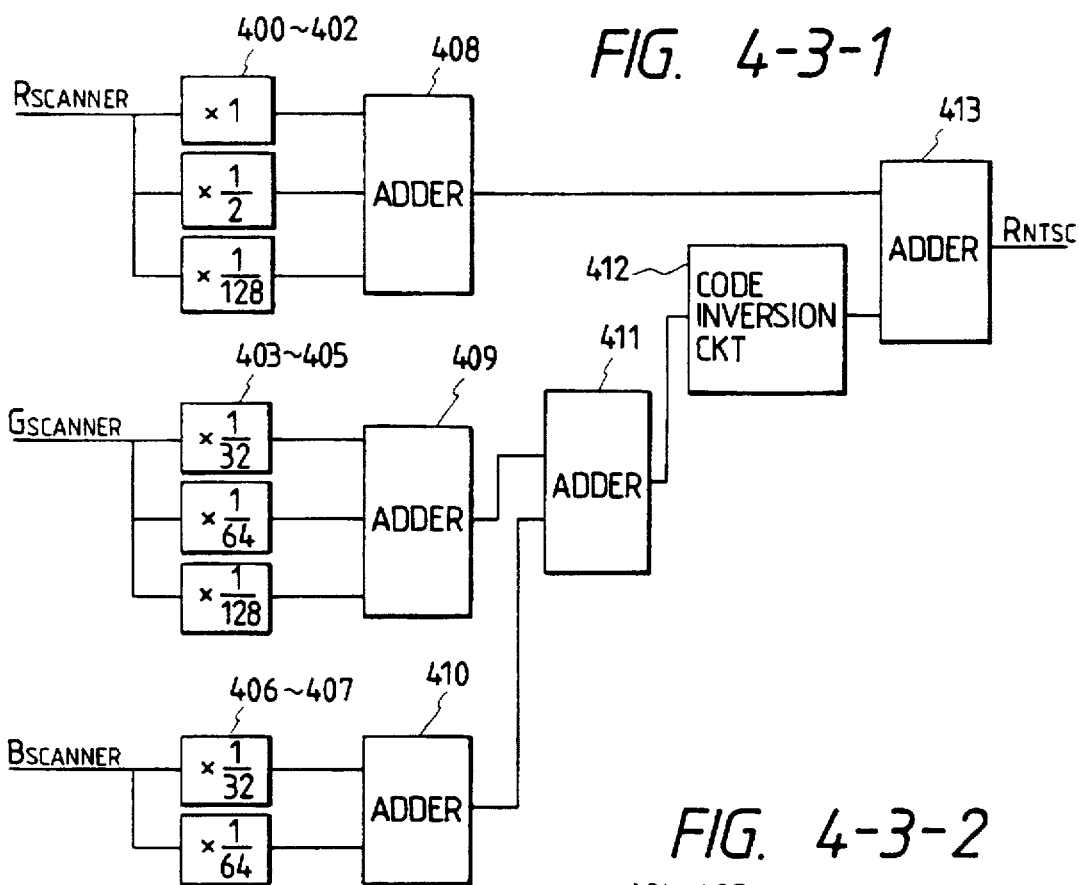
Figures 2, 3, 4:
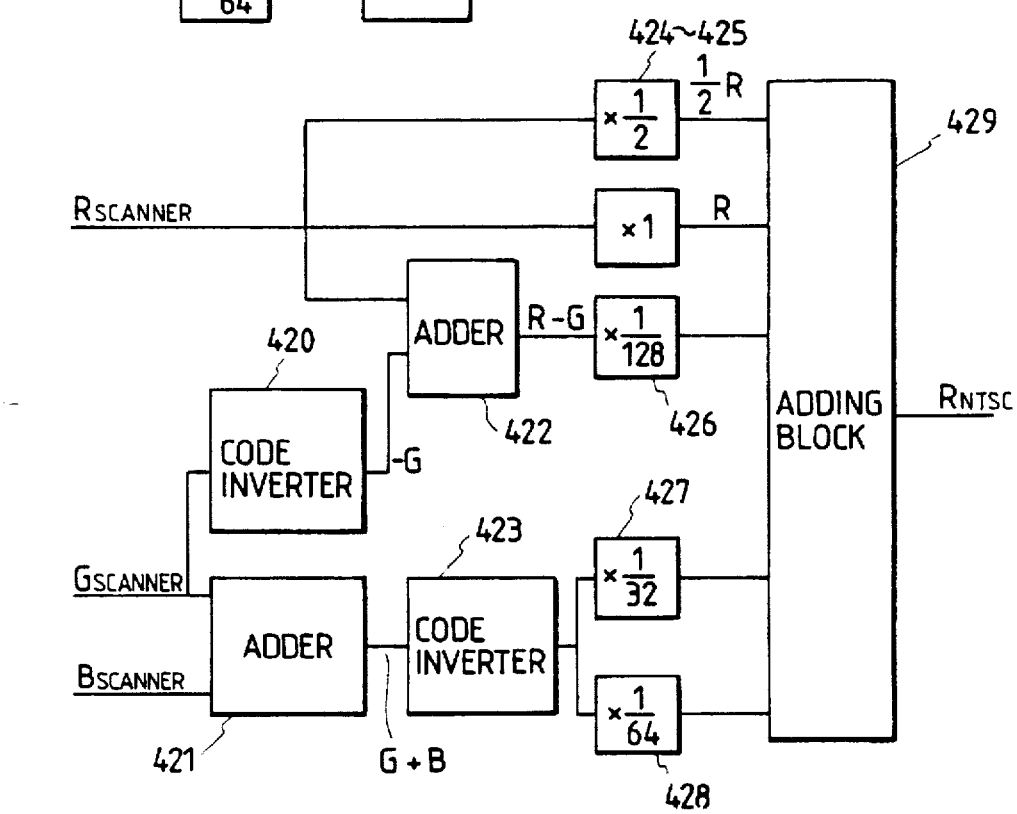
Figures 3, 4:
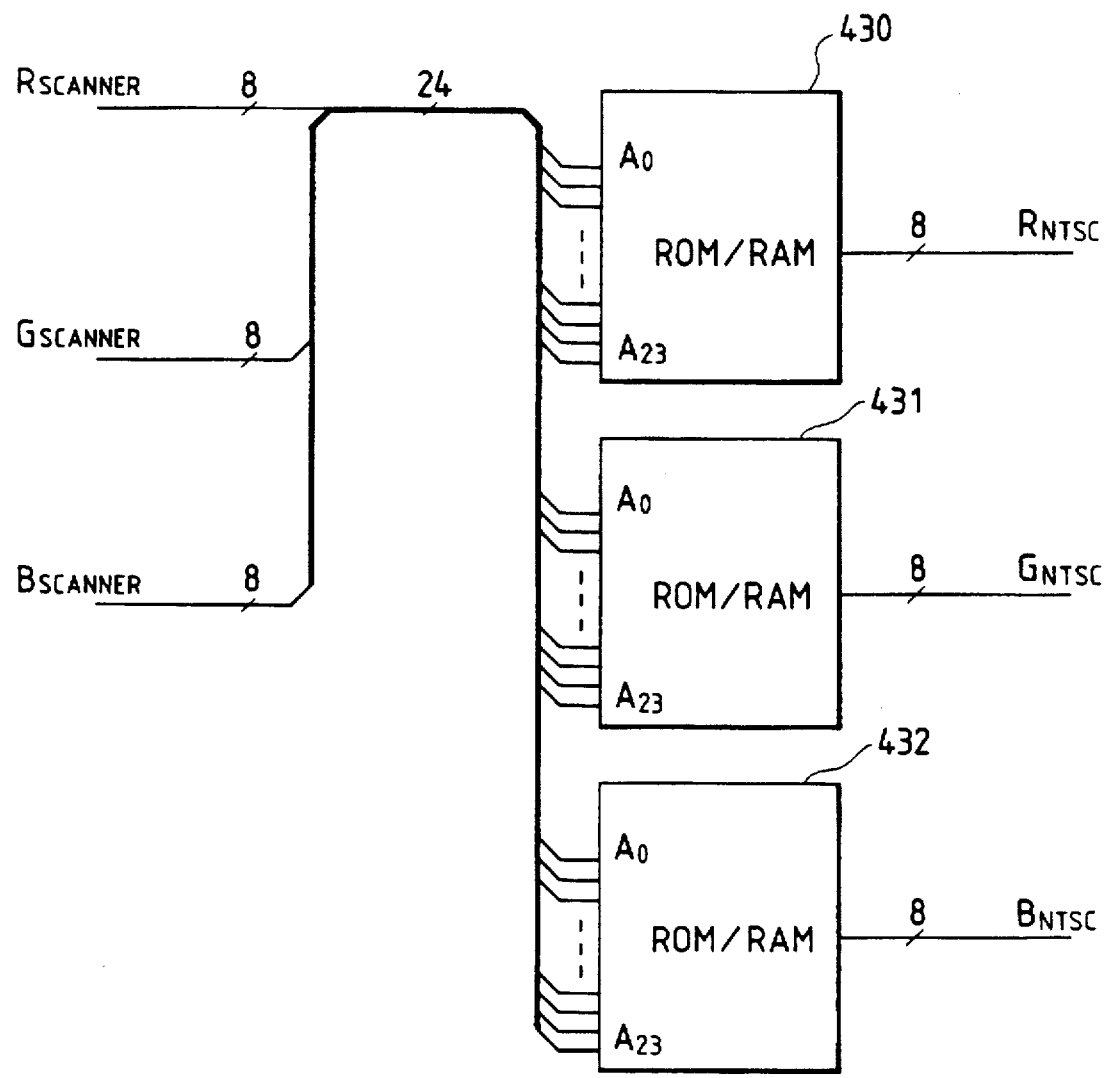
Figures 3, 4:
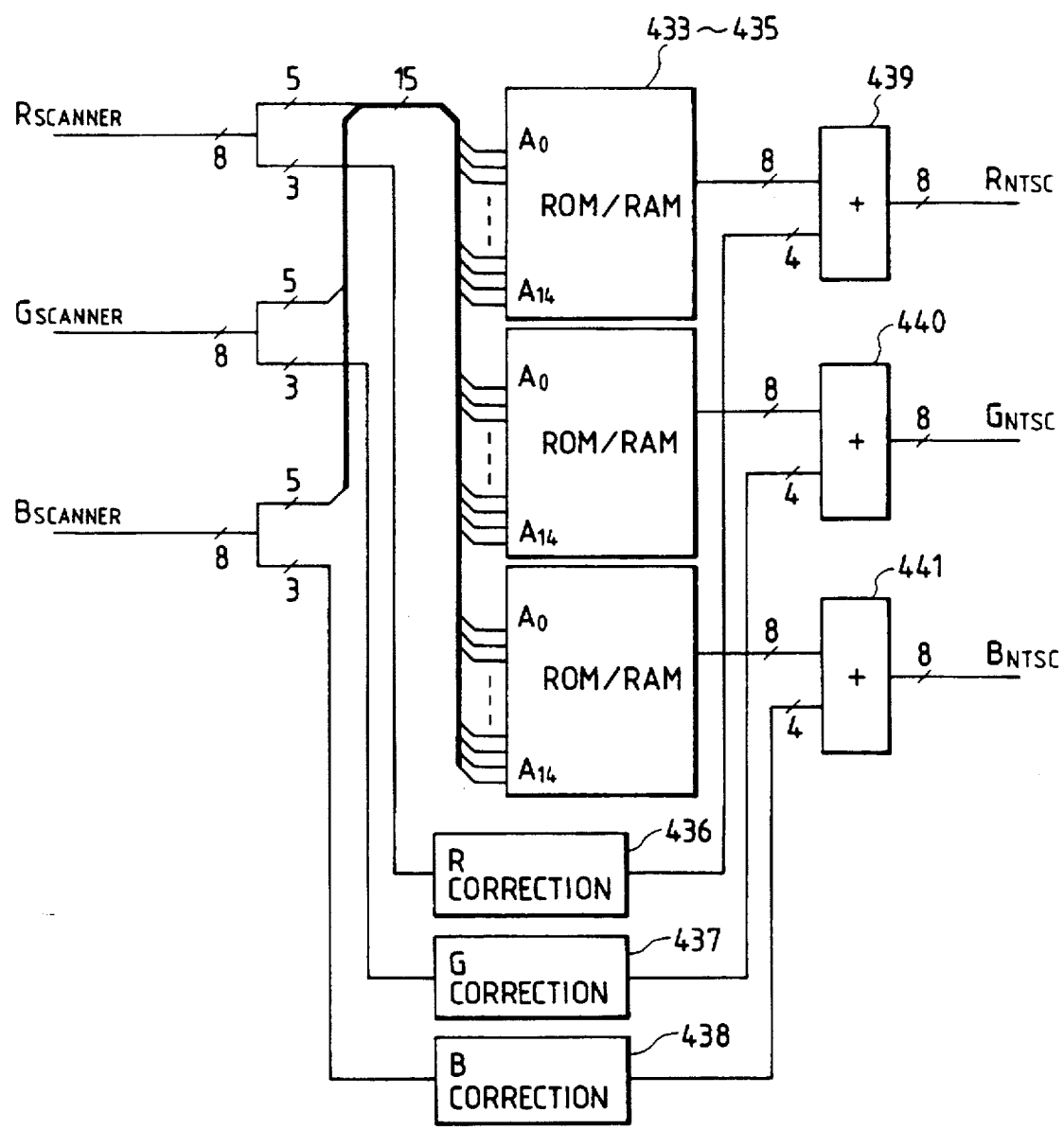
Figures 1, 4:
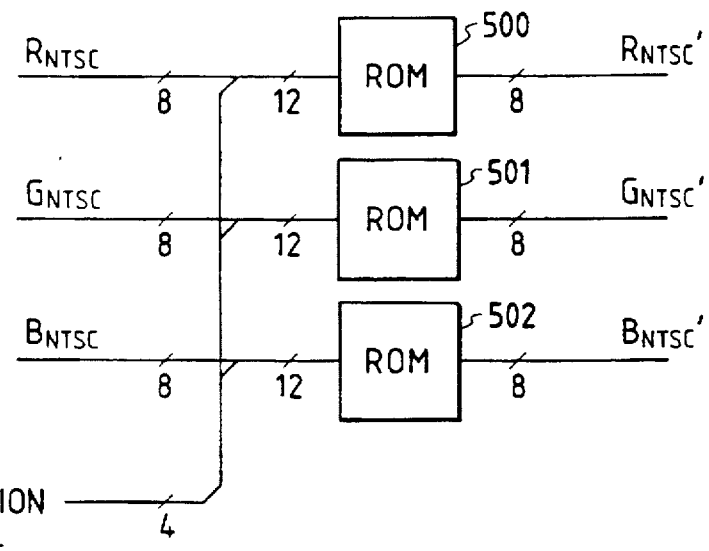
Figures 1, 4, 5:
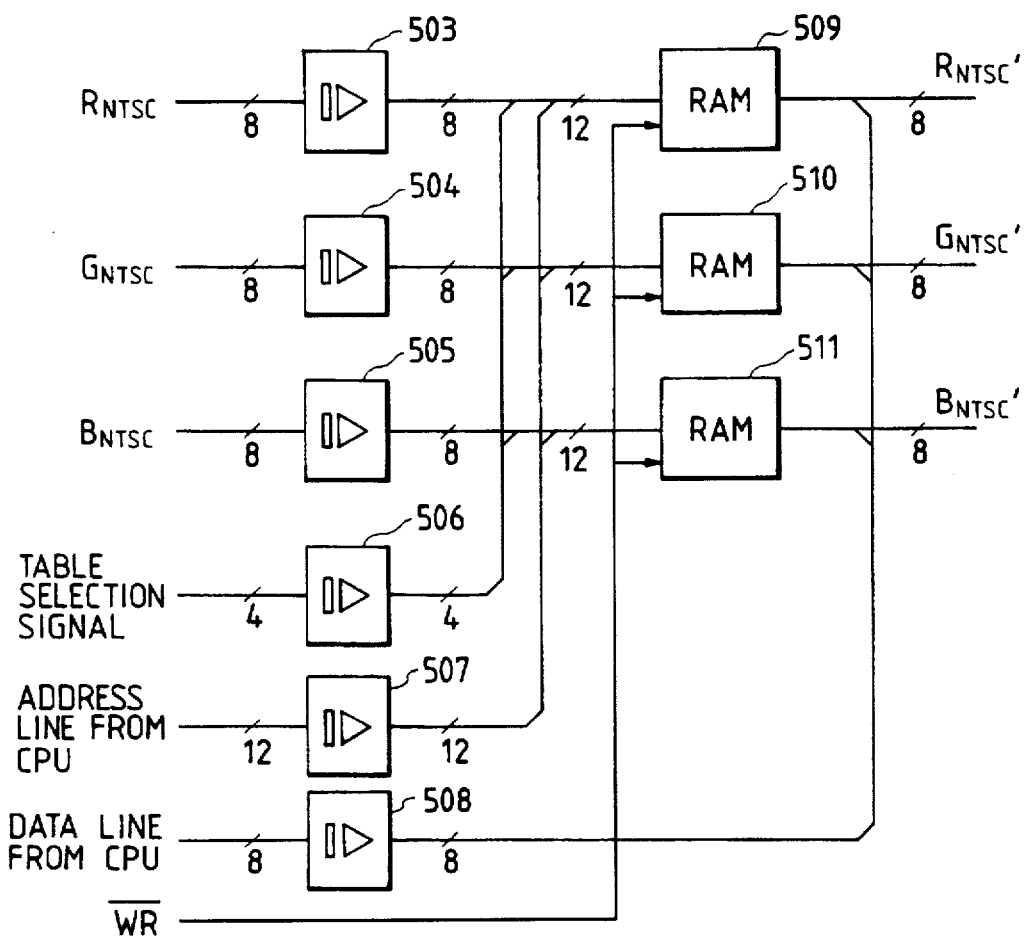
Figures 1, 4, 5, 6:
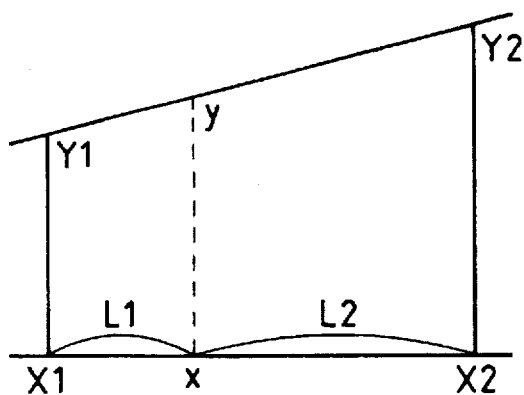
Figures 2, 4, 5, 6:
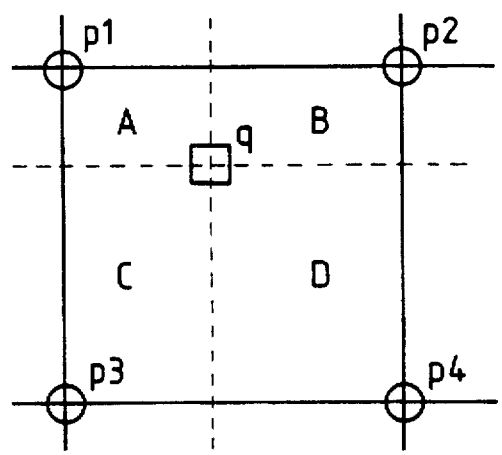
Figures 4, 5, 6:
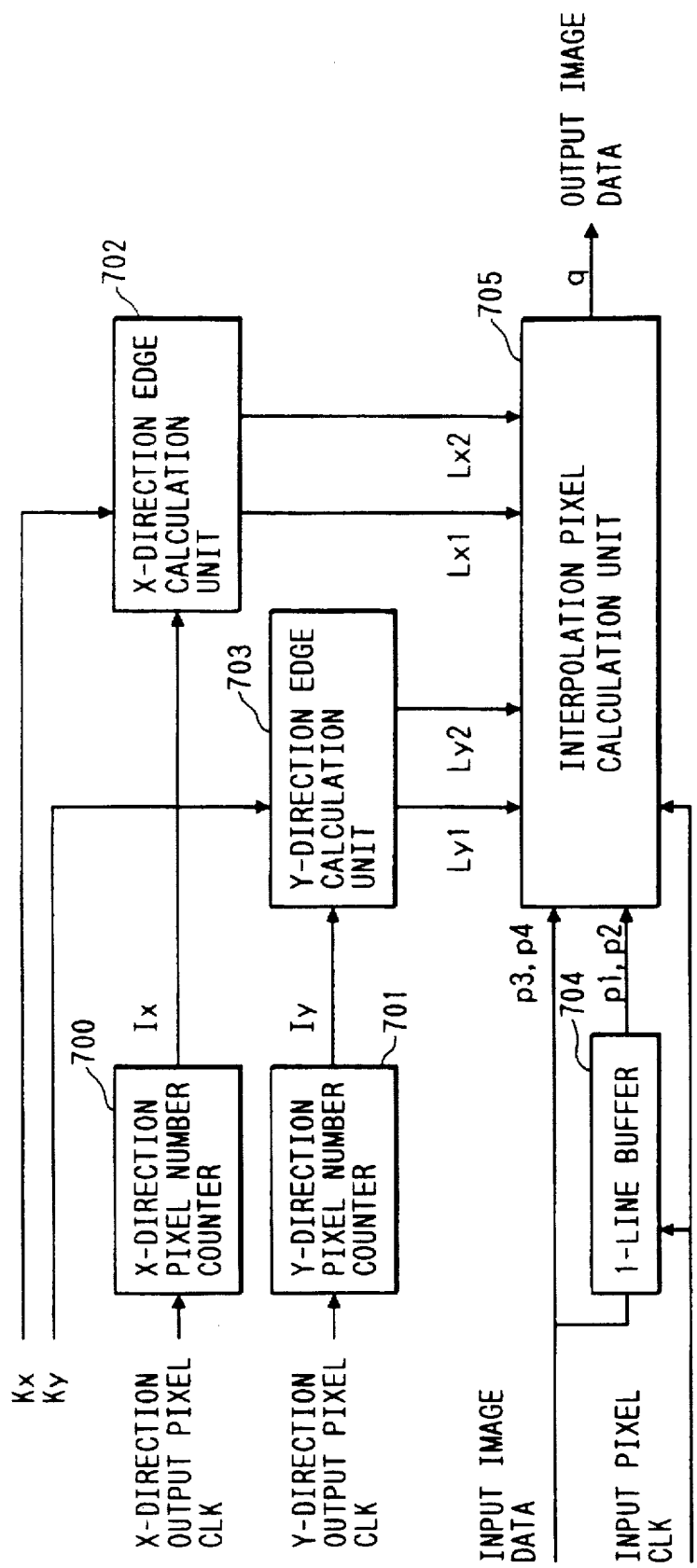
Figures 4, 5, 6:
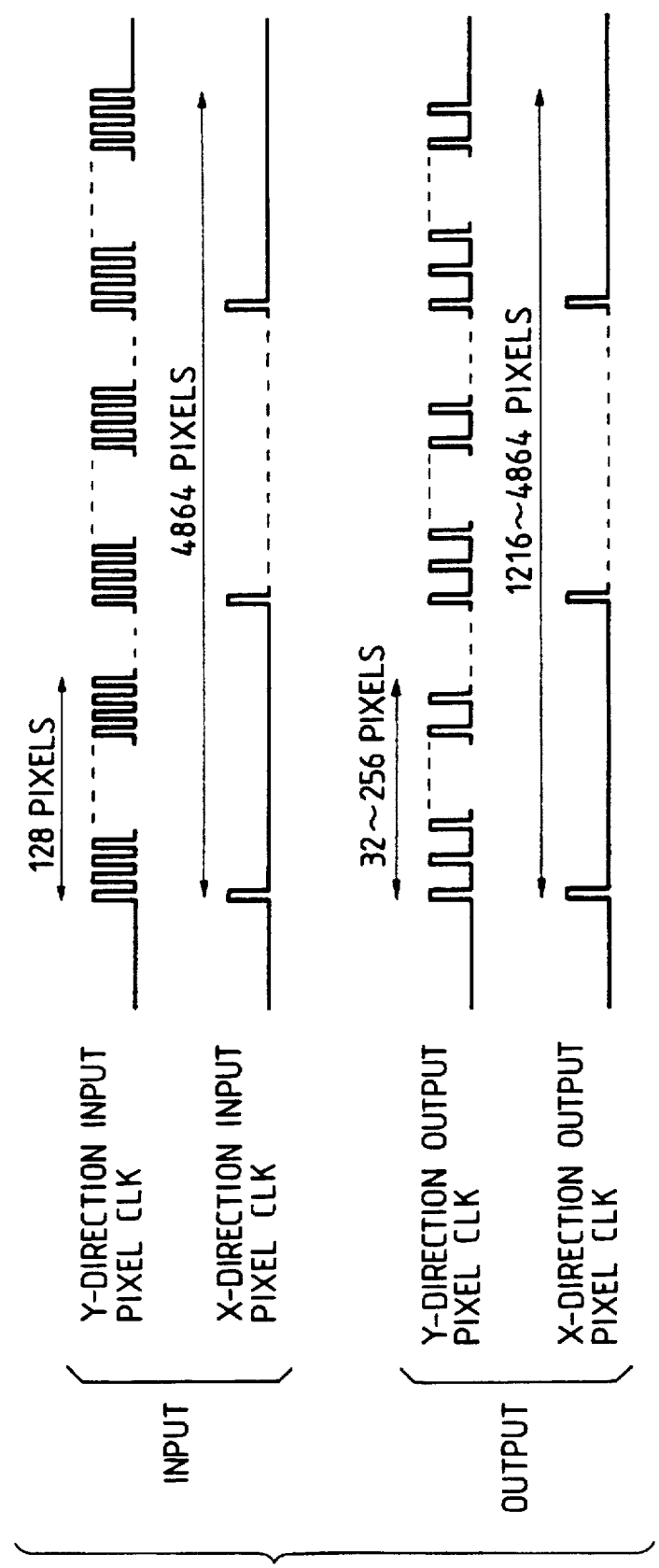
Figures 4, 5, 6:
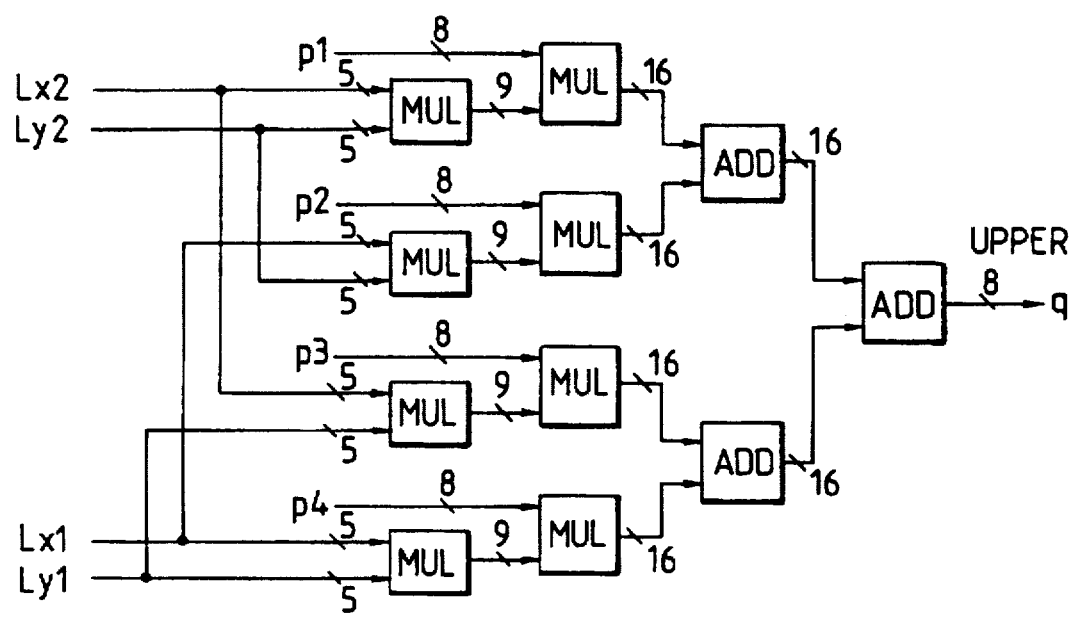
Figures 4, 5, 6, 7:
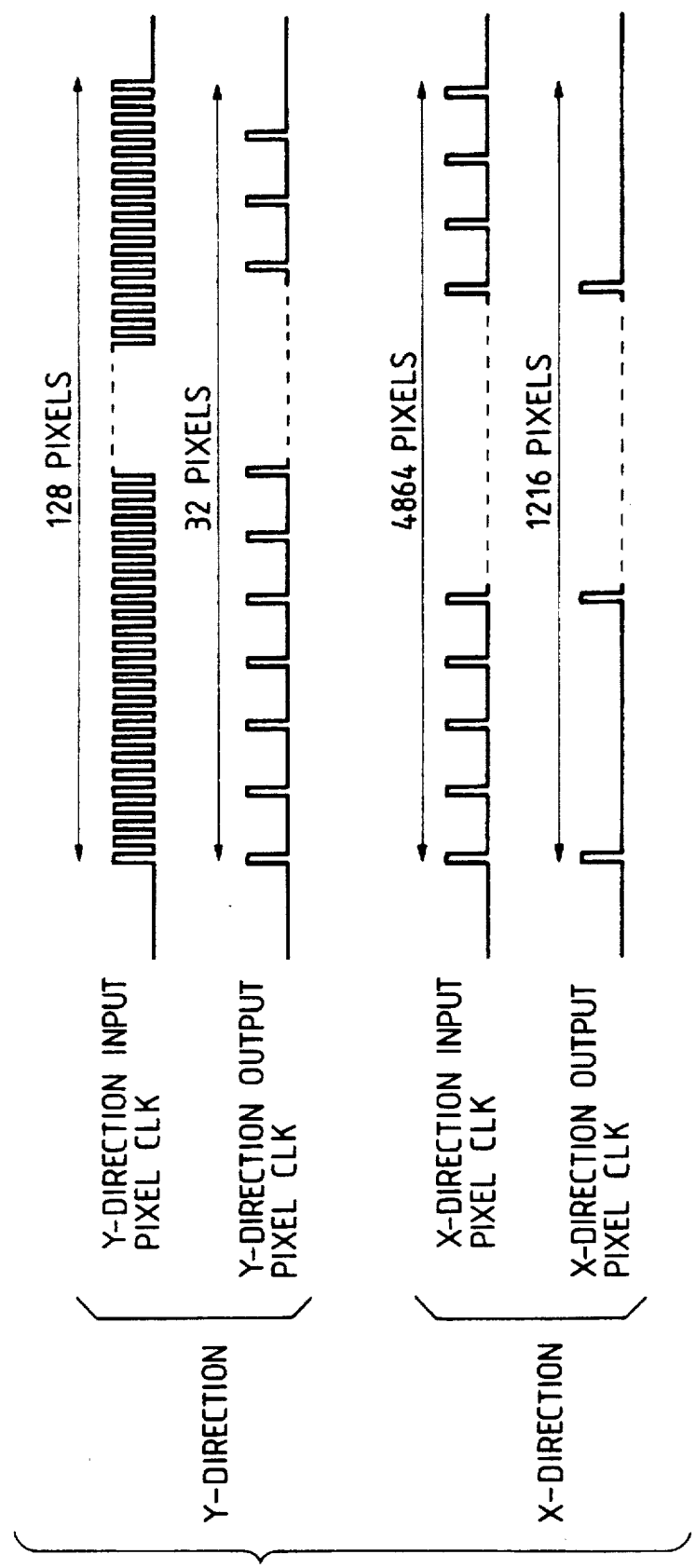
Figures 1, 4, 5, 6, 7:
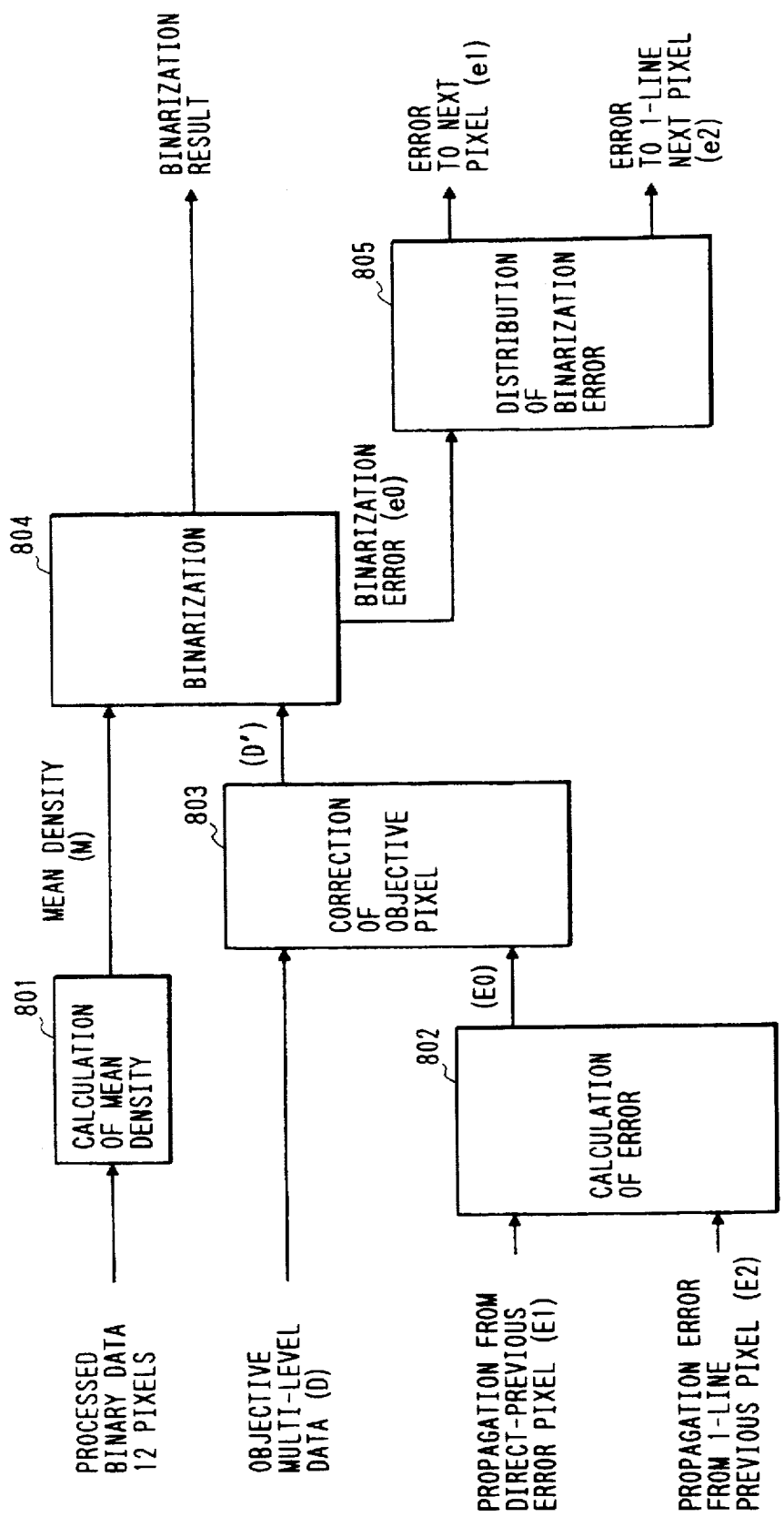
Figures 3, 4, 5, 6, 7:
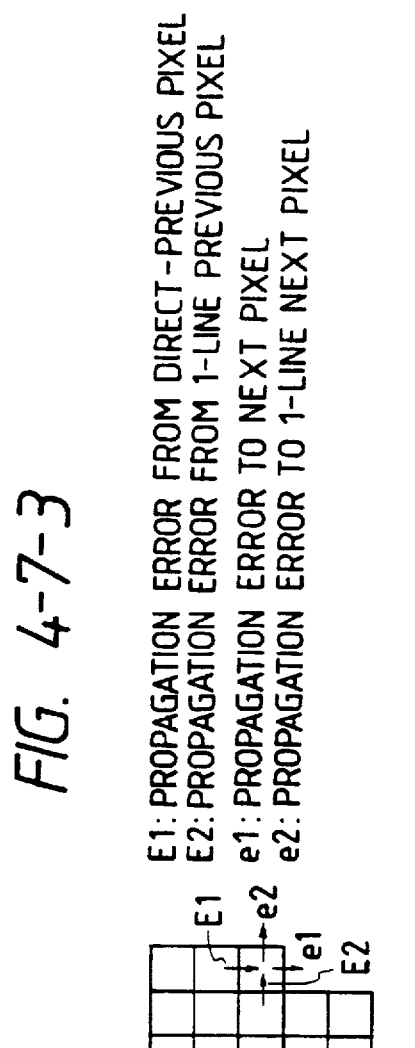
Figures 2, 4, 5, 6, 7:
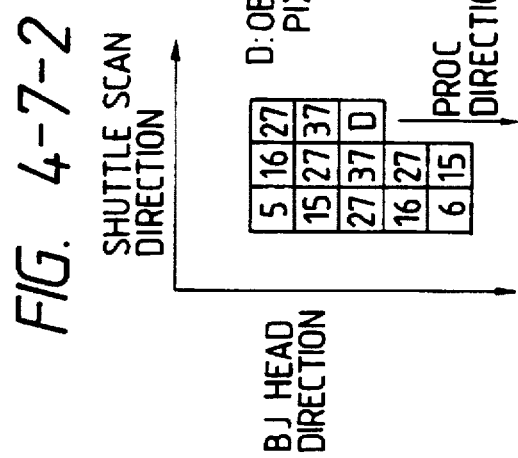
Figures 4, 5, 5A, 6, 7:
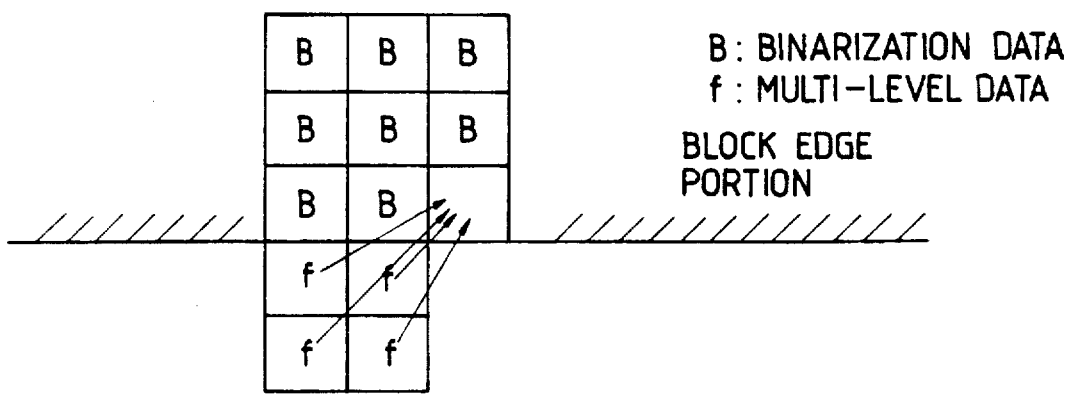
Figures 4, 5, 5B, 6, 7:
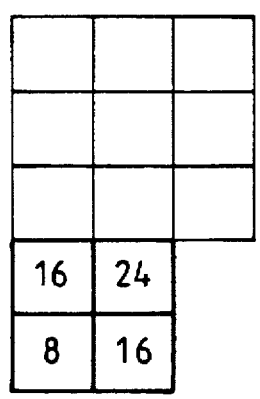
Figures 4, 5, 6, 6A, 7:
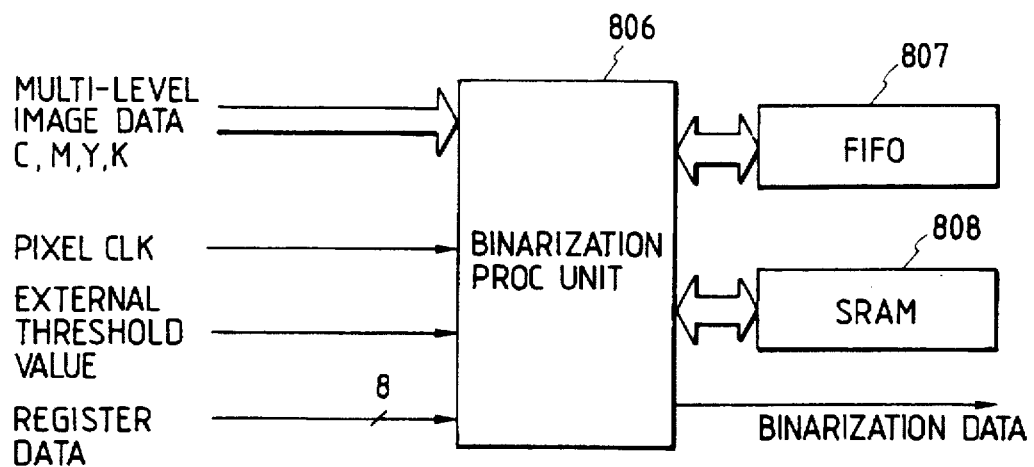
Figures 4, 5, 6, 6B, 7:
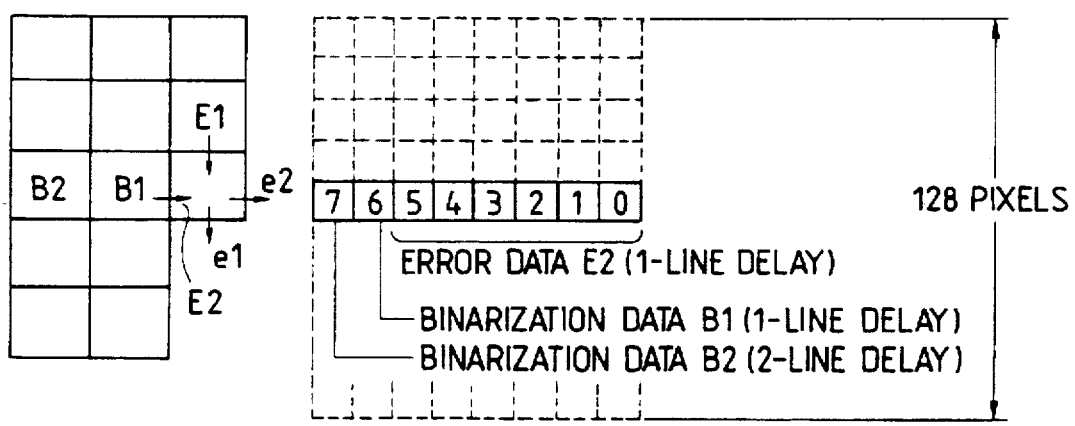
Figures 4, 5, 6, 7:
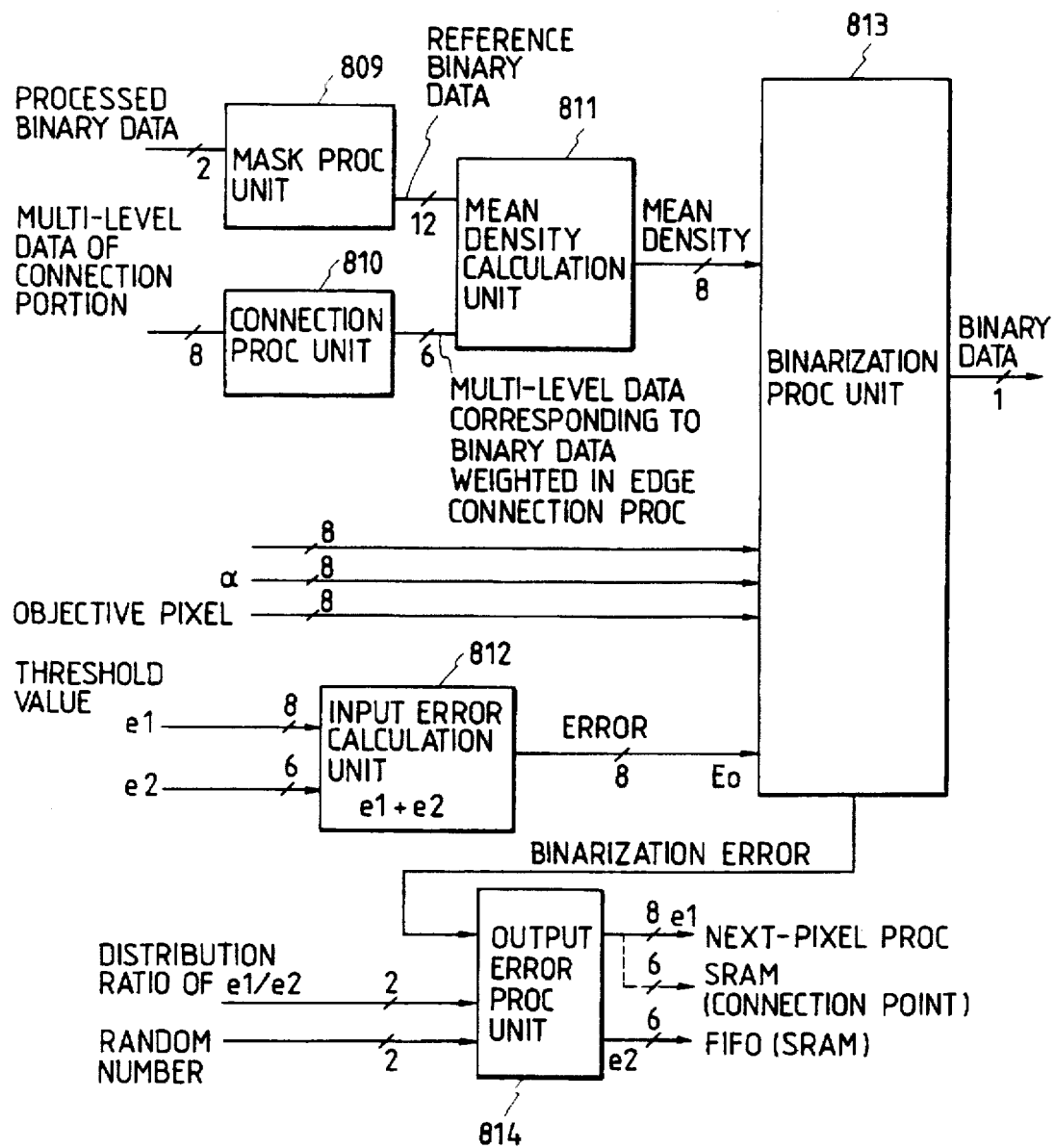
Figures 1, 4, 5, 6, 7, 8:
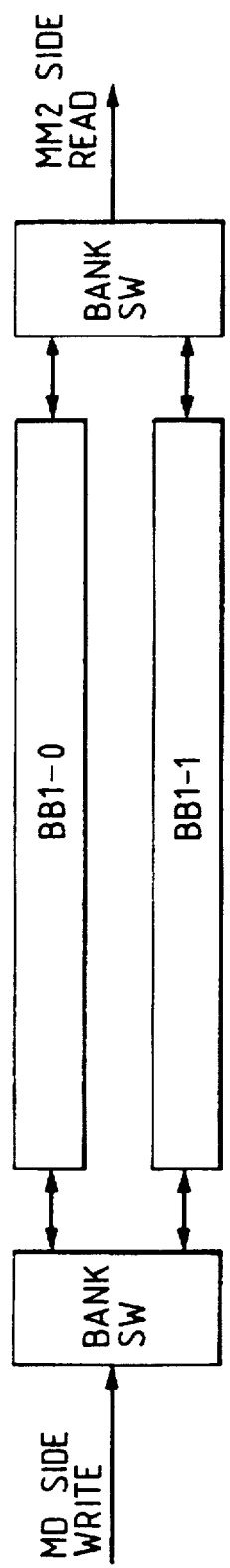
Figures 2, 4, 5, 6, 7, 8:
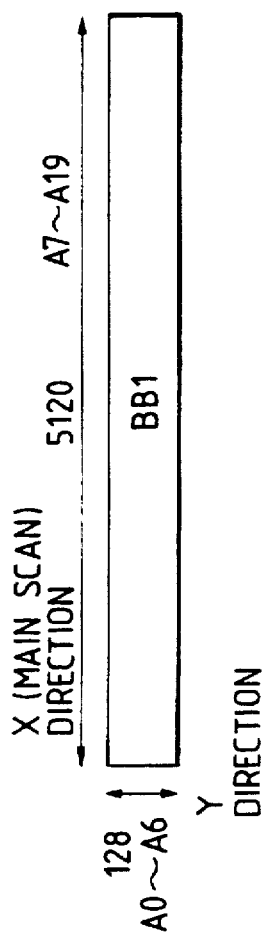
Figures 3, 4, 5, 6, 7, 8:
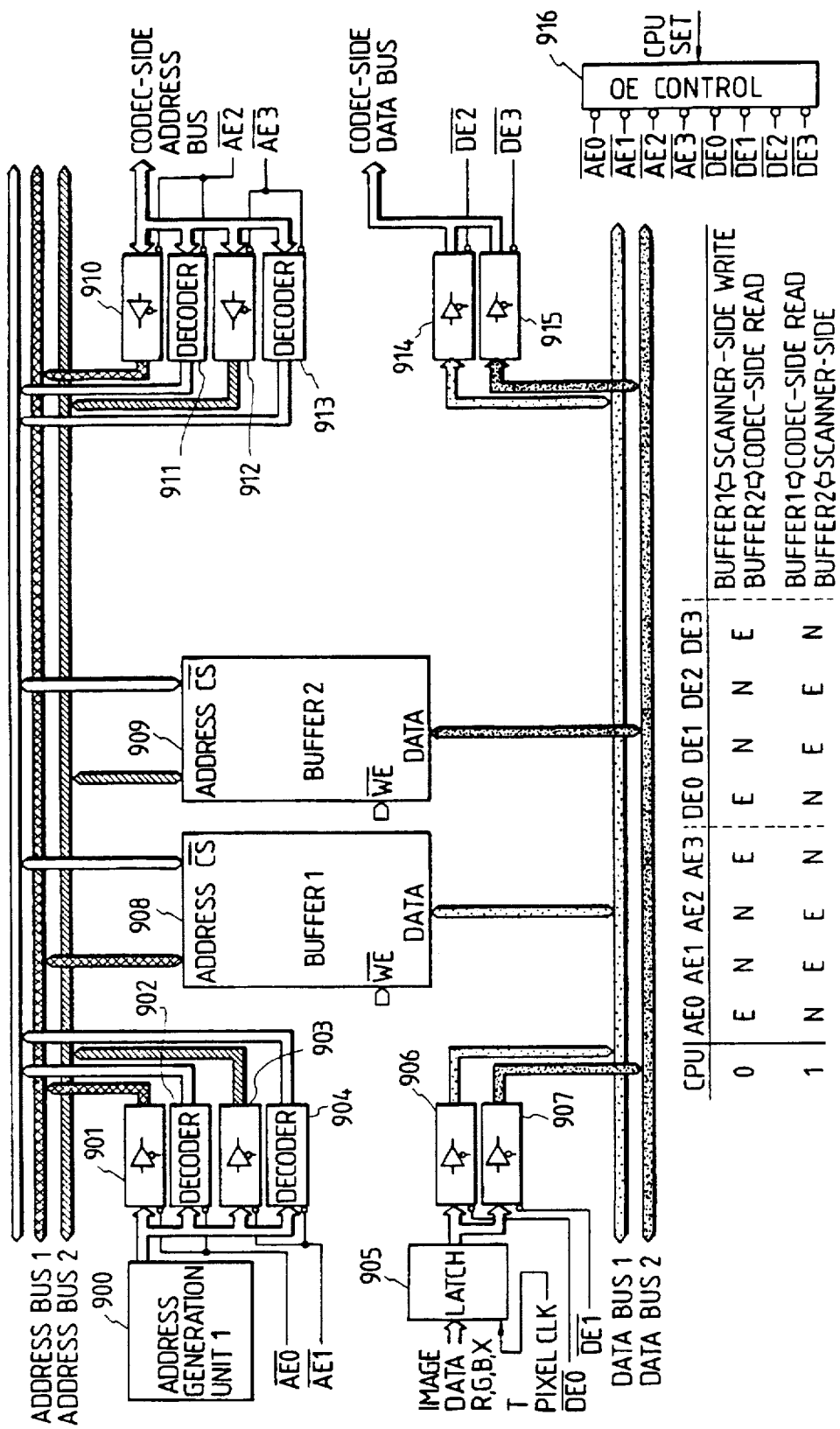
Figures 4, 5, 6, 7, 8:
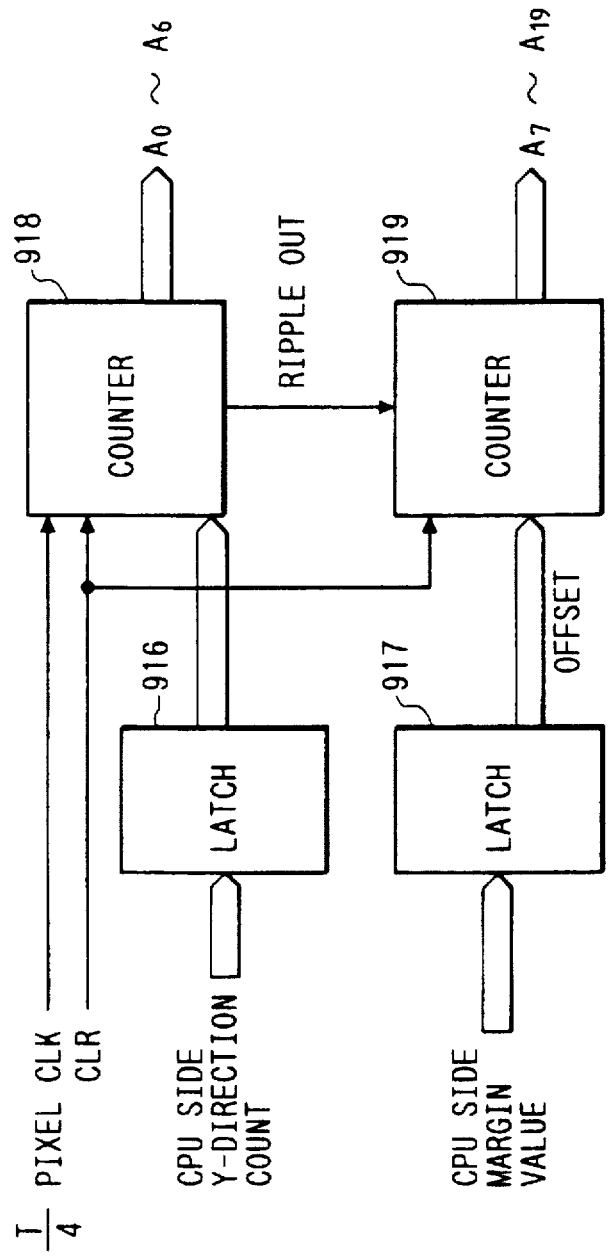
Figures 4, 5, 6, 7, 8:
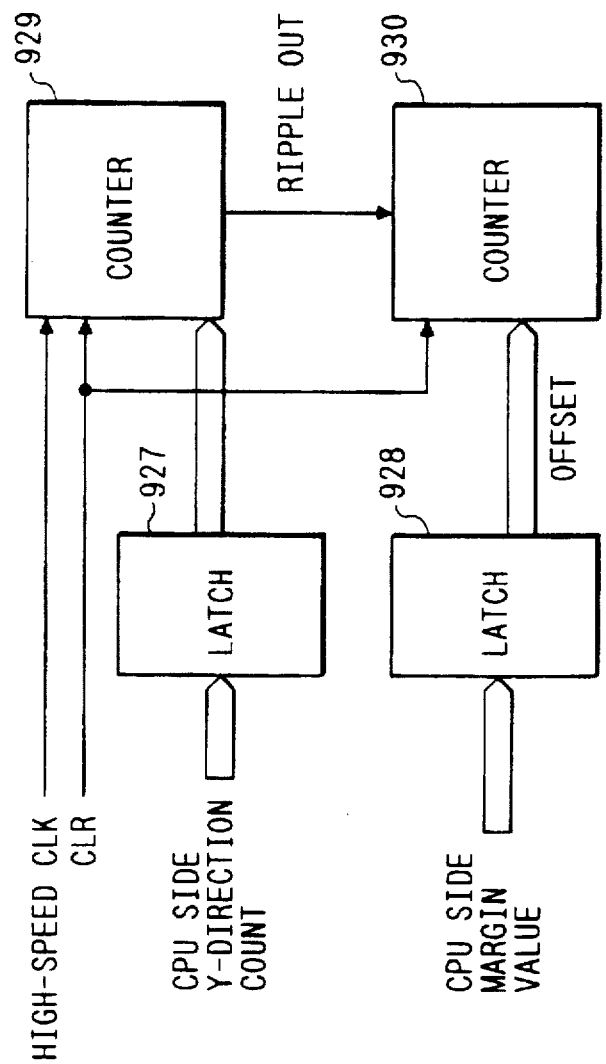
Figures 4, 5, 6, 7, 8:
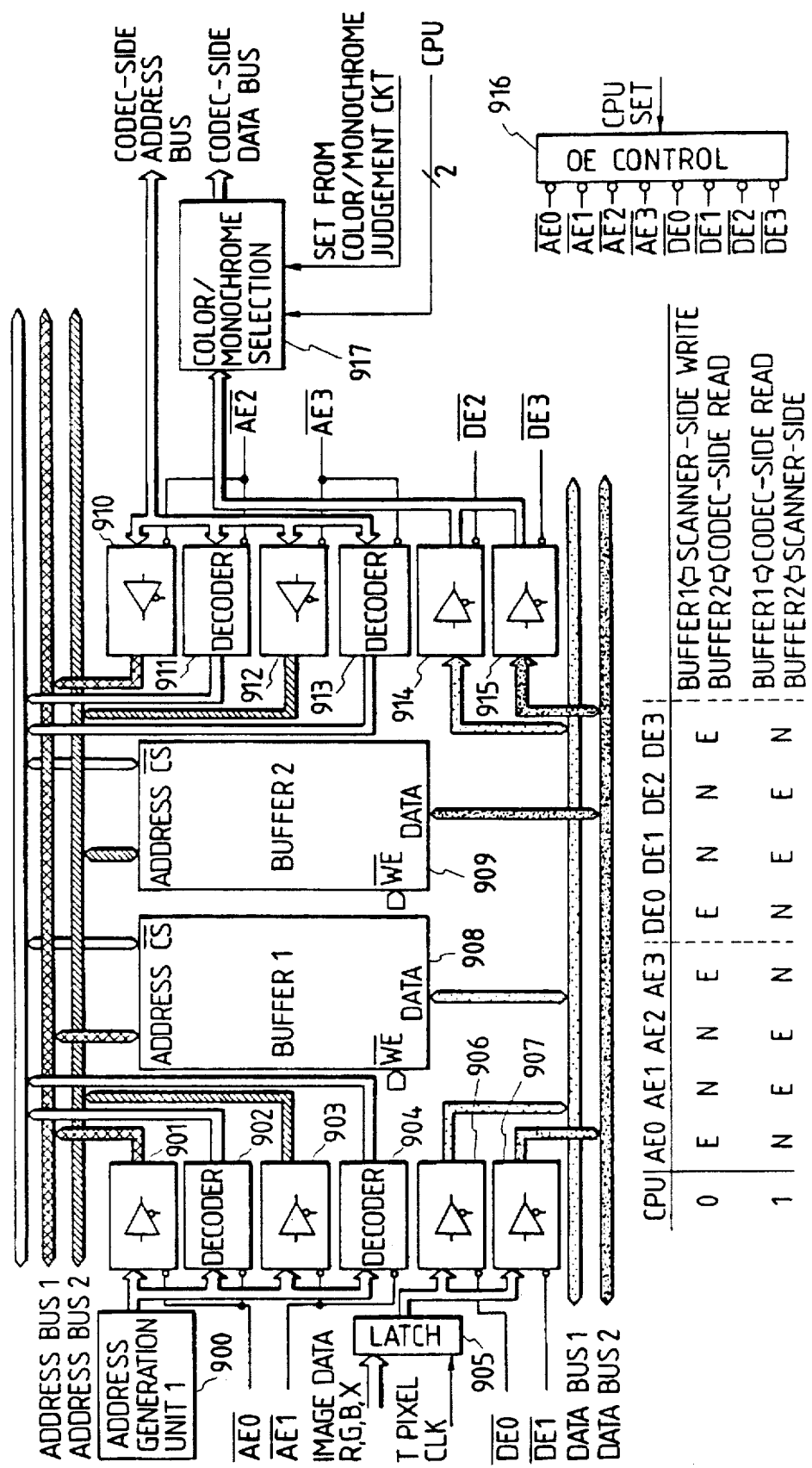
Figures 4, 5, 6, 7, 8, 9:
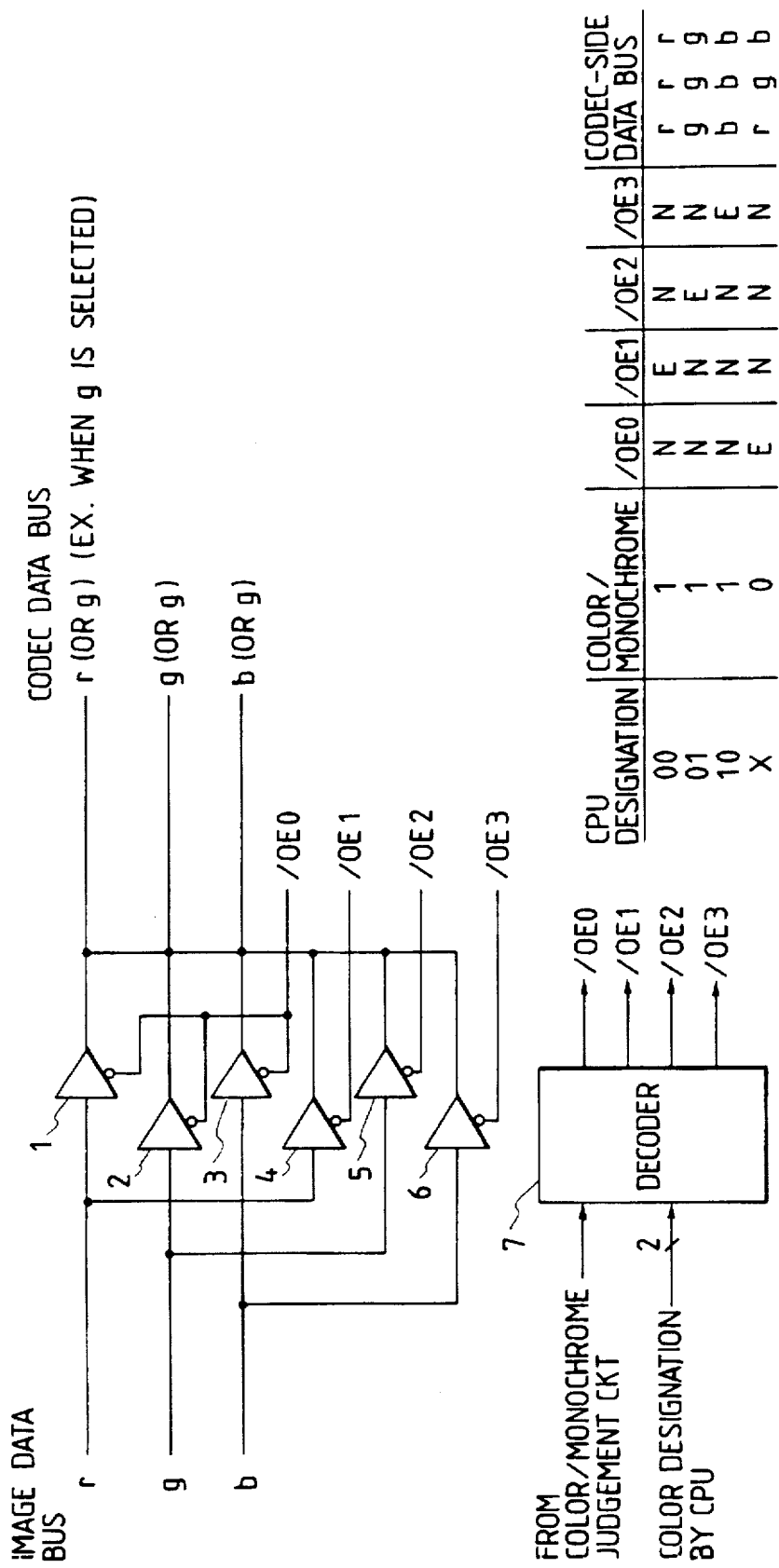
Figures 1, 4, 5, 6, 7, 8, 9:
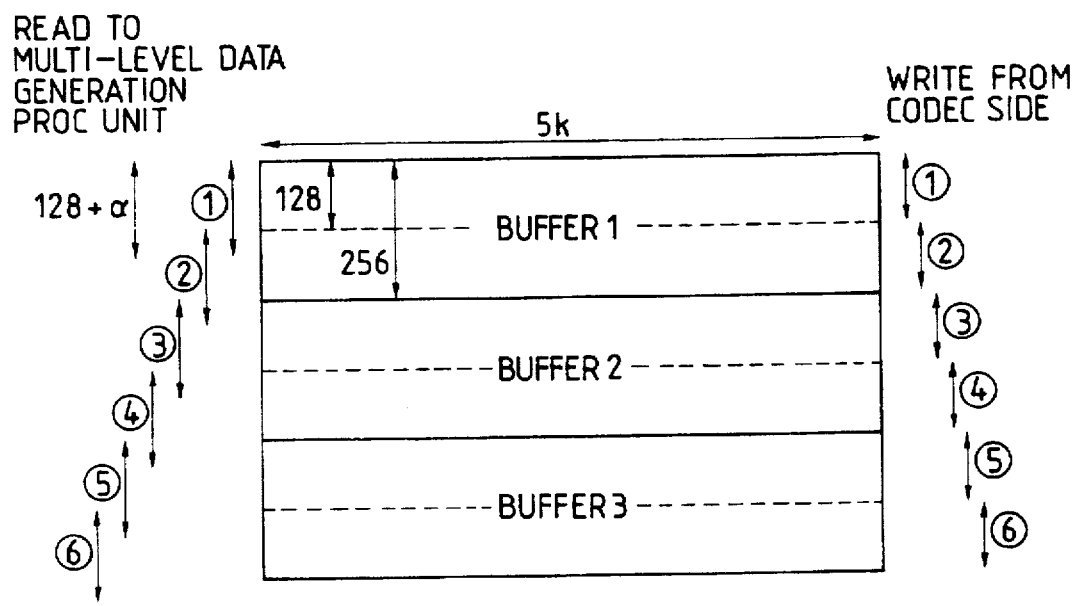
Figures 1, 4, 5, 6, 7, 8, 9, 10:
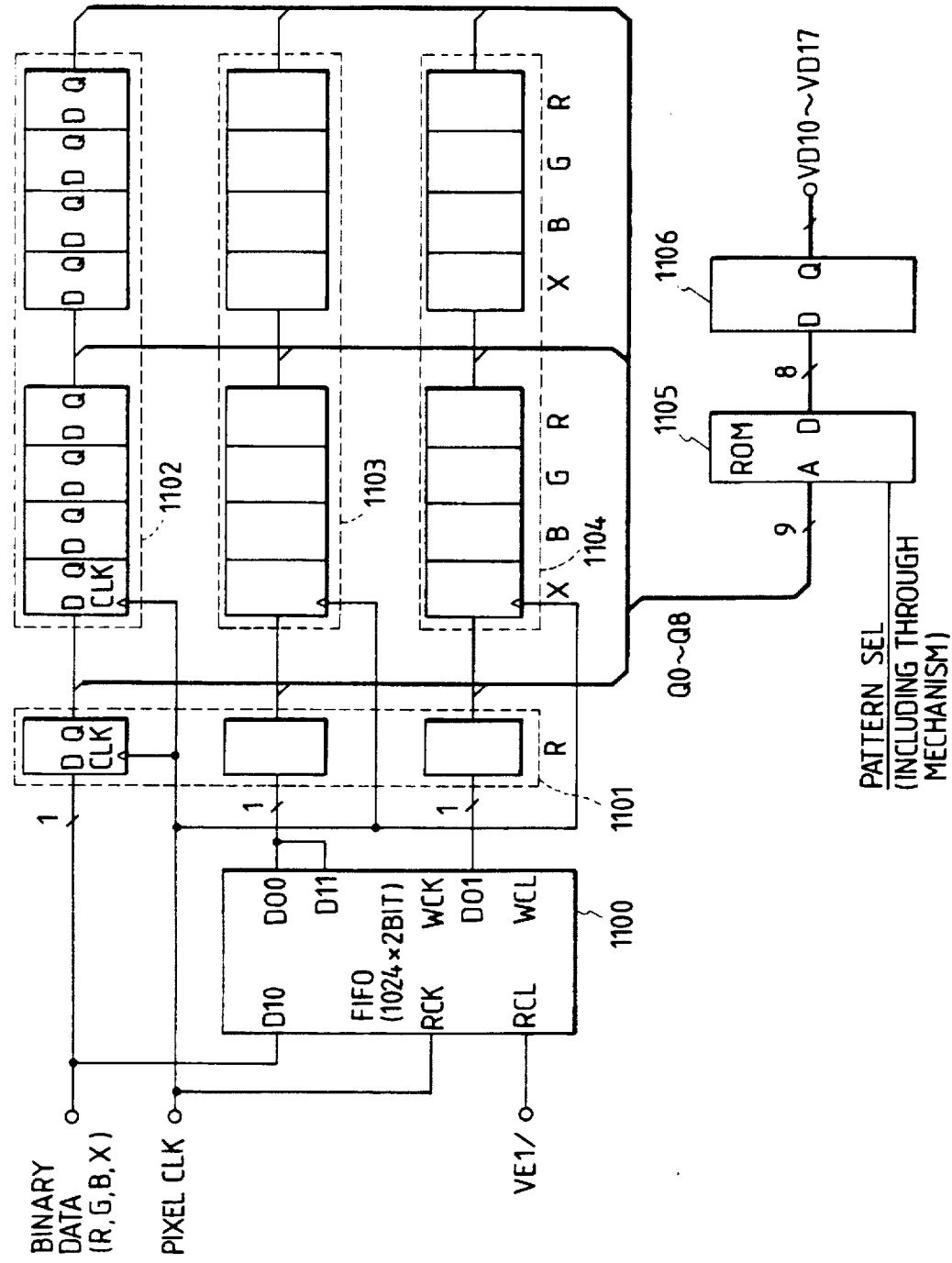
Figures 4, 5, 6, 7, 8, 9, 10:
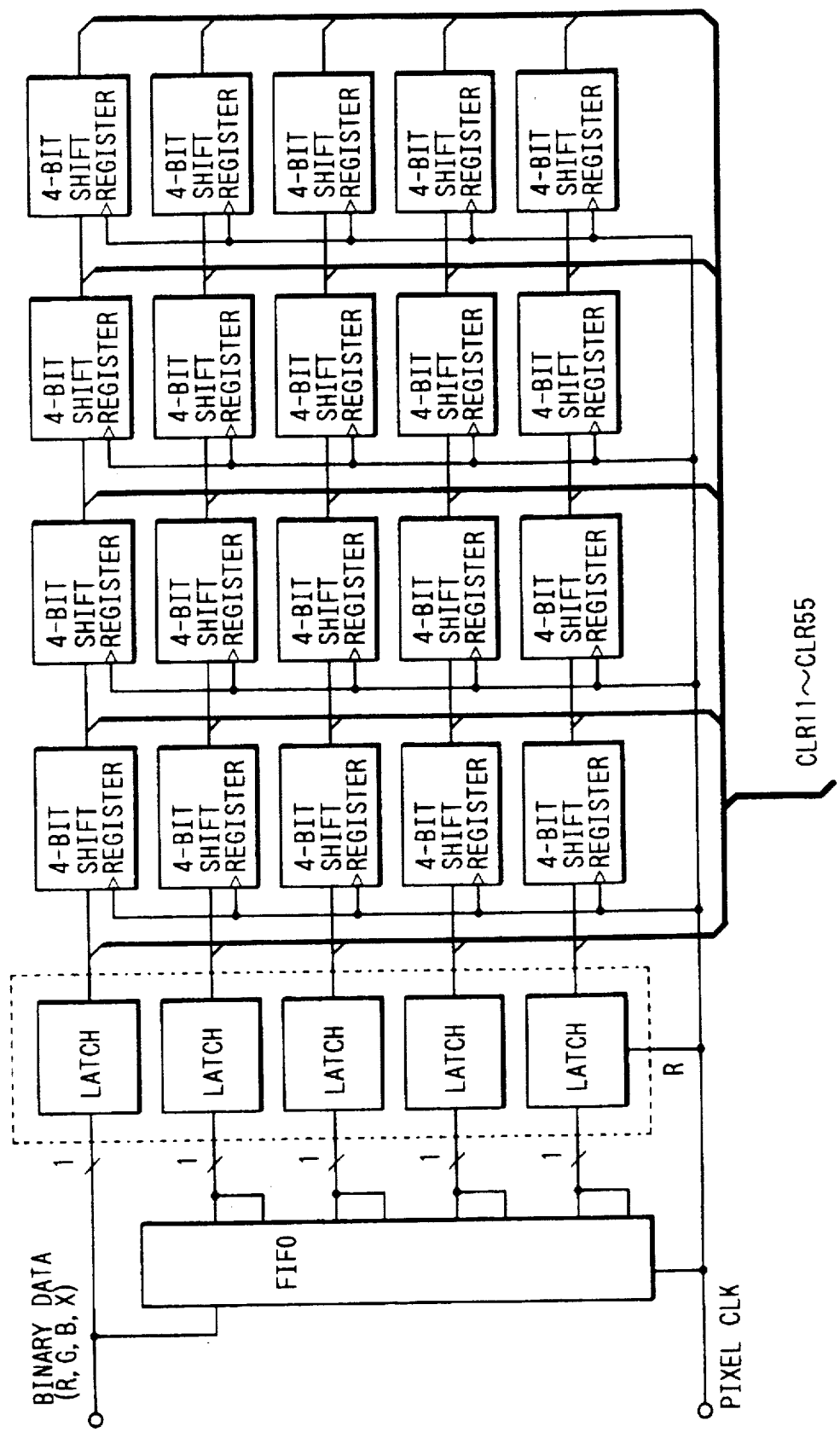
Figures 4, 5, 6, 7, 8, 9, 10:
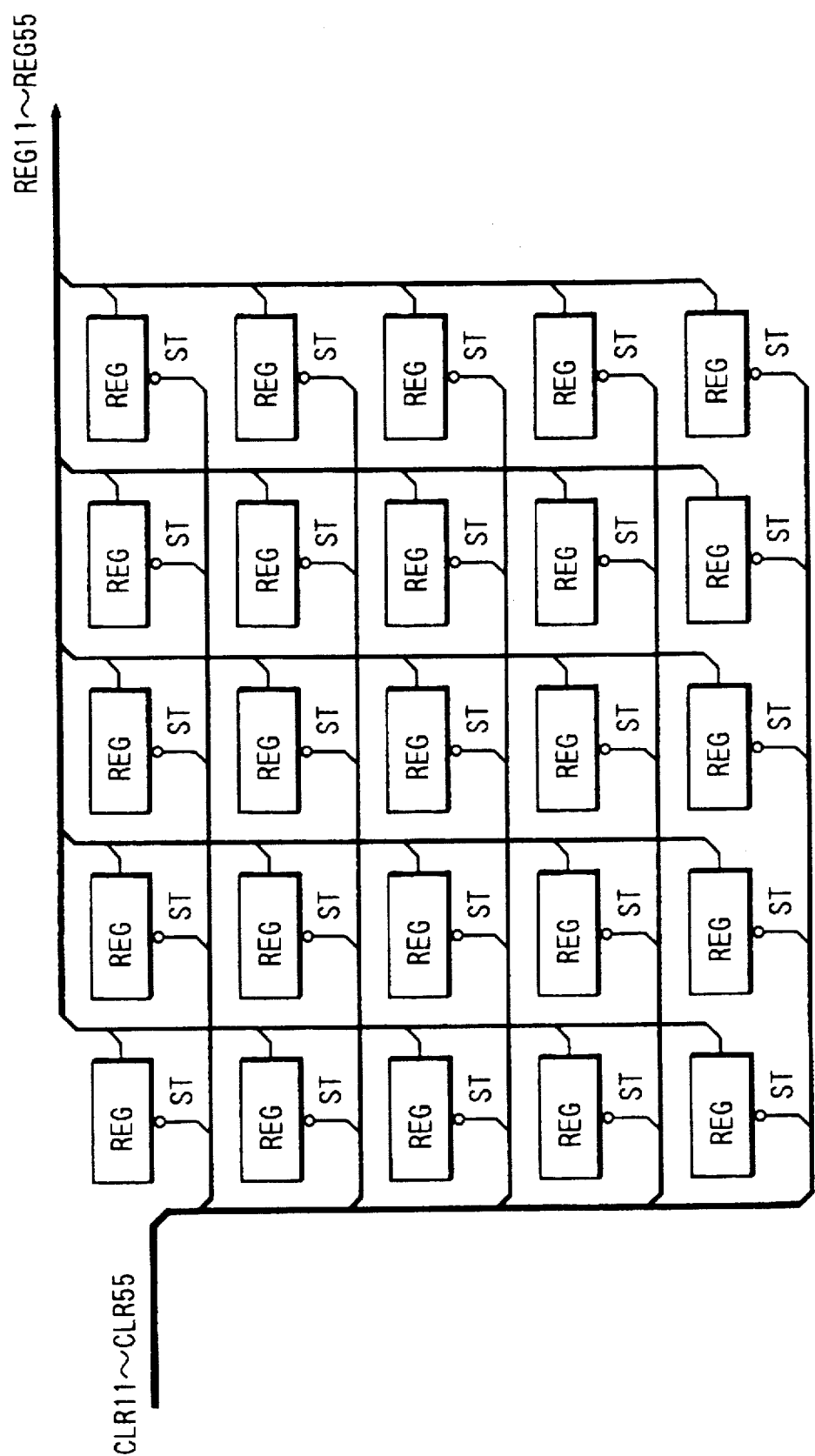
Figures 4, 5, 6, 7, 8, 9, 10:
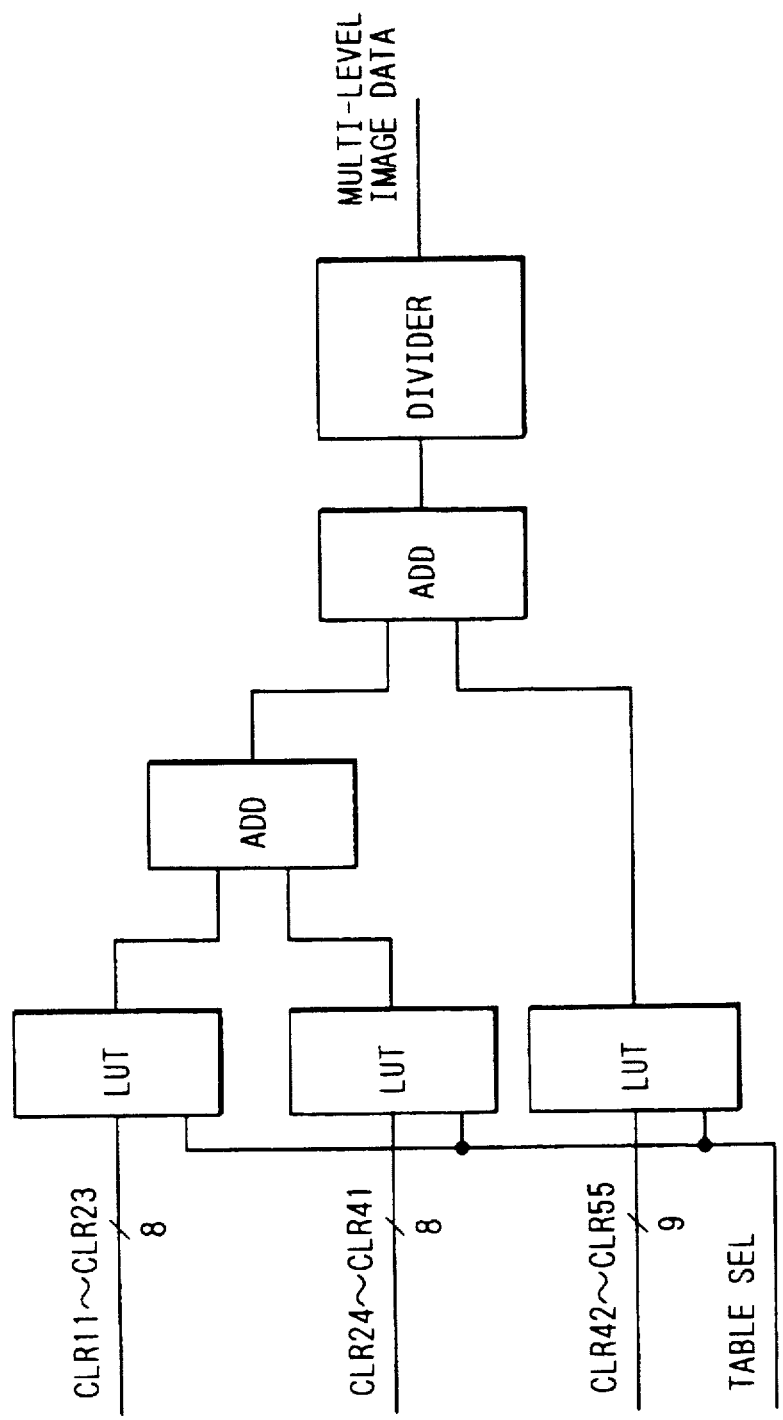
Figures 1, 4, 5, 6, 7, 8, 9, 10, 11:
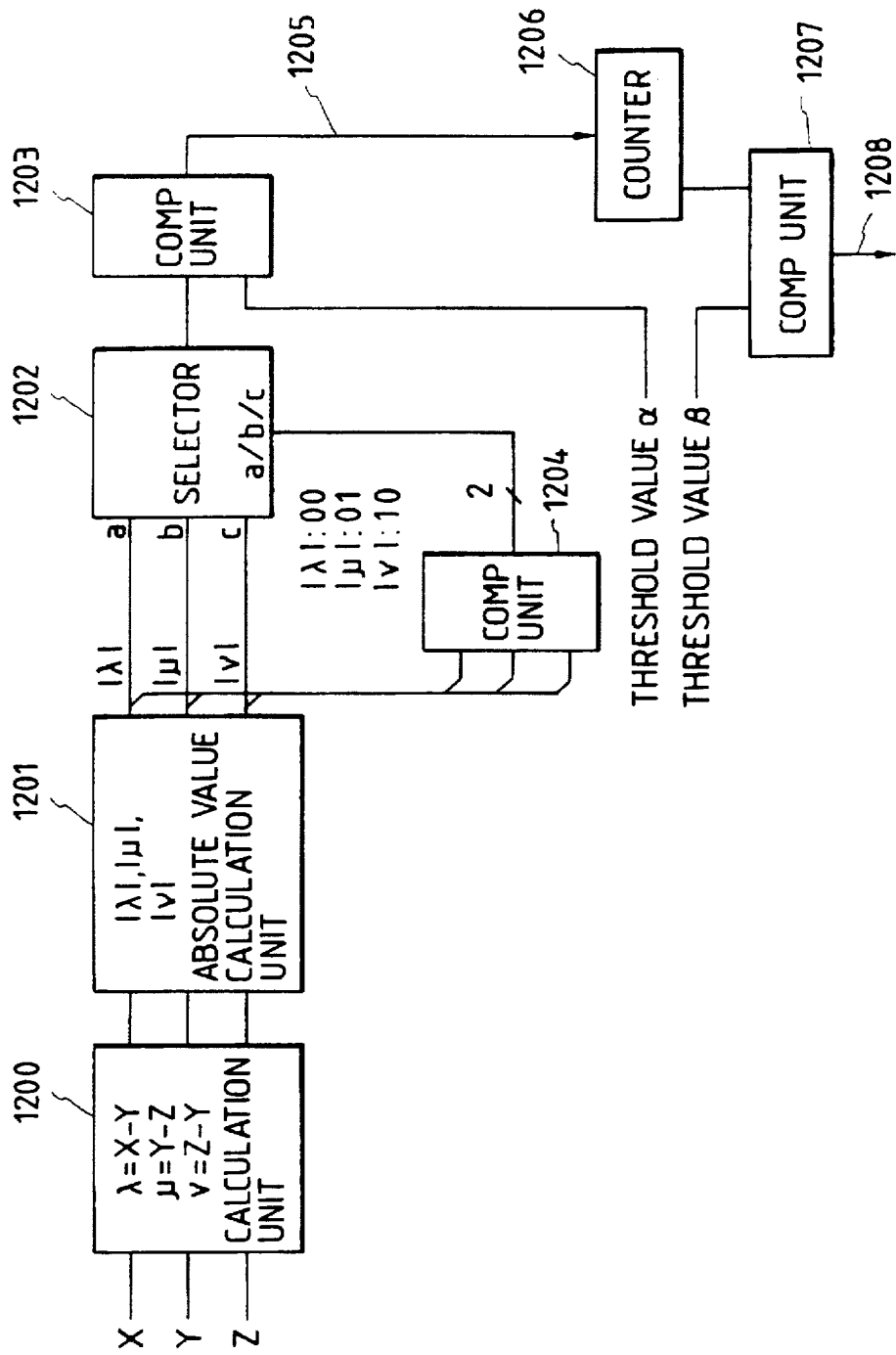
Figures 2, 4, 5, 6, 7, 8, 9, 10, 11:
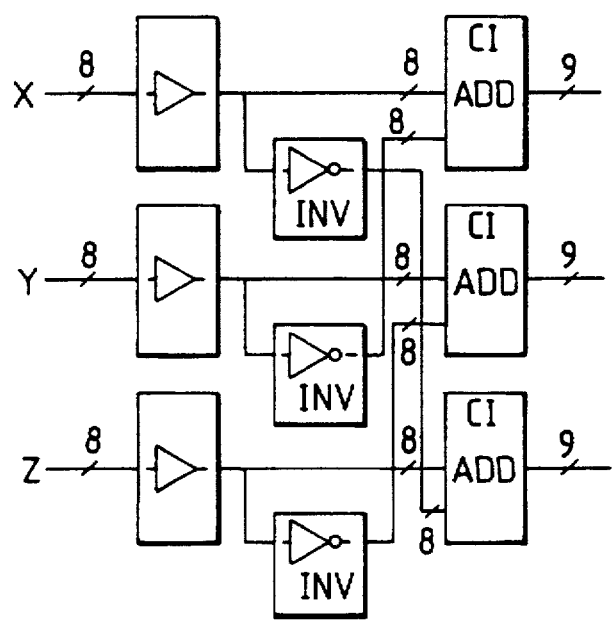
Figures 3A, 4, 5, 6, 7, 8, 9, 10, 11:
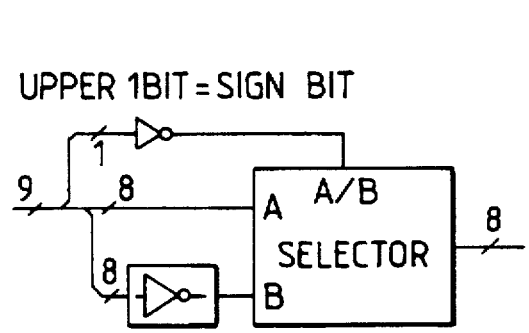
Figures 3B, 4, 5, 6, 7, 8, 9, 10, 11:
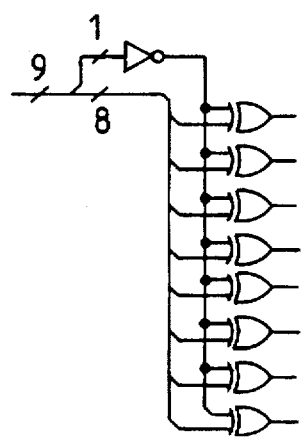
Figures 4, 5, 6, 7, 8, 9, 10, 11:
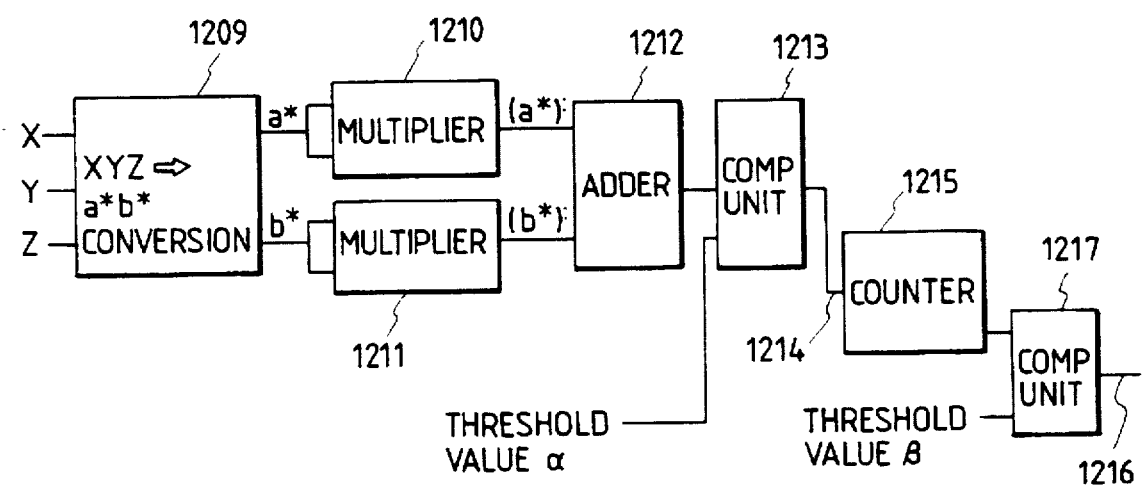
Figures 1, 4, 5, 6, 7, 8, 9, 10, 11, 12:
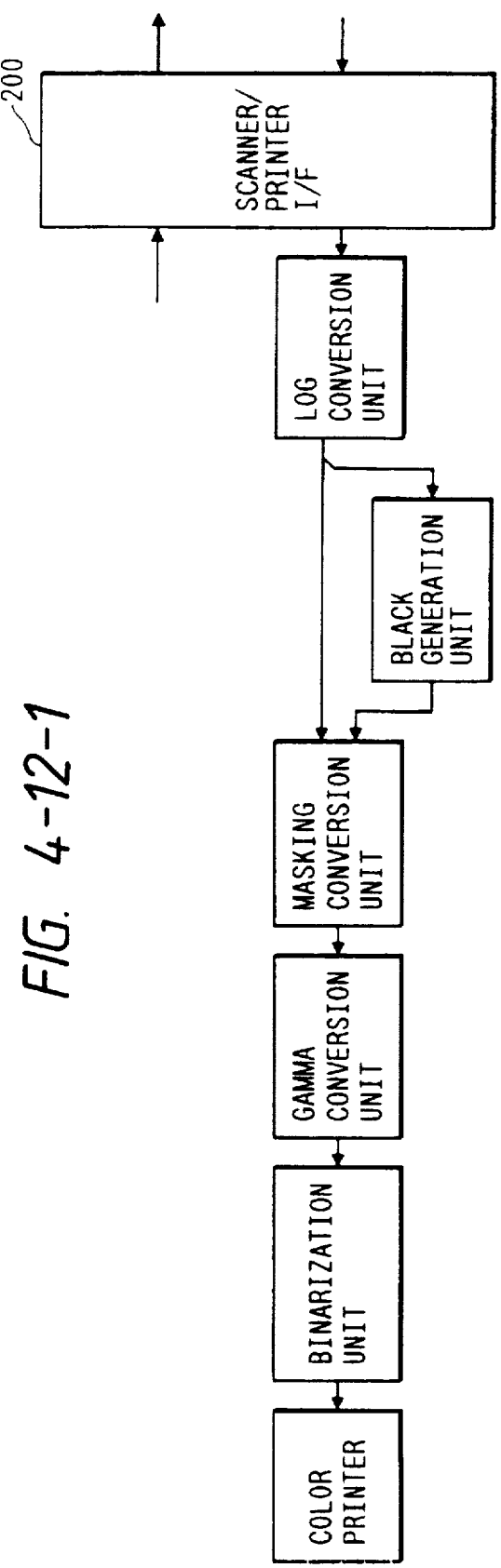
Figures 2, 4, 5, 6, 7, 8, 9, 10, 11, 12:
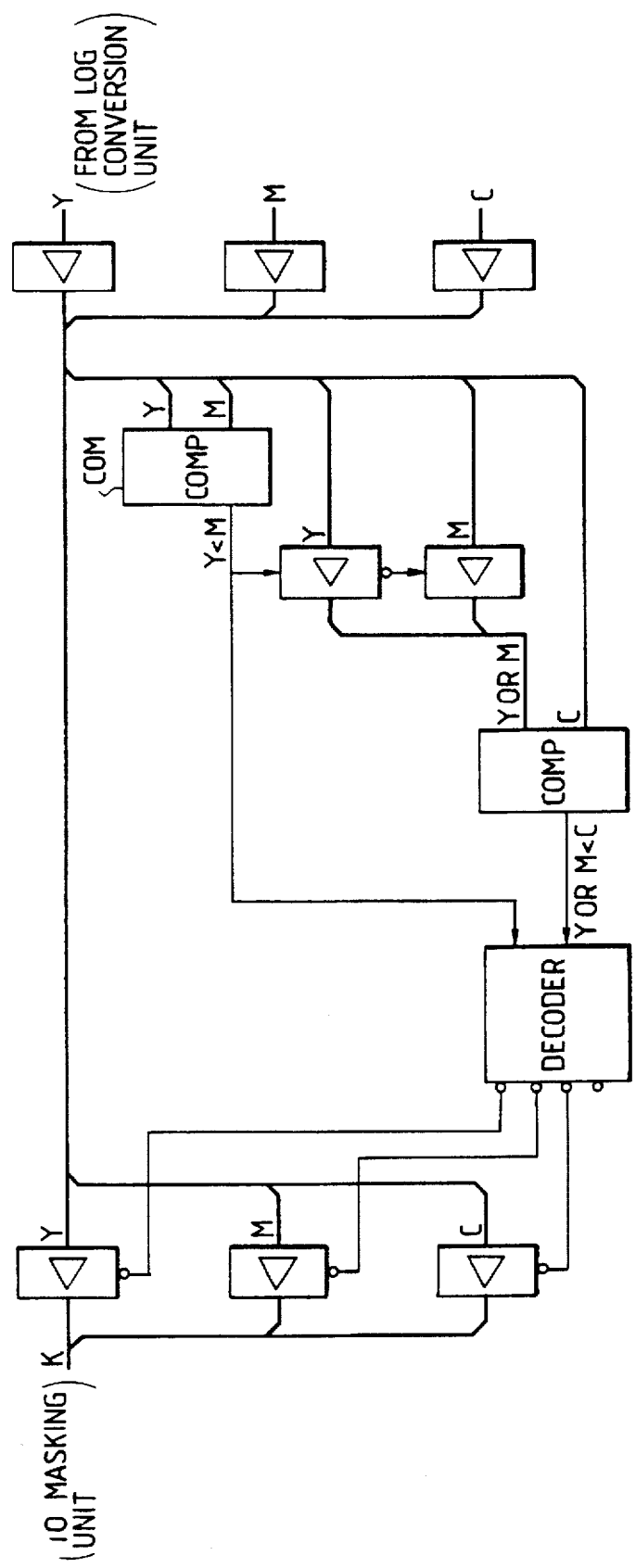

FIG. 4-6-4 shows the structure.

Kx and Ky are inter-pixel distances after conversion and are calculated by the CPU from magnifications Zx and Zy in the directions using equation (4-6-3).

Reference numerals 700 and 701 respectively designate x and y direction output pixel counters for calculating the x and y direction pixel clocks after conversion, to provide indices Ix and Iy indicative of the order number of the pixel under processing. Thus, when multiplication is done by ¼ in the y direction, with an input consisting of 128 pixels, the output consists of 32 pixels. If the multiplication is by 2, the output consists of 256 pixels. With the shuttle scan in this structure (see 3-5 shuttle scan format), the x and y direction pixel clocks are related as shown in FIG. 4-6-5.

Reference numerals 702 and 703 designate edge calculation units for calculating Lx1, Lx2, Ly1 and Ly2 in the x and y directions from Ix, Iy, Kx and Ky using equations (4-6-4) to (4-6-9).

Reference numeral 704 designates a one-line buffer for storing one-line-delayed image data necessary for processing. The one-line buffer comprises a FIFO memory.

Reference numeral 705 designates an interpolation pixel calculation unit for calculating output image data q from Lx1, Lx2, Ly1 and Ly2 from the edge calculation unit and input image data p1 to p4. An example of the interpolation pixel calculation unit is shown in FIG. 4-6-6.

The structure shown in FIG. 4-6-6 implements equation (4-6-2) with multipliers MUL and adders ADD.

Operation

The operation will be described with reference to FIG. 4-6-7.

The inter-pixel distances Kx and Ky after interpolation are obtained from magnification factors preset on the operation panel, or from magnification factors Zx and Zy, for matching to a paper size with which the destination facsimile is capable of dealing. These data are provided from a CPU (not shown).

A case of a magnification factor of ¼ is taken.

Data are stored in one-line buffer 704 in synchronism with the direction input pixel clock for 128 pixels. At this time, no output pixel clock is generated. It is assumed that counters 700 and 701 are reset to zero in advance.

Index Ly is increased from 1 to 32 until 32 y direction output pixels are provided, and y direction edge calculation until 703 calculates Ly1 and Ly2 from each value of Ly. At this time, the count of the x direction pixel counter, and hence x direction index Lx, remains zero, and Lx1 and Lx2 from x direction edge calculation unit 702 are not changed. When the processing of y direction one line 32 pixels (the input being 128 pixels) is ended, the x direction pixel clock is provided to change Lx to 1, and the operation is repeated.

The interpolation pixel calculation unit provides an interpolation result from the calculated values of Lx1, Lx2, Ly1 and Ly2 and input pixel data p1 to p4.

BINARIZATION SECTION

For binarization of multi-level image data, a threshold value of binarization must be determined. In the mean density preservation method, the mean image density in the neighborhood of a pixel to be binarized (hereinafter referred to as the object pixel) is used as threshold value. The mean image density in the neighborhood of the object pixel is obtained by weighting already obtained binary image data in a predetermined window. The multi-level data of the object pixel are binarized by using the threshold value obtained in this way. To preserve the density of the original image, the error after binarization is distributed to non-processed neighboring pixels. Thus, at the time of binarization, the object pixel is corrected with propagation errors from neighboring pixels before being compared to the threshold value.

This concept is shown is block form in FIG. 4-7-1. More specifically, section 801 for "calculation of mean density" provides 12 pixels of already obtained binary data, weighted as shown in FIG. 4-7-2, and takes the sum of the weighted data to obtain mean density M, which serves as the threshold value with respect to object pixel D. The sum of the weighting factors is 255. Further, for preserving the density at the time of binarization, section 802 for "calculation of error" adds together binarization errors E1 and E2 of the immediately preceding pixel and a pixel in the preceding line to obtain propagation error E0.

Next, section 803 for "conversion of object pixel" adds the multi-level data D of the object pixel and propagation error E0 to obtain object pixel density D' after correction.

Subsequently, section 804 for "binarization" compares object pixel density D' after correction and mean density M. The result of binarization is set such that B=1 when D'−M≧0 and B=0 when D'−M<0. Binarization error e0 is delivered to section 805 for "distribution of binarization error". Section 805 distributes binarization error e0 to the pixel in the succeeding line.

The ratio of distribution (i.e., error division ratio) is selected from (½, ½), (⅜, ⅝) and (¼, ¾) (FIG. 4-7-3). Further, it is possible to improve the texture of highlight portions by randomly switching the allotting of division errors e1 and e2 according to random data.

A specific example is shown below.

It is assumed that the density of an object pixel to be processed is 100 and that the results of the binarization of previously processed pixels are as shown in FIG. 4-7-4A. By multiplying the results of binarization by weighting factors shown in FIG. 4-7-2 and taking the sum of these products, the mean density M is determined to be 154. If the propagation error E1 from the preceding pixel is −30 and the propagation error E2 from the preceding line is +20 as shown in FIG. 4-7-4B, the object pixel density D' after correction is 90. When D' is binarized using the mean density (M=154) as threshold value, the result of binarization is zero, and the propagation error is −64. This error is distributed as e1 and e2 evenly, i.e., by one-half each, e1=e2=−2 (FIG. 4-7-4C).

When processing the end of the shuttle scan block and the immediately preceding pixel, there is no binary data already obtained for determining the mean density. Accordingly, non-processed multi-level data are weighted to an extent corresponding to FIG. 4-7-2 for using the result as binary data. This is referred to as "rear connection" or "end connection" (FIG. 4-7-5A).

To simplify the processing, the weighting factors are slightly altered. FIG. 4-7-5B shows the altered weighting factors. In this case, an overflow is possible when the mean density is calculated. In such a case, the mean density is clipped to 255. By so doing, no problems arise in practice.

FIG. 4-7-6A shows the overall structure of the binarization section. Reference numeral 806 designates a binarization processing unit, which has an inner structure as shown in FIG. 4-7-7. Reference numeral 807 designates FIFO memory used for preserving binarized error E2. FIG. 4-7-6B shows the bit structure of this memory. As shown, the upper 12 bits of the 18-bit data are used to store the binary data ("1" or "0") at previously binarized pixels, and the lower 6 bits are used to store the binarization error E2 from the pixel one line before.

Reference numeral 808 designates an SRAM used for connection processing at the time of shuttle scan. The SRAM has a bit structure as shown in FIG. 4-7-6C. As shown, the upper 2 bits of the 8-bit data are used to store the binary data ("1" or "0") of the end of the preceding block and the immediately preceding pixel.

FIG. 4-7-7 shows the inner processing circuit. Reference numeral 809 designates a mask processing unit for producing 12-bit mask data by shifting binary data after one- and two-line delay processing and immediately preceding processed data. Reference numeral 810 designates a connection processing unit for rear connection at the end of a shuttle scan. The unit calculates a value corresponding to the weighted binary data from multi-level data read in excess of 128 pixels.

Reference numeral 811 designates a mean density calculation unit for calculating the mean density by performing weighting as shown in FIG. 4-7-2.

Reference numeral 812 designates an input error calculation unit for calculating the propagation error from one-line delay error e2 and one-pixel delay error e1. Reference numeral 813 designates a binarization processing unit for comparing the sum of the object pixel density and the propagation error to the mean density to produce a binarization result. Reference numeral 814 designates an output error processing unit for dividing the error that results from the binarization performed in unit 813 into e1 and e2. The unit executes the division and diffusion of the error according to a predetermined distribution ratio.

The operation of the binarization circuit will now be described.

Head of Block

At the head of block, pixels a, b, f, g, k and l and propagation error E1 are read out from the SRAM, while pixels c, d, e, h, i and j and propagation error E2 are read out from the FIFO.

Binary data a to 1 are extracted in the mask processing unit and are weighted in mean density calculation unit 811 as data for a total of 12 pixels, i.e., 12-bit data, to calculate the mean density. Propagation errors E1 and E2 are taken as error E0 of 8 bits in the error calculation unit.

The sum D' of the object pixel density and the propagation error E0 is then compared to the mean density M. The result of binarization is set as B=1 when D'−M>0 and as B=0 when D'−M<0. Binarization error e0=D'−M is then divided in the output error processing unit. The division ratio is selected from ratios (½, ½), (⅜, ⅝) and (¼, ¾).

Of the division errors, e2 is temporarily stored in the FIFO, while e1 is immediately used in the next calculation.

Intermediate Part of Block

In the intermediate part of block, all binary data and propagation error E2 are read out from the FIFO, while E1 is obtained from the immediately preceding processing, as shown in FIG. 4-7-8B. Subsequent processing is the same as for the head of block.

End Of Block

At the end of block, pixels a, b, c, f, g, h, k and l and propagation error E2 are read out from the FIFO, while propagation E1 is obtained from the immediately preceding processing, as shown in FIG. 4-7-8C. Pixels d, e, i and j are obtained from the connection processing unit. After binarization, as noted above, propagation error e1 is written in the SRAM for connection processing.

Block Buffer 1 (BB1)

An example of the block buffer is shown in FIG. 3-3. This buffer has a double-buffer structure consisting of two buffers, BB1-0 and BB1-1, so that writing from the side of the binarization processing unit and reading from the side of the CODEC can be simultaneously performed (FIG. 4-8-1).

Vertical/Horizontal Conversion Function

Since writing is done from the binarization processing unit and reading is done from the CODEC side, the order of pixels when writing is different than when reading. The writing is performed for 128 successive pixels in the y direction. Then, one address is increased in the x or main scanning direction, and writing is done once again for 128 successive pixels in the y direction.

The reading is performed in the x or main scanning direction, then an address is increased in the y direction, and reading is once again performed successively for another line in the x direction (FIG. 4-8-2).

RAM Clear Function (for whiting a margin portion)

The above double-buffer structure will now be described in detail.

Structural Example 1

FIG. 4-8-3 shows Structural Example 1. Reference numeral 900 designates address generation unit 1, which successively increases addresses A0 to A6 and then increases addresses A7 to A19. FIG. 4-8-4 shows an example of address generation unit 1. The address generation unit 1 includes latch 916 for latching the output from CPU and latch 917, to which a margin is specified from the CPU. Counter 918 counts T/4 pixel clock, and counter 919 counts factors in the auxiliary scanning direction. Returning to FIG. 4-8-3, reference numerals 901, 903, 906 and 907 designate buffers for selecting, according to control signals AE0, AE1, DE0 and DE1, either one of the two buffers to which address and data are provided. Reference numerals 902 and 904 designate decoders for providing a chip select signal to a buffer to be selected according to an address from address generation unit 1-900 and control signals AE0 and AE1. AE0 to DE3 are provided from 0E controller 916 according to the output (either "0" or "1") from the CPU. Reference numerals 908 and 909 designate buffer memories. In this example, SRAMs are used for the buffer memories, but it is also possible to use DRAMs. In the latter case, however, control signals (such as RAS, CAS, REFRESH) for the DRAMs are necessary.

Reference numerals 901, 912, 914 and 915 designate buffers for selecting, according to control signals AE2, AE3, DE2 and DE3, either one of the two buffers to which an address is to be provided, and either one of the two buffers from which data are to be read. The address at this time is provided from the CODEC side. Reference numerals 911 and 913 designate decoders for providing a chip select signal to a buffer to be selected according to an address from the CODEC side and control signals AE2 and AE3.

Operation of Structural Example 1

Writing Into Buffer 1:

The CPU sets data in 0E controller 916 to render AE0 and DE0 active for selecting buffer 1. Image data (R, G, B, X), supplied in synchronism with pixel clock T/4, are latched for each color in latch 905 and, since DE0 is active, are supplied through buffer 906 to data bus 1. Meanwhile, in address generation unit 1-900, a counter is operated under the control of pixel clock T/4. When 128 pixels are counted in the y direction, the upper address is increased by ripple-out. Further, if a margin value is set externally (for instance from the CPU) in advance, an off-set of counter 919 is brought about through latch 917. Thus, data are written to the buffer memory from a position deviated by the margin value in the printing direction. Thus, a margin adjacent to the left edge of paper is formed. The address generated in the above way is progressively increased from A0, and is supplied through address bus 1 to buffer 1. Writing is done under control of the $\overline{WE}$ signal.

Writing Into Buffer 2 and Reading From Buffer 1:

Writing into buffer 2 is the same as writing into buffer 1, except that $\overline{AE0}$ and $\overline{AE1}$, $\overline{DE0}$ and $\overline{DE1}$, address bus 1 and address bus 2, and data bus 1 and data bus 2 are different.

Reading from buffer 1 can be effected from the CODEC side as follows. For selecting buffer 1, the CPU sets data in latch 916 to render $\overline{AE2}$ and $\overline{DE2}$ active ("L"). Addresses A0 to A6 generated from the CODEC side are fixed, and the address is progressively increased from A7. When addresses up to A19 are counted, A0 is increased. This address is supplied through address bus 1 to buffer 1 to be read out from the CODEC side data bus through buffer 914.

Writing Into Buffer 1 and Reading From Buffer 2:

Writing into buffer 1 and reading from buffer 2 can be simultaneously performed by reversing buffers 1 and 2 in the above example and appropriately controlling the $\overline{AE}$ and $\overline{DE}$ signals.

Structural Example 2

FIG. 4-8-5 shows Structural Example 2. Only the differences between this structural example and Structural Example 1 will be described. In Structural Example 2, buffers 920 and 921 are added to the circuit of Structural Example 1, and inputs to buffers 920 and 910 are pulled up, forming a clear circuit.

Operation Of Structural Example 2

The contents in buffer 1 are RGB data. If RGB data are "H", the data represent white. Thus, when "H" is provided to the data bus for writing, nothing is printed on paper. Here, writing "H" is called clearing.

To clear buffer 1, when an address is provided from address generation unit 1 or to address bus 1 from CODEC, that is, when $\overline{AE0}$="L" or $\overline{AE2}$="L", $\overline{DE4}$ is rendered active ("L") for writing. To clear buffer 2, when $\overline{AE0}$="L" or $\overline{AE2}$="L", $\overline{DE5}$ is rendered active for writing. As a result, "H" is written in the designated address. Depending on the method of address generation, it is possible to provide margin portions adjacent to the opposite edges of paper by shuttle scan type address generation, or to provide a margin of a predetermined length from the top with raster scan type address generation.

Structural Example 3

FIG. 4-8-6 shows Structural Example 3. In this example, circuits 922 to 926 are added to the circuit of Structural Example 2.

Reference numerals 922 and 924 designate buffers, 923 and 925 decoders and 926 an address generation unit 2 having an inner structure as shown in FIG. 4-8-7. Addresses generated from address generation unit 2-926 may be of shuttle scan type (successively increased from A0) or of raster scan type (A0 to A6 being fixed and A0 being counted after counting of A7 to A19). Address generation unit 2-926 differs from address generation unit 1-900 in that it is driven not by the T/4 pixel clock, but rather by it own high speed clock.

Operation Of Structural Example 3

Address generation unit 2, which is provided in this example, generates addresses for initializing all the memory contents to "H".

For clearing buffer 1, an address is generated by operating the counter with a high speed clock. Writing is done under the control of the $\overline{WE}$ signal with $\overline{AE4}$ and $\overline{DE4}$ held active ("L").

Structural Example 4

FIG. 4-8-8 shows Structural Example 4. In this example, color/monochrome selection circuit 917 is added to the circuit shown in FIG. 4-8-3, with the remainder of the circuit being the same.

FIG. 4-8-9 shows the internal structure of circuit 917 shown in FIG. 4-8-8. The circuit of FIG. 4-8-9 permits selection of a variety of color designations from the CPU.

Operation Of Structural Example 4

The CPU first determines a color R, G, or B to be selected. When selecting G, for example, the CPU sets "01". When the color/monochrome judgement circuit judges the image to be monochrome, it provides a color/monochrome selection output of "1". As a result, the same color is provided to all the color data buses. Since G is selected in this case, "G, G, G" data are provided to the CODEC side. When color/monochrome judgement circuit judges data to be color data, "0" is set, and normal RGB data are provided to the CODEC data bus.

In this example, monochrome data are realized by selecting one of the supplied color component signals and providing each selected component data as image data of a plurality of synthesis means.

In FIG. 4-8-90, reference numerals 1 to 6 designate tri-state buffers, and reference numeral 7 designates a 3-bit input decoder.

Block Buffer 2 (BB2)

BB2 is basically the same as BB1, except that writing and reading are performed in the opposite directions. However, the reading from the multi-level processing unit is not done for a fixed number of pixels, such as 128 or 256 pixels, but is rather done for 128+α pixels as shown in FIG. 4-9-1. This produces an overlap at all times. Therefore, although only 128 pixels are ultimately required, the multi-level generation processing and printer require +α pixels as marginal pixels. Thus, reading must be performed as shown in ①, ② and ③. In ①, only reading from buffer 1 is necessary. In ②, it is necessary to read data from buffers 1 and 2 consecutively. Thus, in order to simultaneously write to the CODEC side, a further buffer is necessary. For this reason, BB2 has a tri-state buffer structure (FIG. 4-9-1). The remainder of the structure is the same as BB1.

Vertical/Horizontal Conversion Function

Writing is done to the CODEC side, while reading is done from the multi-level generation processing unit. Therefore, the sequence order of pixels is different in writing and in reading. More specifically, writing is done in the x or main scanning direction, then the address is increased in the y direction, and then reading is performed in the x direction again. For reading, writing is done for 128 pixels in the y direction, then one address is increased in the x or main scanning direction, and then writing is done for 128 pixels in the y direction.

Example:

BB2 is the same as BB1 except that writing and reading are done in the opposite directions, and BB2 has a three-buffer structure. Accordingly, its description is not given.

MULTI-LEVEL GENERATION SECTION

Example 1:

Multi-level generation is performed from a dot pattern in a 3-by-3 window with reference to the table.

Structure

FIG. 4-10-1 shows the structure. Reference numeral 1100 designates a FIFO (1024×2 bits) used for a line delay of image data. Circuits 1101 to 1104 constitute a latch train for delaying image data. Reference numeral 1105 designates a ROM, and 1106 a latch. The contents of the ROM have filtering, as shown in FIG. 4-10-2, with some tables provided.

Operation

Binary image data are supplied to latch 1106 and FIFO 1100. The FIFO executes a delay for one line, and data for a total of three lines are supplied to three-block latch train 1101 to 1104. Adjacent 3-by-3 image data are taken out and provided as an address to ROM 1105.

As a result, 8-bit data are obtained. Further, the ROM has several tables which can be accessed according to a pattern SEL signal depending on a character mode, an intermediate tone mode and coexistence mode. Further, the tables are provided with a through mechanism of passing data without any processing.

Alternative Structure 1

In the above structure, pixels of R, G, B and X are stored point sequentially in FIFO 1100. By providing serial/parallel and parallel/serial conversion functions before and after the FIFO, as shown in FIG. 4-10-3, only a single FIFO of 256×4×2, i.e., 256×8 bits is necessary.

In this case, the FIFO shown in FIG. 4-10-1 is removed, and the circuit shown in FIG. 4-10-3 is provided instead. Binary data (BINARY DATA) R, G, B and X are first supplied point sequentially to serial/parallel conversion unit in synchronism with VCLK14, to be provided as parallel data.

These data are supplied to D10 through D13 and, after a one line delay, provided to D0 through D03 to be supplied to D14 to D17 for another line delay. That is, after a two line delay, the data are provided to D04 to D07.

At this time, reading and writing of image data R, G, B and X with respect to the FIFO are effected in synchronism with clock VCKL1 at ¼ the frequency.

In this way, data R, G, B and X delayed by one line and also data R, G, B and X delayed by two lines are supplied to the parallel/serial conversion unit to be successively read out in synchronism with VCLK14 to obtain serial point-sequential image data delayed by one line and also by two lines.

Further input binary data BINARY DATA are delayed in a timing control delay line by a clock portion corresponding to the delay in the serial/parallel and parallel/serial conversion units. In this way, point-sequential image data for the first to third lines are supplied to latch train 1102, 1103 and 1104 for multi-level generation processing.

Alternative Structure 2

FIG. 4-10-4 shows part of an example of a structure for realizing ROM 1105 in the above example with a RAM. In this case, ROM 1105 is removed from the circuit of FIG. 4-10-1, Q0 to Q8 are coupled to selector SEL, and the D input to the D flip-flop is coupled to D output of the RAM. Either binary image data Q0 to Q8 or the CPU address are selected by selector SEL to be provided as the address of the RAM. In normal multi-level generation, Q0 to Q8 are selected by selector SEL, and multi-level recovery data are provided from the RAM.

Now, writing of multi-level recovery data from CPU (not shown) in the RAM will be described.

The lower 9 bits of address from the CPU are selected by selector SEL and supplied as addresses to the RAM. At the same time, CPU bus write signal CPUWR and chip select signal CS for selecting the RAM are supplied through a NAND gate to a select control line of selector SEL, a write enable terminal of the RAM and buffer. The selector output is thus provided with the selection of CPU address, and a write mode of the RAM is set. At the same time, the buffer is enabled, and CPU data are supplied to an input/output port of the RAM. Thus, writing of multi-level data is effected. The chip select signal CS, although not shown, is generated by decoding the upper bits of the CPU address.

Writing is thus done with respect to $2^9$ patterns of Q0 to Q8. Thus, the state of the RAM can be controlled.

In addition, it will be obvious that in the case where the pattern SEL signal has been provided to ROM 1105, as in the first embodiment, writing may be done by using the CPU address as such with additional bits.

Example 2:

As in Example 1, it is possible to set a window side of 5 by 5. In this case, however, 25 pixels are used. Therefore, it is impossible to form a table with a single memory. Accordingly, a structure which uses product and sum calculations and a structure in which a table constituted by several separate memories is used are shown.

Structure (where product and sum calculations are used)

FIG. 4-10-5 shows a structure for shifting 5 by 5, i.e., 25, pixels. This is a mere expansion of a 3 by 3 structure. This can be used for both the structure that uses product and sum calculation, and for the structure that uses a table constituted by several separate memories.

FIG. 4-10-6 shows the structure of the portion that calculates the product. Each register can provide a 4-bit output. Its filter factor is written from the CPU. The register outputs "0" if and only if ST is "0", and provides a preset factor if ST is "1".

FIG. 4-10-7 shows the structure of the portion that calculates the sum. This portion has an adder structure consisting of 24 adders and a divider.

Operation 25 pixels CLR11 to CLR55, taken out in shift section, are supplied to this ST terminal of each register in the product portion. In each register of this portion, a factor is set by the CPU. Registers REG11 to REG55 provide the value of the factor if CLR11 to CLR55 are "H" and provide "0" if CLR11 to CLR55 are "L".

The sum portion subsequently takes the sum of all the register outputs, and divides this sum by the divider for dynamic range adjustment.

If the transmission image is identified to be an intermediate tone image or character image according to an instruction from the operation panel, or as a result of negotiation at the start of communication, the window size may accordingly be set to 3 by 3 by changing the values in the registers in the product portion with the CPU. More specifically, the factors in the 5 by 5 matrix, other than the factors in the center 3 by 3 matrix, are set to "0", and the value of the divider is changed accordingly. FIG. 4-10-8 shows an example of matrix factors.

Structure (with several memories)

FIG. 4-10-9 shows a structure in which a table constituted of several separate memories is used. In this structure, 25 data bits of CLR11 to CLR55 from the shift portion of FIG. 4-10-5 are divided into two groups of 8 bits of (CLR11 to CLR23, and CLR24 to CLR41) and a group of 9 bits (CLR42 to CLR55). These groups are used as addresses of memories constituting table, and are added together. After dynamic range adjustment of this sum, multi-level image data are obtained.

Again with this structure it is also possible to set the window size to 3 by 3 or 5 by 5 by switching the table according to the table SEL signal.

COLOR/MONOCHROME JUDGEMENT SECTION

Example 1:

This section judges whether input image represents a color image or a monochrome image from X, Y and Z values obtained from the input image. With a monochrome image, the values of X, Y and Z are much closer to one another. Accordingly, the image is judged to be monochromatic if the difference between these values is within threshold value α.

Structure

FIG. 4-11-1 shows the structure.

Reference numeral 1200 designates a subtraction unit for calculating $\lambda=X-Y$, $\mu=Y-Z$ and $\nu=Z-X$ from X, Y and Z. FIG. 4-11-2 shows an example of its structure in detail. In FIG. 4-11-2, the blocks labeled INV are inversion circuits. Reference numeral 1201 designates an absolute value calculation unit. FIGS. 4-11-3A and 4-11-3B show respective examples of the circuit structure of this unit. (More accurately, with the circuits of FIGS. 4-11-3A and 4-11-3B, it is necessary to add "1" afterwards. However, in this example, the circuits as shown may be used.) Reference numeral 1202 designates a selector, 1203 a comparator for comparing the selector output and the threshold value α, 1204 a comparator for comparing three outputs from the absolute value calculation unit and selecting the greatest output, 1205 a color judgement signal line, 1206 a counter, 1207 a comparator, and 1208 a color original judgement signal line.

Operation $\lambda=X-Y$, $\mu=Y-Z$ and $\nu=Z-X$ from X, Y and Z given by subtraction unit 1200, and their absolute values are obtained. Then, according to a code (such as 2-bit code as shown), the greatest value among $|\lambda|$, $|\mu|$ and $|\nu|$ is determined by comparator 1204, and selected by selector 1202. The selected value is compared to the preset threshold value α in comparator 1203. If the threshold value is exceeded, color judgement signal 1205 is provided.

Counter 1206 counts the number of times color judgement signal 1205 is generated. This number is compared to threshold value β in comparator 1207. If the number exceeds threshold value β, color original judgement signal 1208 is inverted to "1", representing that a color original has been judged.

Example 2:

Luminance and chromanance (a* and b*) are obtained from data X, Y and Z, and if the sum of their squares exceeds a preset threshold value, a color judgement signal is provided.

Structure

FIG. 4-11-4 shows the structure. Reference numeral 1200 designates a conversion unit for obtaining a* and b* from XZY data through conversion using equation (4-11-1). The internal structure of this unit may be based on the RGB/RGB conversion table shown in FIG. 4-3-1 (for example, Structural Example 3 shown in FIG. 4-3-3 or Structural Example 4 shown in FIG. 4-3-4). Reference numerals 1210 and 1211 designate multipliers, 1212 an adder, and 1213 a comparator. Reference numeral 1214 designates a color judgement signal line, 1215 a counter, 1216 a comparator and 1217 a color original judgement signal line. a* and b* are calculated as follows:

$$a^* = 500 \left[ \left(\frac{X}{X_o}\right)^{1/3} - \left(\frac{Y}{Y_o}\right)^{1/3} \right] \quad (4\text{-}11\text{-}1)$$

$$b^* = 200 \left[ \left(\frac{Y}{Y_o}\right)^{1/3} - \left(\frac{Z}{Z_o}\right)^{1/3} \right]$$

where $X_0$, $Y_0$ and $Z_0$ are, for standard light:

$X_0 = 98.072$ $Y_0 = 100.00$ $Z_0 = 118.225$

Operation

Conversion unit 1209 calculates a* and b* from input XYZ data using equation (4-11-1). Multipliers 1210 and 1211 calculate $(a^*)^2$ and $(b^*)^2$, respectively. Adder 1212 takes the sum of the results, and comparator 1213 compares the sum to preset threshold value α. If the threshold value is exceeded, color judgement signal 1214 is provided. Counter 1215 counts the number of times color judgement signal 1214 is generated, and comparator 1216 compares the number to threshold value β. If this exceeds threshold value β, color original judgement signal 1217 is inverted to "1", indicating that a color original has been judged.

RGB (SCANNER)/XYZ CONVERSION SECTION

RGB (scanner)/XYZ conversion section has the same structure as the RGB (scanner)/RGB (NTSC) conversion section. However, the factor of the conversion equation is different, which value varies with the scanner under consideration.

XYZ/RGB (NTSC) CONVERSION SECTION

This part of circuit is the same in structure as the RGB (scanner)/RGB (NTSC) conversion section. The conversion in this case, however, is executed using equation (4-12-1). This equation assumes that reference white is standard light, and the luminance of basic excitation is 1, with R=G=B=1.

$R = 1.1906X - 0.5326Y - 0.2883Z$ $G = -0.9843X + 1.9984Y - 0.0283Z$ \quad (4-12-1)

$B = 0.0584X - 0.1185Y + 0.8985Z$

PRINTER SECTION

FIG. 4-12-1 shows the printer section. As shown, the section includes a log conversion unit, a black generation unit, a masking conversion unit, a gamma conversion unit and a color printer, all elements connected through scanner/printer interface 200. The individual units will now be described.

Log Conversion Unit

This unit performs logarithmic conversion of NTSC standard luminance RGB data supplied from the image processing unit to density YMCK data using the following equations:

$$C = 255/D_{max} \log_{10} R_{NTSC}/255$$

$$M = 255/D_{max} \log_{10} G_{NTSC}/255 \quad (4\text{-}13\text{-}1)$$

$$Y = 255/D_{max} \log_{10} B_{NTSC}/255$$

where $D_{max}$ is a density value of the darkest portion which can be expressed in print. Here, 8-bit data for each of R, G and B are passed through a look-up table for conversion. The LUT is a quantization of these equations to 0 to 225. The structure of the LUT is similar to the structure of the gamma conversion unit in the image processing unit, and its description is not given.

Black Generation Unit

The minimum density data among the YMC data supplied from the log conversion unit are determined, and the value is set as black K.

FIG. 4-12-2 shows the structure of this unit. Comparator COM compares the magnitudes of data Y and M, and comparator COMP compares the smaller one of these data and remaining data C. The decoder determines the smallest one of data Y, M and C, and this color is provided as data of black K from one of gates Y, M and C.

Masking Conversion Unit

Y, M and C data supplied from the log conversion unit and K data supplied from the black generation unit are converted to Y', M', C' and K' matched to the printer. This conversion can be expressed by a matrix operation similar to the operation in the RGB/RGB conversion section, for example as given by an equation:

$$\begin{pmatrix} Y' \\ M' \\ C' \\ K' \end{pmatrix} = \begin{pmatrix} a_{11} & a_{12} & a_{13} & a_{14} \\ a_{21} & a_{22} & a_{23} & a_{24} \\ a_{31} & a_{32} & a_{33} & a_{34} \\ a_{41} & a_{42} & a_{43} & a_{44} \end{pmatrix} \begin{pmatrix} Y \\ M \\ C \\ K \end{pmatrix} \quad (4\text{-}13\text{-}2)$$

Factors $a_{ij}$ can be obtained experimentally.

The circuit structure is similar to the RGB/RGB conversion section and is not described.

Operation

CPU 100 shown in FIG. 2-2 checks on the basis of communication protocol whether the received data are in the color mode. If the data are in the color mode, YMCK data are converted to those conforming to the color characteristics of the printer.

If it is found after communication protocol that the received data are in a monochrome mode, the data can be encoded by MMR or by MM2.

For example, when monochrome data are held only in data Y among YMCK data and data M, C and K are 0, the conversion is done as follows:

$$\begin{pmatrix} Y' \\ M' \\ C' \\ K' \end{pmatrix} = \begin{pmatrix} 0 & 0 & 0 & 0 \\ 0 & 0 & 0 & 0 \\ 0 & 0 & 0 & 0 \\ 1 & 0 & 0 & 0 \end{pmatrix} \begin{pmatrix} Y \\ M \\ C \\ K \end{pmatrix} \quad (4\text{-}13\text{-}3)$$

If monochrome data are held in all of data Y, M and C in YMCK data, K is set to 0 by the black generation unit. In this case, the same matrix is used.

Gamma Conversion Unit

This conversion uses 8-bit conversion tables corresponding to Y, M, C and K:

$Y''=f(Y')$ $M''=f(M')$ $C''=f(C')$ $K''=f(K')$

Structural Example

Since the conversion is similar to the conversion in the gamma conversion unit in the image processing section, similar structure may be used. Accordingly, its description is not given.

Binarization Unit

This unit performs binarization for each color of Y", M", C" and K".

Structural Example

Since the processing is similar to that in the binarization unit in the image processing section, its description is not given.

As has been shown in this embodiment, at the time of memory copy the RGB (scanner)/RGB (NTSC) conversion circuit is bypassed, and the masking parameter in the color processing circuit in the scanner is set for copy. Thus, there is no need for plural scanning corresponding to the number of copies. Moreover, the image quality is free from deterioration, since there is no wasteful operation of RGB standardization.

Accordingly, a copy operation can be performed without deteriorating the image quality, and standard data can be transmitted.

As has been shown, according to the invention, by constructing the image reading section using a line sensor covering the shuttle width of shuttle scan, it is possible to reduce the size of the image reading section, as compared with a long close-contact-with-origin sensor, a staggered arrangement sensor or a line sensor in a scale-reducing optical system. This makes it possible to increase the resolution, and to achieve highly accurate results with small color filters.

Other Modifications

In the above embodiment, after reading an image by shuttle scan, the data are binarized and converted to raster form data before compression. However, when the image receiving side provides an image in the shuttle scan system (that is, in case where the head is short and shuttle scan must be used as in a BJ printer), it is possible to dispense with the portion for conversion to the raster form, without any problems in transmission of data after compression.

Further, it is possible to transmit image without binarization, i.e., to transmit multi-level image data.

Further, it is possible to vary the scan width of the shuttle scan to be one pixel, 64 pixels, 256 pixels and so forth.

Further, overlap reading of the same image area may be readily done at the time of the shuttle scan.

In the above embodiments, a shuttle/raster conversion unit and a raster/shuttle conversion unit are provided before the compression unit and after the expansion unit, respectively. Such conversions are performed on binary image data. Thus, image processing other than the compression and expansion may be performed on shuttle scan form data. Further, the vertical/horizontal conversion in shuttle/raster conversion is performed on multi-level data, and therefore only ⅛ of memory is needed.

As has been shown by adopting the shuttle scan system for image processing in the scanner and printer, it is possible to reduce size of the scanner sensor and printer head, and to reduce the size of the buffer needed for the individual image processing. Further, when conversion between raster and shuttle is performed before the compression and after the expansion on binary data, the memory needed for conversion is smaller than in the case of multi-level data. Moreover, image processing other than the compression and expansion can be performed on shuttle scan form data. It is thus possible to provide a small scale system as a whole.

As has been described in the foregoing, it is possible to provide a communication apparatus which is smaller in size and which has the versatility of a standard communication system.

In addition, data read out in the shuttle scan system can be scan converted after matching to the color characteristics of the communication line, and converted to n-level data. Thus, versatility of communication can be obtained even with a small reading section.

we claim:

1. An image processing apparatus comprising:
    color correction means for converting color data received in raster form to data in shuttle form and color correcting said shuttle form data to data for a printer; and
    means for supplying said color corrected shuttle form data from said color correction means to the printer.

2. The image processing apparatus according to claim 1, wherein said color correction means includes:
    conversion means for said received raster form color data to shuttle form data; and
    means for color correcting said color data from said conversion means to data for the printer.

3. The image processing apparatus according to claim 1, wherein said printer prints shuttle form data.

4. The image processing apparatus according to claim 1, wherein said printer is an ink jet printer.

5. The image processing apparatus according to claim 4, wherein said ink jet printer discharges ink through film boil.

6. The image processing apparatus according to claim 1, which further comprises:
    receiving means for receiving said raster form data from a line.

7. The image processing apparatus according to claim 1, which further comprises said printer.

8. An image processing apparatus comprising:
    first means for converting given color image data to standard color space data; and
    second means for converting said color space data obtained from said first means to raster scan.

9. The image processing apparatus according to claim 8, which further comprises:
    third means for converting objective color image to color image data.

10. The image processing apparatus-according to claim 8, wherein said given color image data is shuttle form data.

11. The image processing apparatus according to claim 8, wherein said first means converts said given color image data to NTSC standard color image data.

12. The image processing apparatus according to claim 8, which further comprises:
    means for binarizing said standard color space data from said first means and supplying binary data thus obtained to said second means.

13. The image processing apparatus according to claim 8, wherein said second means includes:
    a memory for storing said standard color space data obtained from said first means; and means for controlling the writing of image data in said memory and reading of image data from said memory.

14. The image processing apparatus accoring to claim 8, which further comprises:

compression means for compressing raster form data obtained from said second means.

15. The image processing apparatus according to claim 14, which further comprises:

means for transmitting compressed data obtained from said compression means.

16. A color image communication apparatus comprising:

scan conversion means for converting n-level image data received in a raster scan system via a communication line to data in a shuttle scan system;

multi-level conversion means for converting color n-level data obtained from said scan conversion means to multi-level data; and color conversion means for converting color characteristics of multi-level data obtained from said multi-level conversion means from color characteristics for a communication line to color characteristics of output color recording means.

17. The color image communication apparatus according to claim 16, wherein said n-level data is one-pixel one-bit data.

18. The color image communication apparatus according to claim 16, wherein said multi-level data is one-pixel 8-bit data.

19. The color image communication apparatus according to claim 16, which further comprises:

recovery means for recovering said received data from said communication line.

20. The color image communication apparatus according to claim 16, which further comprises:

means for supplying color conversion data obtained from said color conversion means to said color recording means.

21. The color image communication apparatus according to claim 16, wherein said color recording means is ink jet recording means.

22. The color image communication apparatus according to claim 21, wherein said ink jet recording means discharges ink through film boil.

23. A color image communication apparatus comprising:

means for generating shuttle scan system color signal;

color conversion means for converting said color signal to signal matched to standard color characteristics for a communication line;

n-level conversion means for converting said converted color signal from said color conversion means to n-level signal; and means for performing data scan conversion of said n-level data from shuttle scan system to raster scan system and sending out the raster scan system n-level data to said communication line.

24. The color image communication apparatus according to claim 23, wherein said multi-level data is one-pixel 8-bit data.

25. The color image communication apparatus according to claim 23, wherein said sending means includes:

compression means for compressing said raster scan system color data.

26. The color image communication apparatus according to claim 23, wherein said generating means is image pick-up means.

* * * * *

UNITED STATES PATENT AND TRADEMARK OFFICE
CERTIFICATE OF CORRECTION

PATENT NO. : 5,761,394

DATED : June 2, 1998

INVENTOR(S) : SUSUMU SUGIURA ET AL.

Page 1 of 2

It is certified that error appears in the above-identified patent and that said Letters Patent is hereby corrected as shown below:

On the title page,

Item [56] References Cited

FOREIGN PATENT DOCUMENTS, "1101152" should read --1-101152--.

SHEET 15

Figure 3-10, "SMOOTING" should read --SMOOTHING--.

COLUMN 23

Line 65, "e1=e2=-2" should read --e1=e2=-32--.

COLUMN 24

Line 64, "D'-M>0" should read --D'-M≥0--.

COLUMN 34

Line 28, "for" should read --for converting--.
Line 53, "apparatus-according" should read --apparatus according--.

UNITED STATES PATENT AND TRADEMARK OFFICE
CERTIFICATE OF CORRECTION

PATENT NO. : 5,761,394

DATED : June 2, 1998

INVENTOR(S) : SUSUMU SUGIURA ET AL.

Page 2 of 2

It is certified that error appears in the above-identified patent and that said Letters Patent is hereby corrected as shown below:

COLUMN 35

Line 3, "accoring" should read --according--.

Signed and Sealed this

First Day of June, 1999

Attest:

Q. TODD DICKINSON

Attesting Officer

Acting Commissioner of Patents and Trademarks